US 6,434,238 B1

(12) United States Patent
Chaum et al.

(10) Patent No.: US 6,434,238 B1
(45) Date of Patent: Aug. 13, 2002

(54) MULTI-PURPOSE TRANSACTION CARD SYSTEM

(75) Inventors: David Chaum, Sherman Oaks, CA (US); Niels Ferguson; Jelte Van Der Hoek, both of Amsterdam (NL)

(73) Assignee: InfoSpace, Inc., Bellevue, WA (US)

( * ) Notice: Subject to any disclaimer, the term of this patent is extended or adjusted under 35 U.S.C. 154(b) by 0 days.

(21) Appl. No.: 08/909,480

(22) Filed: Aug. 11, 1997

Related U.S. Application Data

(63) Continuation of application No. PCT/US95/01765, filed on Feb. 13, 1995, which is a continuation-in-part of application No. 08/179,962, filed on Jan. 11, 1994, now Pat. No. 5,434,919.

(51) Int. Cl.[7] .................................................. H04L 9/00
(52) U.S. Cl. ........................... 380/45; 705/67; 713/172; 380/30
(58) Field of Search ............................... 380/30, 45–47; 235/380; 705/67–69; 713/169–172

(56) References Cited

U.S. PATENT DOCUMENTS

| 3,668,653 | A |   | 6/1972  | Fair et al.       |        |
|-----------|---|---|---------|-------------------|--------|
| 4,625,276 | A |   | 11/1986 | Benton et al.     |        |
| 4,630,201 | A |   | 12/1986 | White             |        |
| 4,742,546 | A |   | 5/1988  | Nishimura         |        |
| 4,747,050 | A | * | 5/1988  | Brachtl et al.    | 380/45 |
| 4,771,376 | A |   | 9/1988  | Kamiya            |        |
| 4,771,461 | A |   | 9/1988  | Matyas            |        |
| 4,877,947 | A |   | 10/1989 | Mori              |        |
| 4,881,264 | A |   | 11/1989 | Merkle            |        |
| 4,885,777 | A |   | 12/1989 | Takaragi et al.   |        |

(List continued on next page.)

FOREIGN PATENT DOCUMENTS

| EP | 0 281 224   | 9/1988  |
|----|-------------|---------|
| EP | 0 291 834   | 11/1988 |
| EP | 0 421 808   | 4/1991  |
| EP | 0439847 A1  | 8/1991  |
| EP | 0 535 863   | 4/1993  |
| EP | 0 573 245   | 12/1993 |
| GB | 2 274 523   | 7/1994  |
| WO | WO 89/08957 | 9/1989  |
| WO | WO 90/04892 | 5/1990  |

OTHER PUBLICATIONS

Chaum et al, "Untraceable Electronic Cash", Advances in Cyptology—Cryto '88, pp. 319–327.

Even et al, "On–line/Off–line Digital Signatures", Advances in Cryptology—Crypto '89, pp. 263–275.

(List continued on next page.)

Primary Examiner—Salvatore Cangialosi

(57) ABSTRACT

Disclosed is a multi-purpose transaction card system comprising an issuer, one or more cards, one or more terminals, and optionally one or more acquires, communicating using a variety of cryptographic confidentiality and authentication methods. Cards authenticate messages using public key based cryptographic without themselves performing the extensive computations usually associated with such cryptography. Integrity of complex transaction sequences and plural card storage updates are maintained, even under intentionally generated interruptions and/or modifications of data transmitted between card and terminal. Cards do not reveal any information to the terminal which is not directly necessary for the transaction or any information to which the terminal should not have access, though externally measurable aspects of its behavior. Transaction types supported include those suitable for off-line credit cards, in which the "open to buy" is maintained on the card.

10 Claims, 32 Drawing Sheets

U.S. PATENT DOCUMENTS

| | | |
|---|---|---|
| 4,906,828 A | 3/1990 | Halpern |
| 4,914,698 A | 4/1990 | Chaum |
| 4,935,962 A | 6/1990 | Austin |
| 4,947,430 A | 8/1990 | Chaum |
| 4,987,593 A | 1/1991 | Chaum |
| 5,005,200 A | 4/1991 | Fischer |
| 5,016,009 A | 5/1991 | Whiting et al. |
| 5,016,274 A | 5/1991 | Micali et al. |
| 5,034,597 A | 7/1991 | Atsumi et al. |
| 5,117,458 A | 5/1992 | Takaragi et al. |
| 5,131,039 A | 7/1992 | Chaum |
| 5,140,634 A | 8/1992 | Guillou et al. |
| 5,212,788 A | 5/1993 | Lomet el al. |
| 5,214,702 A | 5/1993 | Fischer |
| 5,220,501 A | 6/1993 | Lawlor et al. |
| 5,221,838 A | 6/1993 | Gutman et al. |
| 5,241,599 A | 8/1993 | Bellovin et al. |
| 5,247,578 A | 9/1993 | Pailles et al. |
| 5,267,314 A | 11/1993 | Stambler |
| 5,280,527 A | 1/1994 | Gullman et al. |
| 5,299,263 A | 3/1994 | Beller et al. |
| 5,311,594 A | 5/1994 | Penzias |
| 5,361,267 A | 11/1994 | Godiwala et al. |
| 5,373,558 A | 12/1994 | Chaum |
| 5,402,490 A | 3/1995 | Mihm, Jr. |
| 5,434,919 A * | 7/1995 | Chaum ........................ 380/30 |
| 5,748,737 A * | 5/1998 | Daggar ........................ 235/380 |

OTHER PUBLICATIONS

Box et al, SmartCash: A Practical Electronic Payment System, CWI Technical Report CS–R9035.

Diffie et al, New Directions in Cyrptography, IEEE Transactions on Information Theory, vol. IT22, No. 6, No. 79, pp. 644–654.

Lamport, "Construction Digital Signatures form a One Way Function", SRI Technical Report CSL–08.

"Matrix Digital Signature for Use With the Date Encryption Algorithm", IBM Technical Disclosure Bulletin, vol. 28, No. 2, Jul. 1985, pp. 603–604.

Merkle, "A Digital Signature Based on a Conventional Encryption Function", Advances in Cryptology—Crypto '87, pp. 369–378.

Chaum et al, "Undeniable Signatures", Advances in Crytology—Crypto '89, pp. 212–216.

* cited by examiner

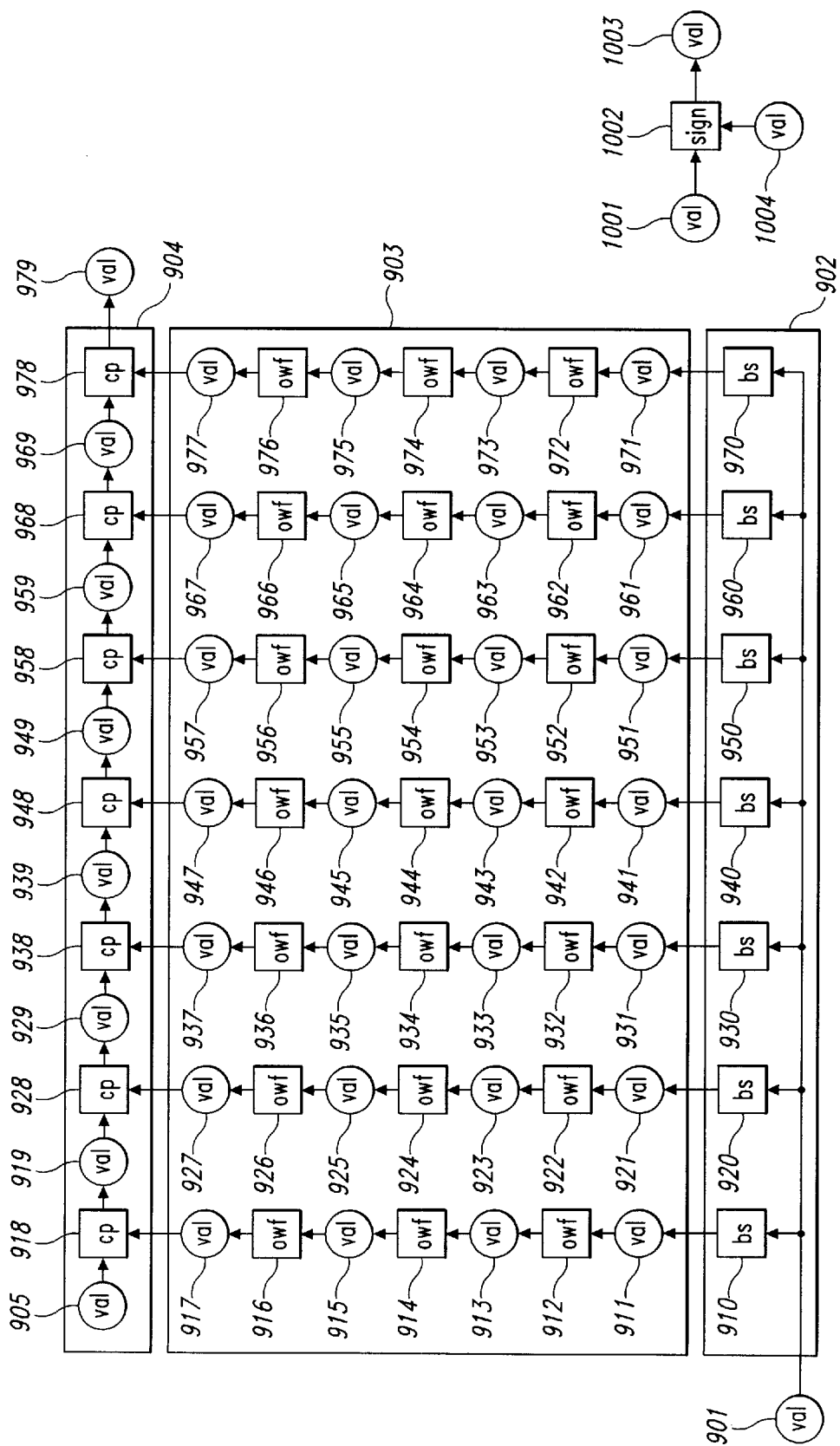

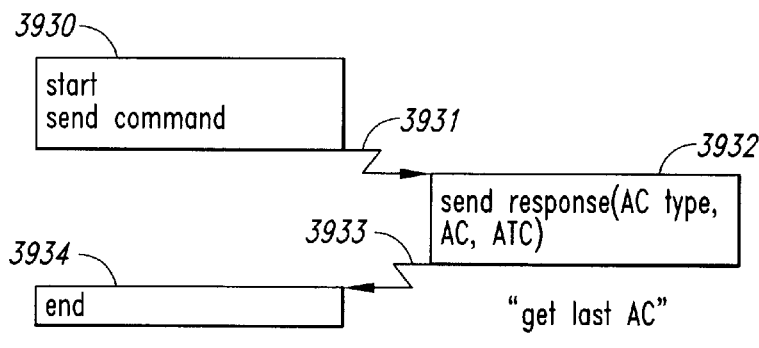
Fig. 38
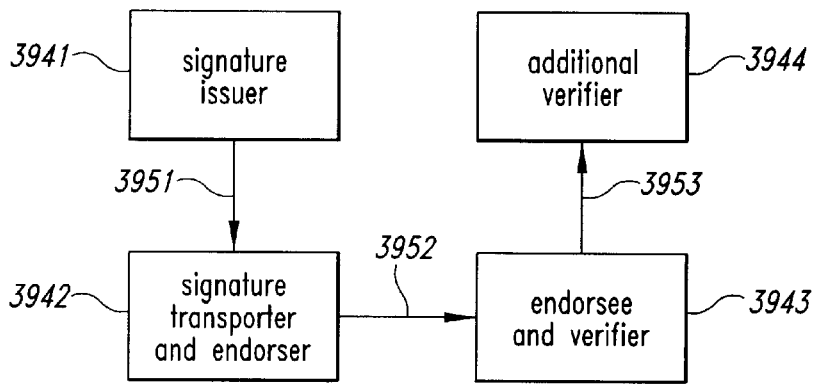
Fig. 39
| payment with house | house-end values / town values | | | # |
|---|---|---|---|---|
| | pre-comp A | pre-comp B | needed | |
| 560 | 534 | - | 523,543,564,565,566,567 | 7 |
| 561 | 534,535 | - | 523,543,564,565,566,567 | 8 |
| 562 | 534,535,536 | - | 523,543,566,567,569 | 8 |
| 563 | 534,535,536,537 | - | 523,543,567,571 | 8 |
| 530 | 514 | 534 | 523,534,535,536,537,573 | 8 |
| 531 | 514,515 | 539 | 523,534,535,536,537,573 | 9 |
| 532 | 514,515,516 | 541 | 523,539,536,537,573 | 9 |
| 533 | 514,515,516,517 | 543 | 523,541,537,573 | 9 |
| 510 | - | 514,543,564 | 514,515,516,517,582 | 7 |
| 511 | - | 519,543,564,565 | 514,515,516,517,582 | 8 |
| 512 | - | 521,543,564,565,566 | 519,516,517,582 | 8 |
| 513 | - | 523,543,564,565,566,567 | 521,517,582 | 8 |
| 560 | 534 | - | 523,543,564,565,566,567 | 7 |
| 561 | 534,535 | - | 523,543,564,565,566,567 | 8 |
Fig. 40

| after computing house | we have values | which compress to |
|---|---|---|
| 560 | 564 | – |
| 561 | 564,565 | 569 |
| 562 | 569,566 | 571 |
| 563 | 571,567 | 573 |
| 530 | 573,534 | – |
| 531 | 573,534,535 | 573,539 |
| 532 | 573,539,536 | 573,541 |
| 533 | 573,541,537 | 582 |
| 510 | 582,514 | – |
| 511 | 582,514,515 | 582,519 |
| 512 | 582,519,516 | 582,521 |
| 513 | 582,521,517 | 584 |

| | | | | | | | | |
|---|---|---|---|---|---|---|---|---|
| 1. | a11. | a12 | a13 | a14 | – | a2 | a3 | a4 |
| 2. | a11 | a12. | a13 | a14 | – | a2 | a3 | a4 |
| 3. | >b11 | >a22 | a13. | a14 | – | a2 | a3 | a4 |
| 4. | >b12 | a22 | >a23 | a14. | – | a2 | a3 | a4 |
| 5. | >a21. | a22 | a23 | >a24 | >a1 | – | a3 | a4 |
| 6. | a21 | a22. | a23 | a24 | a1 | >B21 | a3 | a4 |
| 7. | >b21 | >a32 | a23. | a24 | a1 | >B22 | a3 | a4 |
| 8. | >b22 | a32 | >a33 | a24. | a1 | >A2 | a3 | a4 |
| 9. | >a31. | a32 | a33 | >a34 | >b1 | A2 | – | a4 |
| 10. | a31 | a32. | a33 | a34 | b1 | A2 | >B31 | a4 |
| 11. | >b31 | >a42 | a33. | a34 | b1 | A2 | >B32 | a4 |
| 12. | >b32 | a42 | >a43 | a34. | b1 | A2 | >A3 | a4 |
| 13. | >a41. | a42 | a43 | >a44 | >b2 | A2 | A3 | – |
| 14. | a41 | a42. | a43 | a44 | b2 | A2 | A3 | >B41 |
| 15. | >b41 | >A12 | a43. | a44 | b2 | A2 | A3 | >B42 |
| 16. | >b42 | A12 | >A13 | a44. | b2 | A2 | A3 | >A4 |
| 17. | >A11. | A12 | A13 | >A14 | – | A2 | A3 | A4 |
| 18. | A11 | A12. | A13 | A14 | – | A2 | A3 | A4 |

MULTI-PURPOSE TRANSACTION CARD SYSTEM

This application is a continuation (under 35 USC§120/365) of PCT/US95/01765 designating the U.S. and filed Feb. 13, 1995 as, in turn, a continuation-in-part (under 35 § 120/365) of U.S. application Ser. No. 08/179,962 filed Jan. 11, 1994, now U.S. Pat. No. 5,434,919.

BACKGROUND OF THE INVENTION

1. Field of the Invention

This invention relates to transaction systems, and more specifically to secure transaction systems involving tamper-resistant devices.

2. Description of Prior Art

Reference is hereby made to P.C.T. publication WO 89/08957, E.P.O. filing 89905483.7, and U.S. Pat. No. 4,987,593 filed Mar. 16, 1988, titled "One-Show Blind Signature Systems" by Chaum, which are incorporated herein by reference. Reference is also hereby made to E.P.O. filing 90200207.0 and U.S. Pat. No. 5,131,039 filed Jan. 29, 1990, titled "Optionally moderated transaction systems" by Chaum, which are incorporated herein by reference. Reference is also hereby made to U.S. Pat. No. 4,914,698 filed Jul. 24, 1989, titled "One-show blind signature systems" by Chaum and to U.S. Pat. No. 5,276,736, filed Jul. 13, 1992, titled "Optionally moderated transaction systems" by Chaum, which are incorporated herein by reference.

A basic technique for "endorsing" a public key digital signature was disclosed in the first above included reference and a related paper presented at Crypto '88. This technique was used in the second above included reference and also in other subsequent publications, such as, for example, U.S. Pat. No. 5,016,274 by Micali et al. related to a paper presented at Crypto '89 and CWI technical Report CS-R9035.

Endorsement schemes are simply one-time signature schemes where the authentication of the public key that is always needed in one time signature schemes is done using the very well know technique of a public key certificate.

Three efficiency improvements for the endorsement function, compared to that first disclosed in the first above included reference, are known in the prior art. The first two pertain to one-time signature schemes and the third improves the true public key digital signatures.

The first two improvements were made in the context of the well-know original one-time signatures called "Lamport" signatures that are disclosed and attributed to Lamport in "New directions in cryptography," IEEE Transaction on Information Theory, pp. 644, 654, 1976, and are also subsequently described by Lamport in SRI technical report CSL 98. Lamport signatures simply authenticate, as a public key, the output of a public one-way function on a list of secret values, later release of a subset of the secret values allows anyone to confirm both that they correspond to the authenticated list and the message signed by being encoded in the choice of subset.

The first improvement is believed disclosed at least in IBM Technical Disclosure Bulletin, vol. 28, no. 2, July 1985, pp. 603–604, titled "Matrix digital signature for use with the data encryption algorithm" and in the Proceedings of Crypto '87 by Merkle in the context of Lamport signatures and was subsequently incorporated in the second above included reference by Chaum. This first improvement reduces the size of the original list of secret inputs to the one-way function. Instead of simply basing the signature on single independent applications of one-way functions, the functions are composed or "chained" so that the output of the previous function application in the chain serves as the input of the next function application. Each chain can be thought of as representing one digit of the numeric message signed by the one-time scheme. The radix is one plug the length of the chain, with the original Lamport signatures having radix 2. This first improvement results in economy of storage and transmission, at the expense of an increase in computation.

The second efficiency improvement was also disclosed by Merkle, as cited above. It applies techniques, believed known in the coding art, that reduce the number of "control" digits needed. These digits prevent a signature from being changed into a signature on a different message. The previous disclosures cited used one control digit per message digit, with the control digit representing the additive inverse of the message digit. The improvement works essentially by having only a few control digits that represent the additive inverse of the sum of the message digits. Accordingly, the number of control digits is reduced from being linear in the number of message digits to being only logarithmic.

The third improvement applies to certain public key digital signature schemes. It was disclosed first in U.S. Pat. No. 4,949,380, in a paper presented at Crypto '89, PCT publication US89/04662, and EPO application 89912051.3, all substantially the same and all by Chaum. This improvement allows plural public key signatures to be "intermingled" in the space taken by one, so long as they are made with coprime public exponents. They can be signed in the intermingled form, stored in that form, and later separated for showing. This technique also gives economy of storage (and communication), although potentially at the expense of extra computation.

One commercially interesting use of endorsement schemes appears to be in the area of "prepaid cards."

A prepaid smart card contains stored value which the person holding it can spend at retail points of payment. After accepting stored value from cards, retailers are periodically reimbursed with actual money by system providers. A system provider receives money in advance from people and stores corresponding value onto their cards. During each of these three kinds of transactions, secured data representing value is exchanged for actual money or for goods and services. Telephone cards used in France and elsewhere are probably the best known prepaid smart cards (though some phone cards use optical or magnetic techniques). National prepaid systems today typically aim to combine public telephones, merchants, vending, and public transportation. Automatic collection of road tolls may also be included soon.

Growth in the prepaid smart card market appears to be rapid. For instance, at the time of this application it is believed that national prepaid chipcard schemes are rolling out in Denmark, under construction in Portugal, and planned in Belgium, Spain, and France. The MAC network, believed the largest ATM network in the United States, has announced its entry, and systems are apparently already operational in South Africa and Switzerland.

In schemes based solely on conventional cryptography used by cards, secured modules (sometimes called SAM's) are needed at every point of payment. The reason is that transactions are consummated without communication with external sites, to keep transaction costs comensurate with the low-value of payments, and that conventional cryptographic authentication requires the communicants to share a common secret. Each secure module is believed to require the ability to develop secret keys of all cards, which gives some problems. If the cards of multiple system providers are to be accepted at the same point of payment, all the points of payment must have secured modules containing keys of every provider. This is believed to mean either a mutually trusted module containing the keys of multiple providers, which might be hard to achieve, or one module per provider, which becomes impractical as the number of providers grows. Furthermore, in any such system, if a module is penetrated, not only may significant retailer fraud be facilitated, but the entire card base may be compromised.

Endorsement schemes avoid these problems since they do not require such secured modules. Equipment at points of payment needs no secret keys, only public ones, in order to authenticate the endorsements, which act like guaranteed checks filled in with all the relevant details. These same endorsements can later be verified by the system provider for reimbursement. (While these systems allow full end-to-end verification, tamper-resistant aggregators can always be used for truncation.) They also allow the cards of any number of issuers to be accepted at all retailers; retailers cannot cheat issuers, and issuers cannot cheat each other.

The size of the chip in the card is of substantial practical importance in such systems. With a given technology, the more storage the more the chips cost to produce and the bigger they are. It is believed that in the industry larger chips are also thought to mean higher card production costs, and less reliable and durable cards. Cards announced so far for such national prepaid systems use only conventional cryptographic authentication and have only about one kilobyte of nonvolatile storage. For endorsement techniques to be competitive, it is believed important that they can be fit into the same chips. Prior art techniques do not allow enough endorsements to be stored in such chips.

Furthermore, it is believed that ordinary credit card and/or debit card transactions consummated using a smart card would benefit from the additional security of an off-line public key endorsement of their transaction details.

Transaction systems using a tamper-resistant device are well known. Usually the tamper-resistant device has the form of a smart card. Most smart card transaction systems are targeted to financial transactions, but many other transaction such as access control are in use. In most smart card systems the smart card has one or more secret keys specific to that smart card, while each terminal has one or more 'master keys' in a tamper-resistant device which allow the terminal to derive the secret keys of the smart cards. Once both parties in the transaction have a secret key in common, the security and authenticity of the transaction can be ensured using traditional cryptographic methods. The 'master keys' in the terminal are a weak point in these systems, as any attack which succeeds in getting these keys out of a terminal leads to a catastrophic breakdown of the security. Methods of solving this problem usually involve the application of some kind of public key cryptography. Using smart cards with a public key cryptographic capability is one solution, but such smart cards are more expensive than simple ones.

During a transaction a smart card will typically update one or more locations in non-volatile memory, which could for example consist of EEPROM. Present smart cards are sometimes vulnerable to interruptions during the update which leads to security and reliability problems. Any faults in the non-volatile memory often lead to wrongful transaction processing. Another weakness of smart cards using EEPROM memory is an attack in which the smart card is irradiated using ultraviolet (UV) light. It is known that this influences the data stored in the EEPROM, and might thus be used to attack the security of the system. Some types of transactions require several items in non-volatile memory to be modified simultaneously, a requirement which is not supported in current smart cards.

The different actions which make up a transaction are mostly not bound together by cryptographic means, making it harder to provide adequate security for complex transactions and often necessitating the use of specialized actions. Financial transaction system smart cards which are used for payment purposes typically subtract the amount of the payment from the internally held balance before giving out the cryptographic proof to the terminal that the payment has been made. Any interruption in the time between this update and the sending of the proof can lead to a loss of money, unless special recovery procedures are used.

Most smart cards willingly reveal a lot of information, often including a unique card identity number, directory structure etc. Although this information is usually not directly relevant to the security of the application, it can provide additional information to the terminal which might be used to invade the privacy of the owner of the smart card.

The tamper resistance of smart cards is typically used to allow the smart card to execute processes using some secret information (e.g. secret cryptographic keys), and care is taken in the design of transaction systems that the smart card does not reveal any of the secret information to the terminal. However, a terminal might perform many more measurements then just looking at the data that is sent by the card; it is our belief that many existing systems are vulnerable to an attack which uses these additional measurements.

The recently published specifications for the EMV system "Integrated Circuit Card Specifications for Payment Systems: Part 1, Electromechanical Characteristics, Logical Interface, and Transmission Protocols, version 1.1, Part 2, Data Elements and Commands, version 1.1, and Part 3, Transaction Processing, version 1.0" all data Oct. 31, 1994 by Europay International S.A., MasterCard International Incorporated, and Visa International Service Association define a system designed for credit card applications. They allow off-line processing of some credit card transactions. The specifications seem to envision a setting where the terminal does not have access to any secret keys, the specified off-line transactions do not include any means for the terminal to verify the authenticity of the card and the transaction data in this setting. Furthermore, the specifications seem not to take full advantage of the capabilities of a smart card. The EMV specifications are envisioned to be used for several types of financial transactions, including credit card payments, direct debiting of the user's account, pre-paid payments where the money resides in the card etc. The specifications do not address the underlying similarity in structure for all of these applications.

For some types of transactions, and specifically for financial ones, there is also a clearing process. In this process the terminals send information regarding the money they collected to the acquirer and/or issuer. Current systems rely on either having the terminal forward full transaction information to the acquirer, or having a tamper-resistant device (often called SAM) in the terminal to do the truncation: the SAM accepts the transaction data, verifies them, and keeps track of the necessary totals. This allows some or all of the transaction data to be discarded, the necessary clearing information is forwarded by the SAM to the acquirer and/or issuer and authenticated using some cryptographic scheme. Forwarding all transaction information can be expensive and cumbersome, while having SAMs in terminals can be expensive. When a single terminal has to deal with many different issuers/acquirers, the terminal either needs separate SAMs for each of the issuers/acquirers, which is expensive, or a single SAM which is trusted by all the issuers/acquirers, which leads to organizational difficulties.

OBJECTS OF THE INVENTION

Accordingly, it is an object of the present invention to:

provide a secure, flexible, efficient and reliable multi-purpose transaction system;

provide a secure and efficient authentication capability for smart cards, which does not rely on a capability of the smart card to performing public key cryptographic computations in an adequate fashion;

provide a secure atomic update of the non-volatile memory in smart cards for one or more modifications to the data in the memory, even under arbitrary interruptions and some physical attacks;

provide proper cryptographic proofs and verifications that the different actions that make up a transaction are kept together and executed in order;

prevent the smart card from revealing any information to terminals that do not have access to the appropriate keys;

prevent the smart card from revealing any information in addition to the information communicated as part of the transaction, through any external behaviour;

provide clearing methods and systems that do not communicate all the transaction data, without the use of one or more tamper-resistant devices in the terminal;

protect the terminals interest in off-line EMV transactions by adding a public key based digital authentication to the transaction;

provide a general transaction structure that can be used for credit card transactions, pre-paid transactions, direct debit transactions etc.; and allow efficient, economical, and practical apparatus and methods fulfilling the other objects of the invention.

Other objects, features, and advantages of the present invention will be appreciated when the present description and appended claims are read in conjunction with the drawing figures.

BRIEF DESCRIPTION OF THE DRAWING FIGURES

It will be appreciated that FIGS. 39, 42, 43, 44, 45 and 46 are part of the description of a first preferred embodiment and that all other figures are part of the description of a second preferred embodiment.

Figure 1:
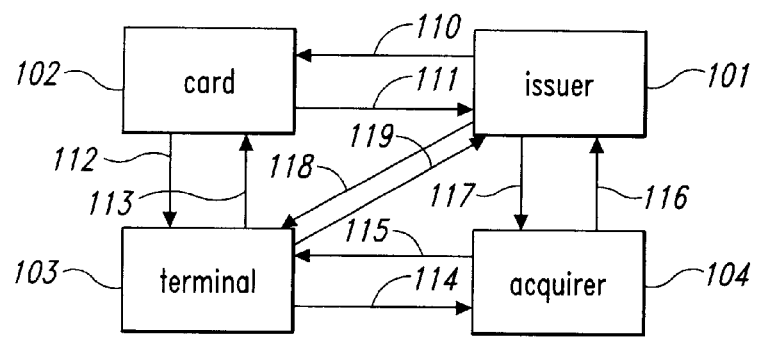
FIG. 1 shows a combination block and functional diagram of a preferred embodiment of a multi-purpose transaction card system involving four groupings of parties, in accordance with the teachings of the present invention.
Figure 5:
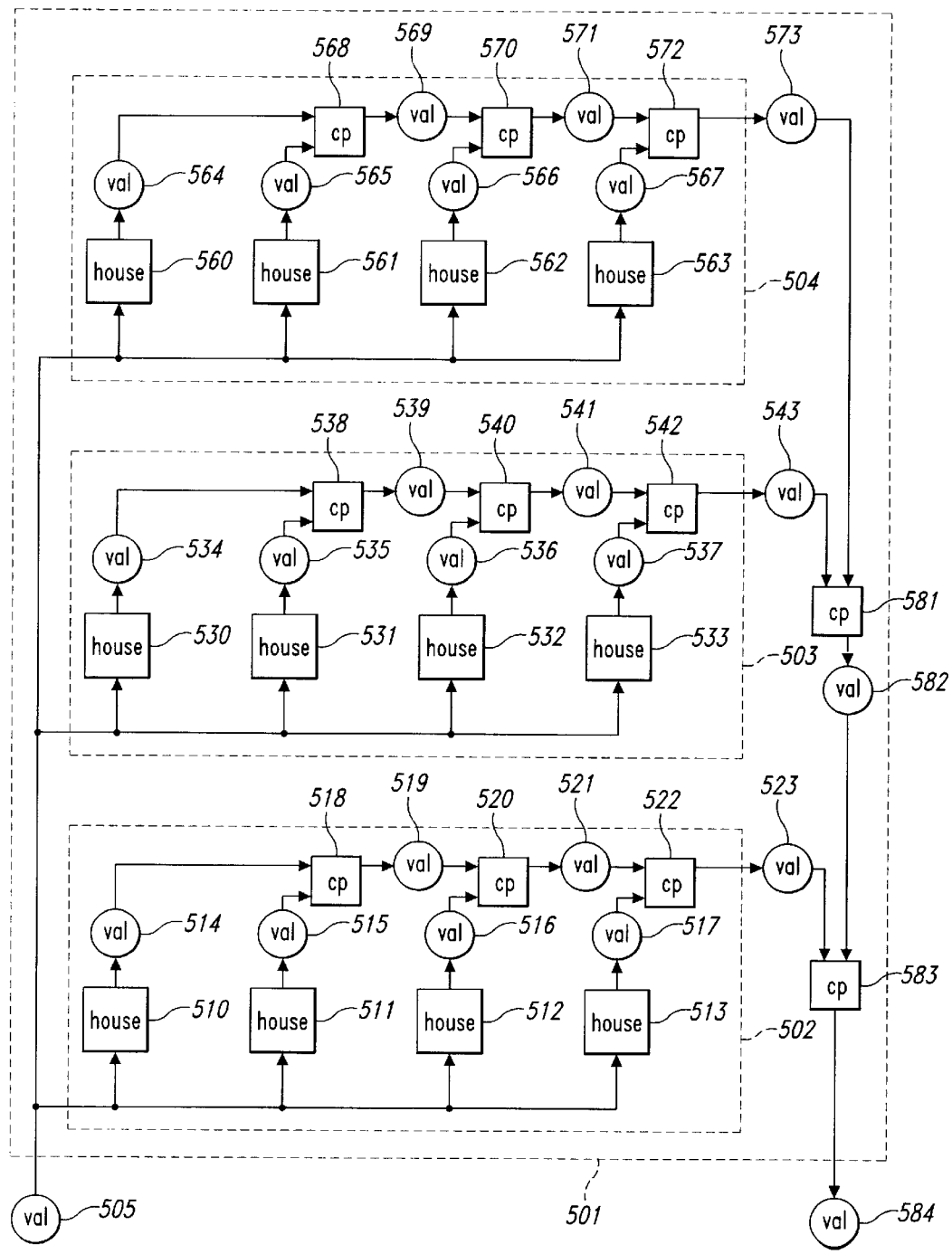
FIG. 5 shows a combination block and functional diagram of a preferred exemplary embodiment of a compact endorsement signature structure called a town, in accordance with the teachings of the present invention.
Figure 8:
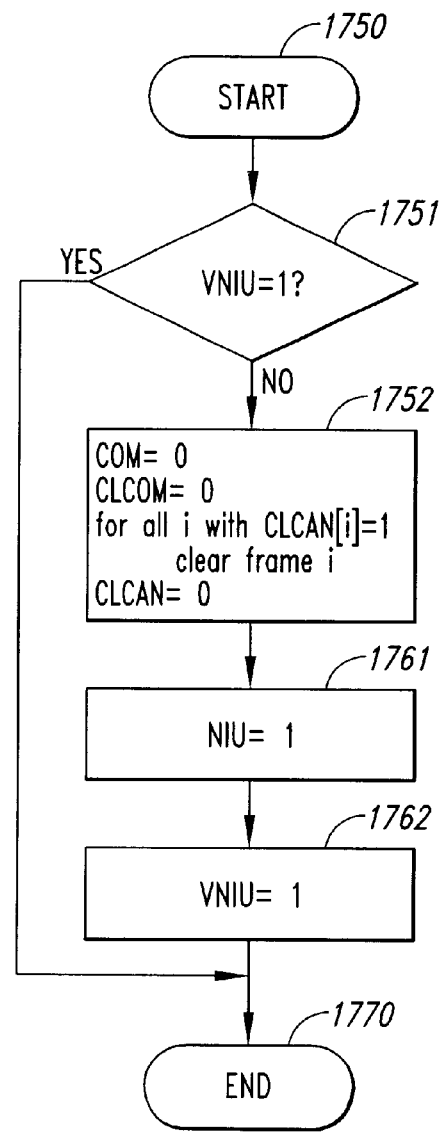
Figure 11:
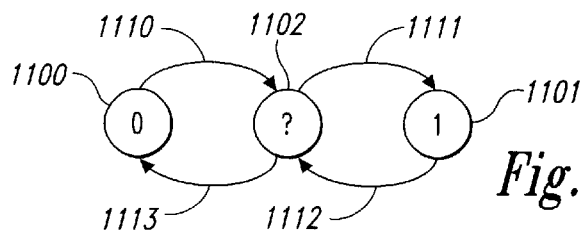
Figure 12:
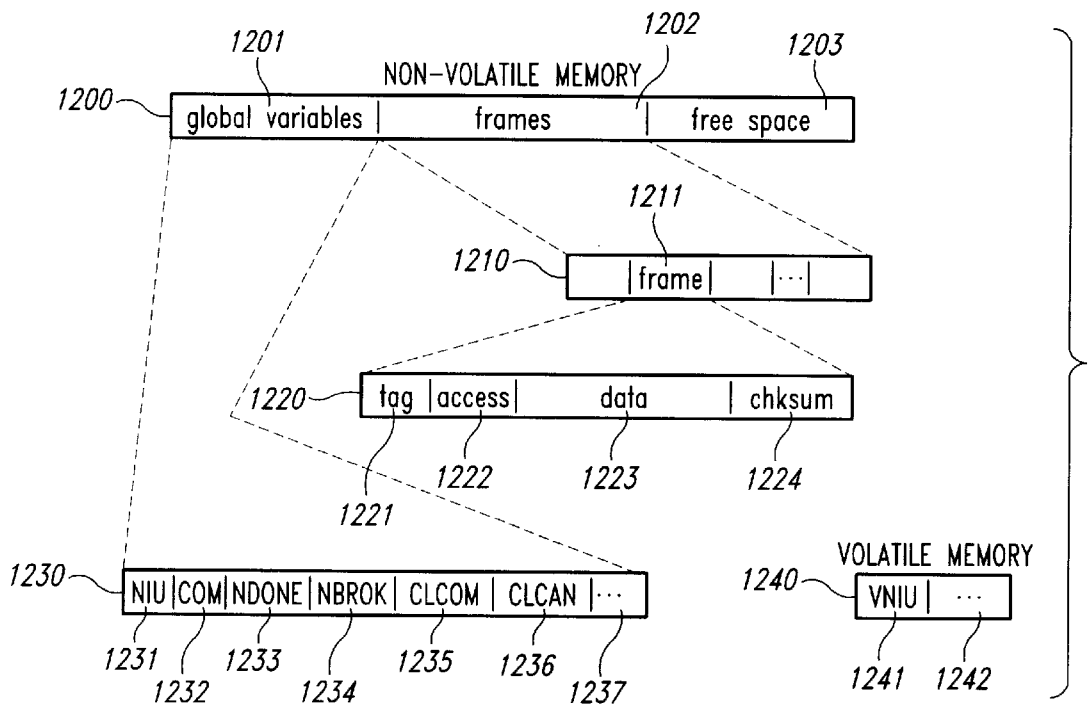
Figure 13:
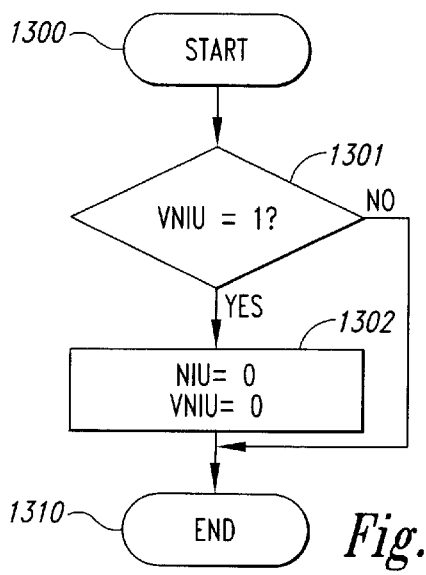
Figure 14:
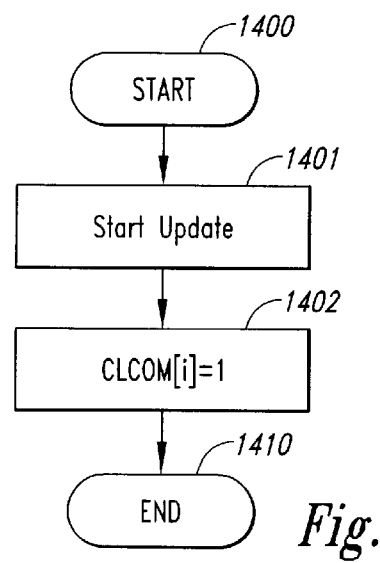
Figure 15:
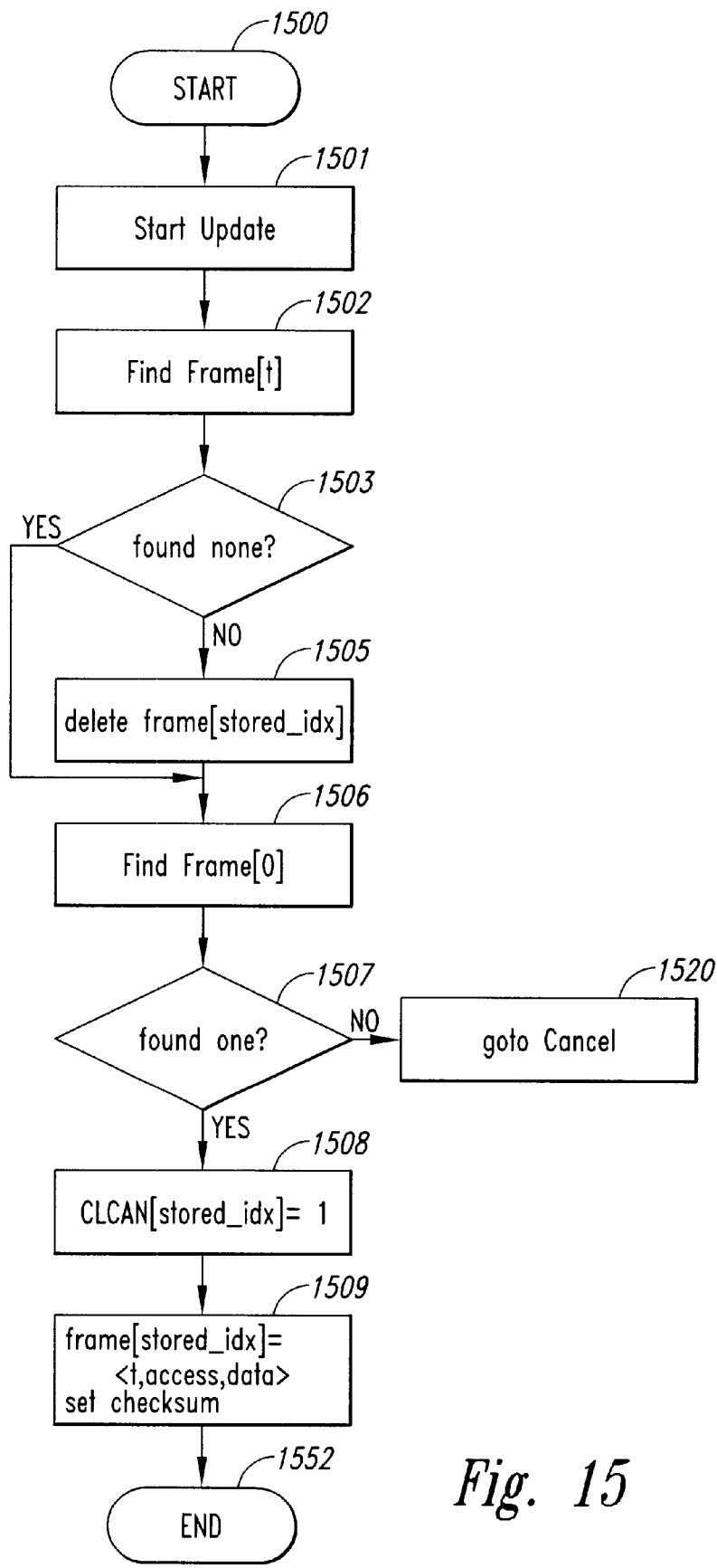
Figure 16:
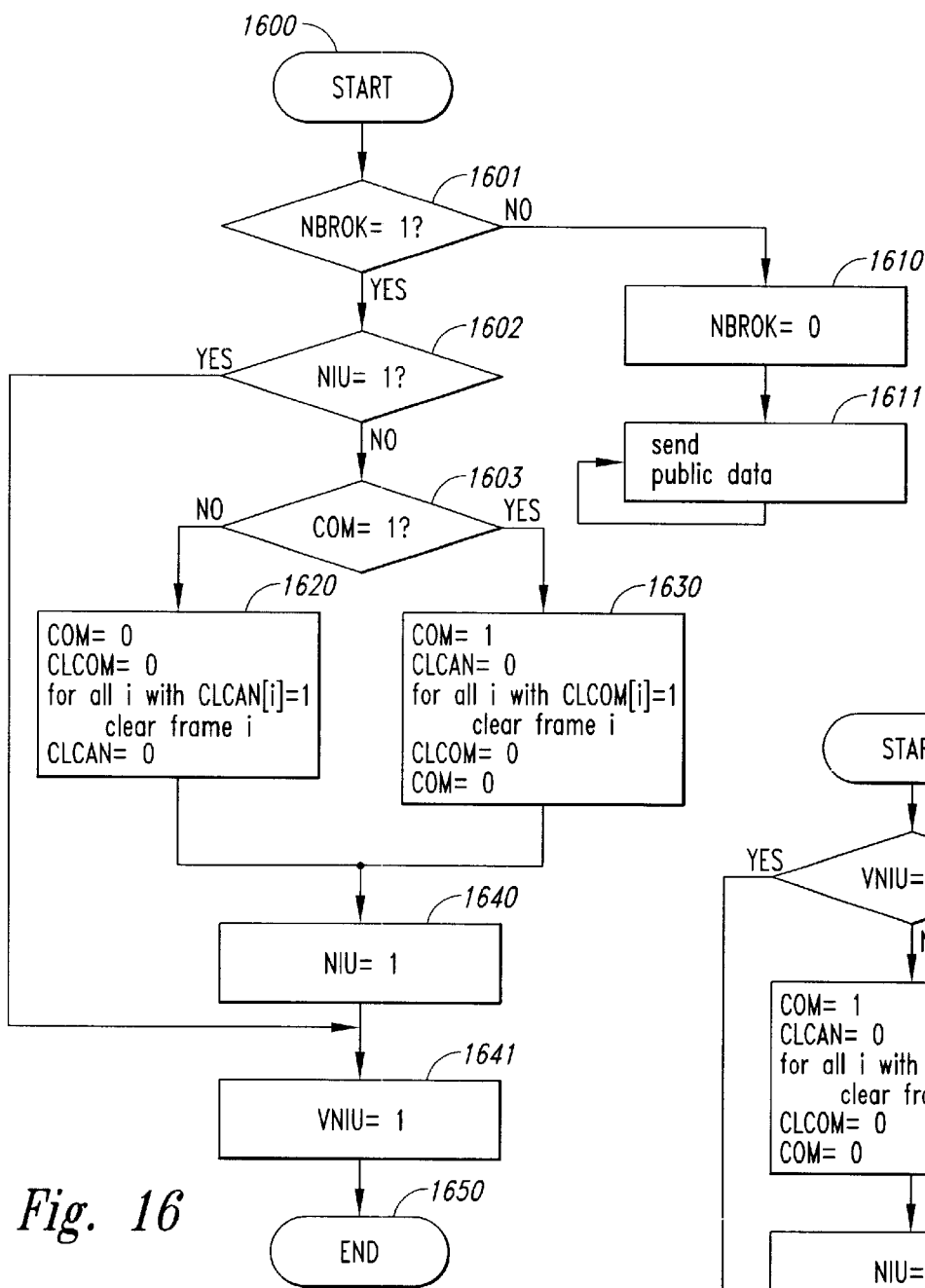
Figure 17:
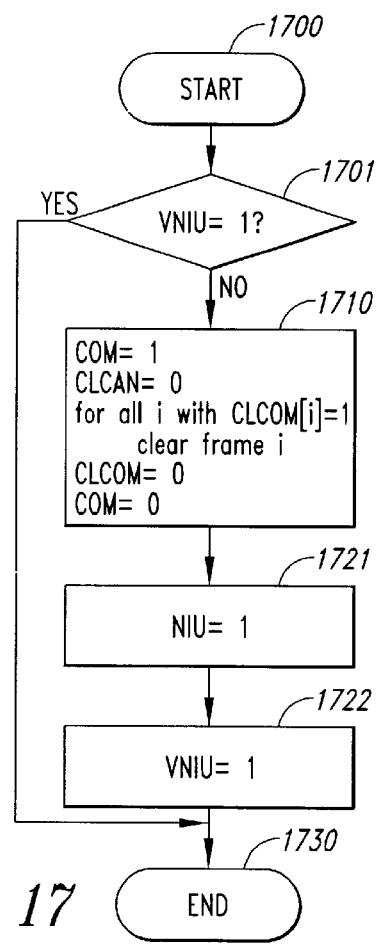
Figure 18:
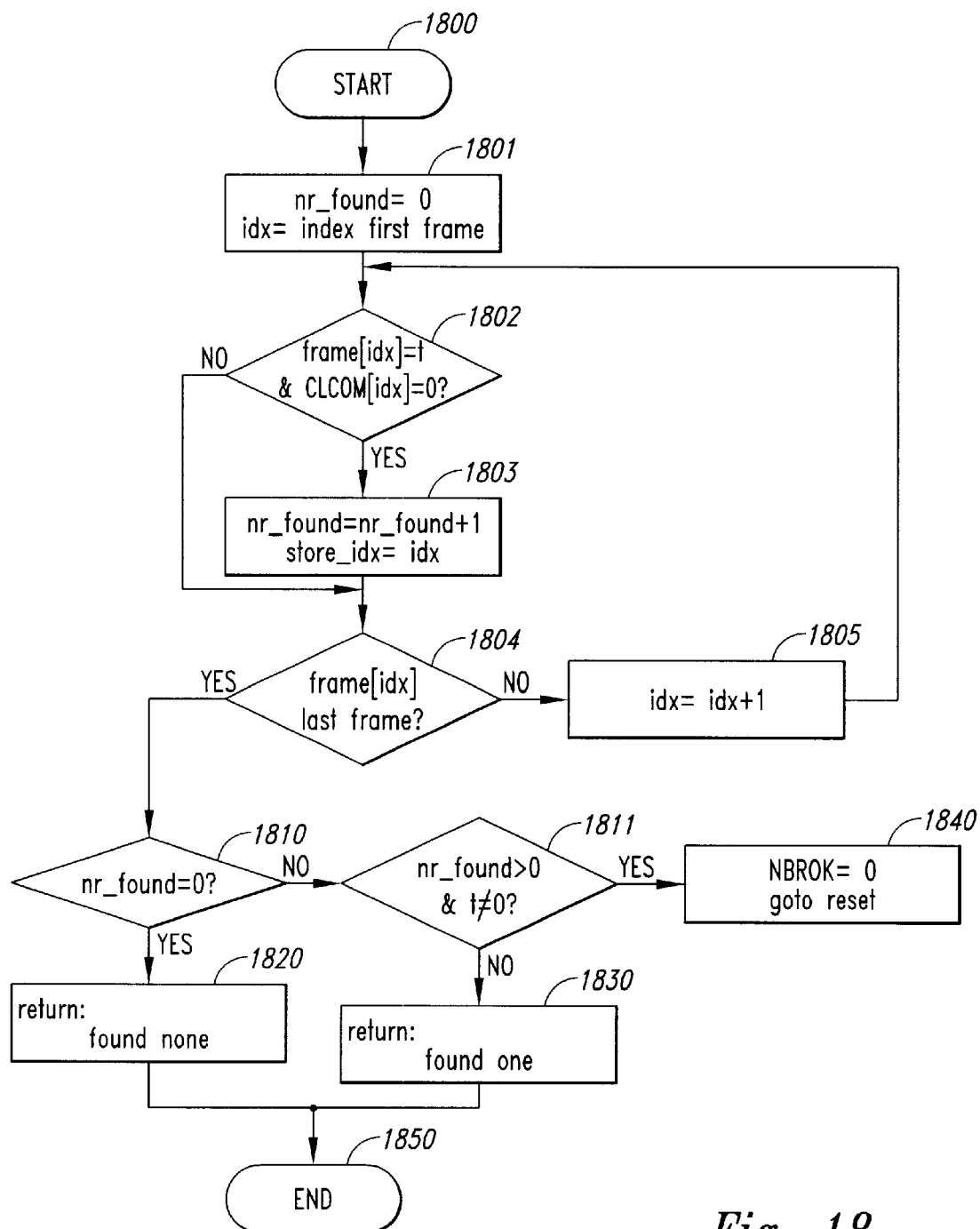
Figure 19:
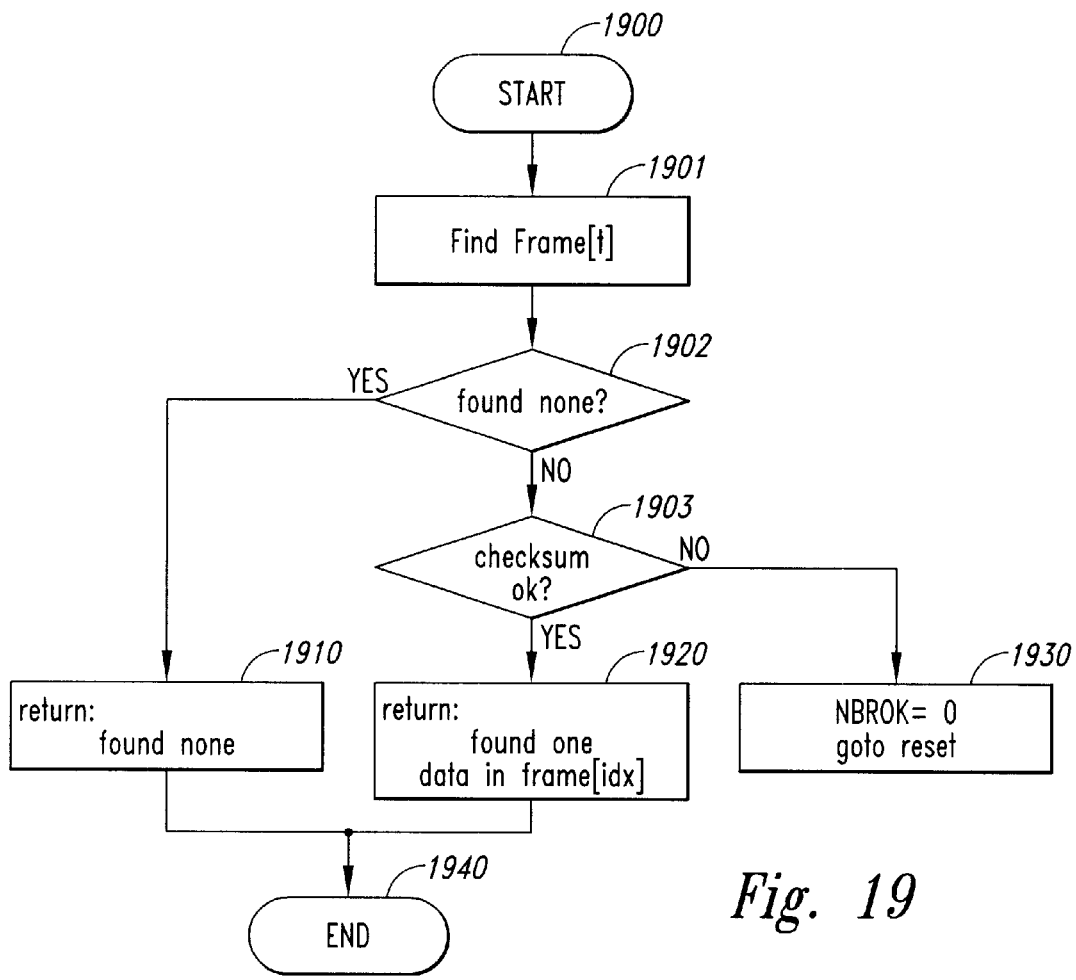
Figure 20:
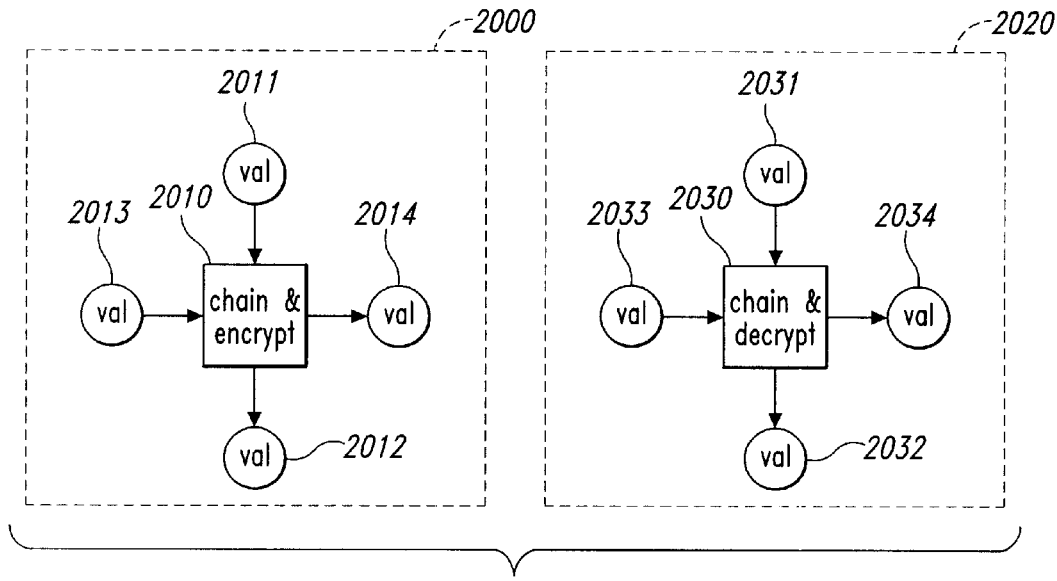
Figure 21:
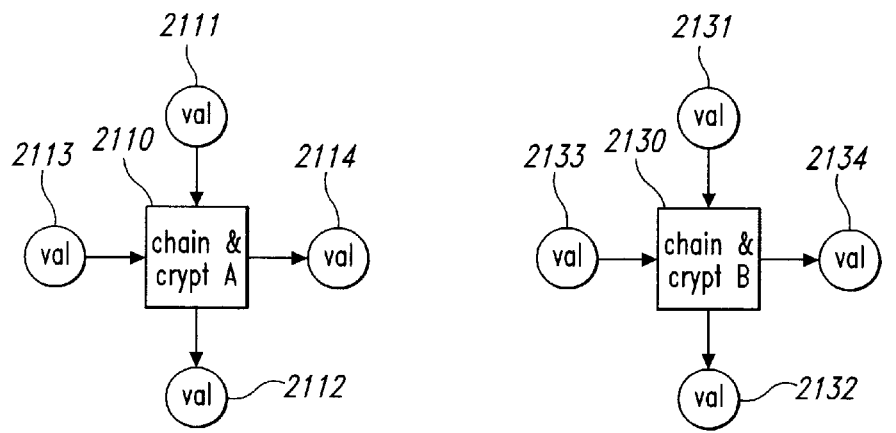
Figure 22:
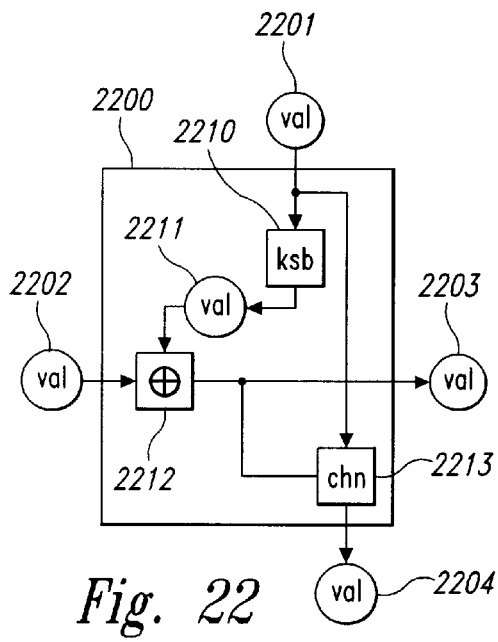
Figure 23:
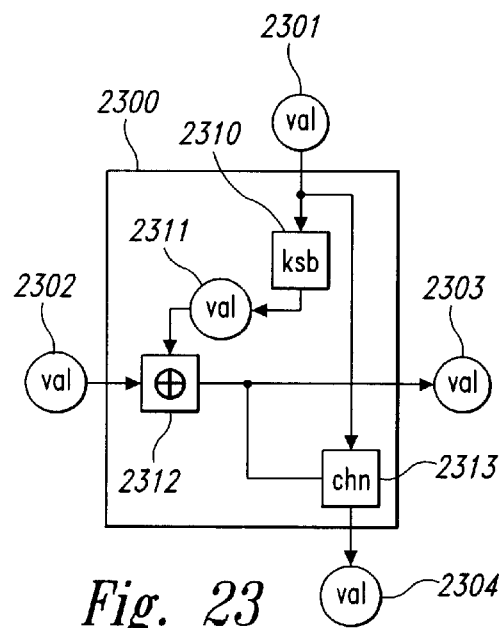
Figure 24:
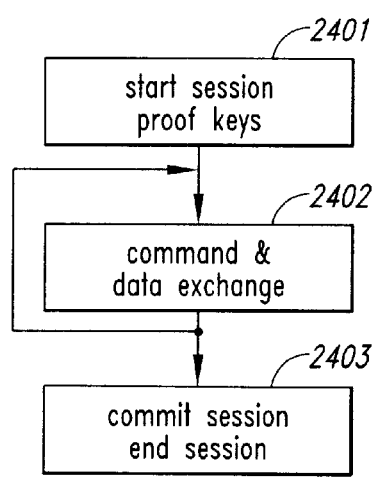
Figure 25:
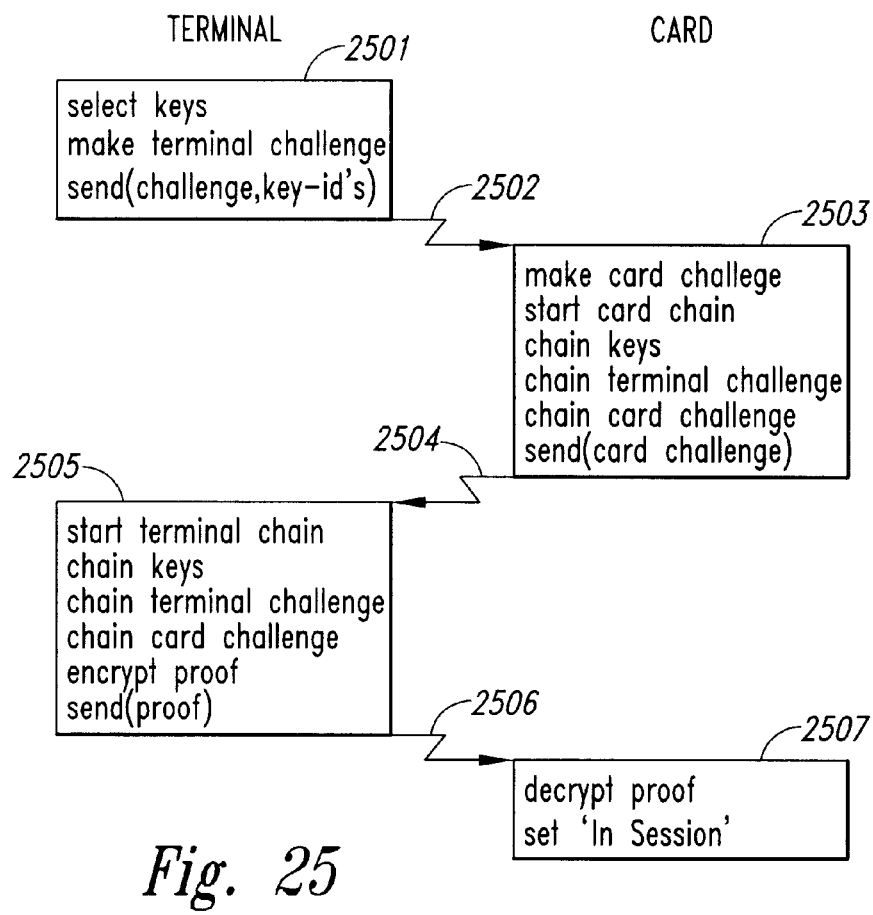
Figure 26:
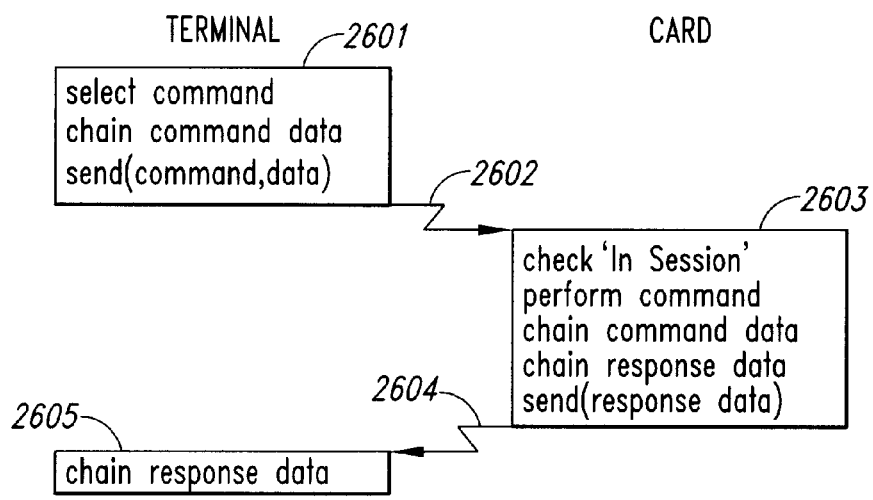
Figure 27:
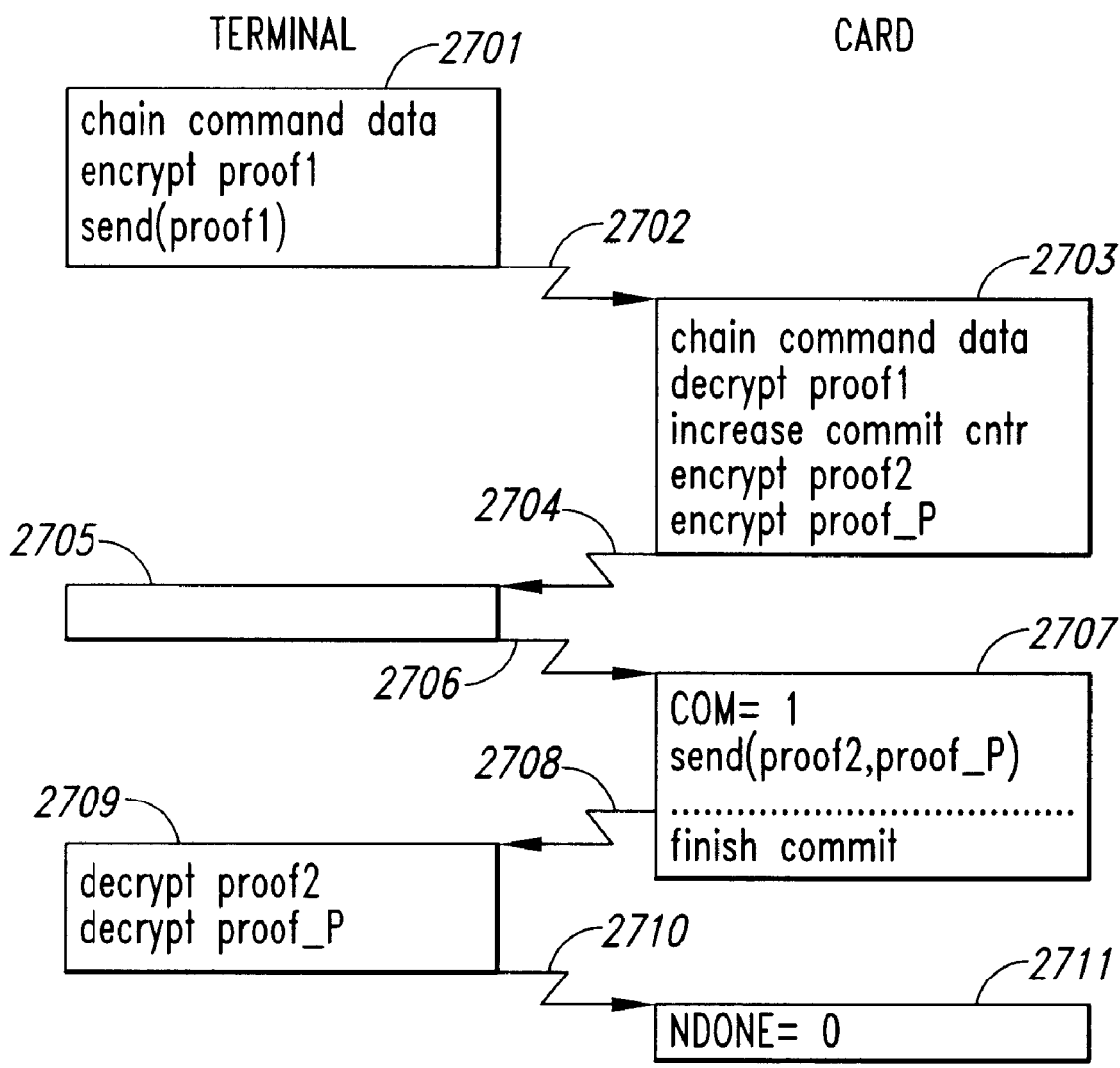
Figure 28:
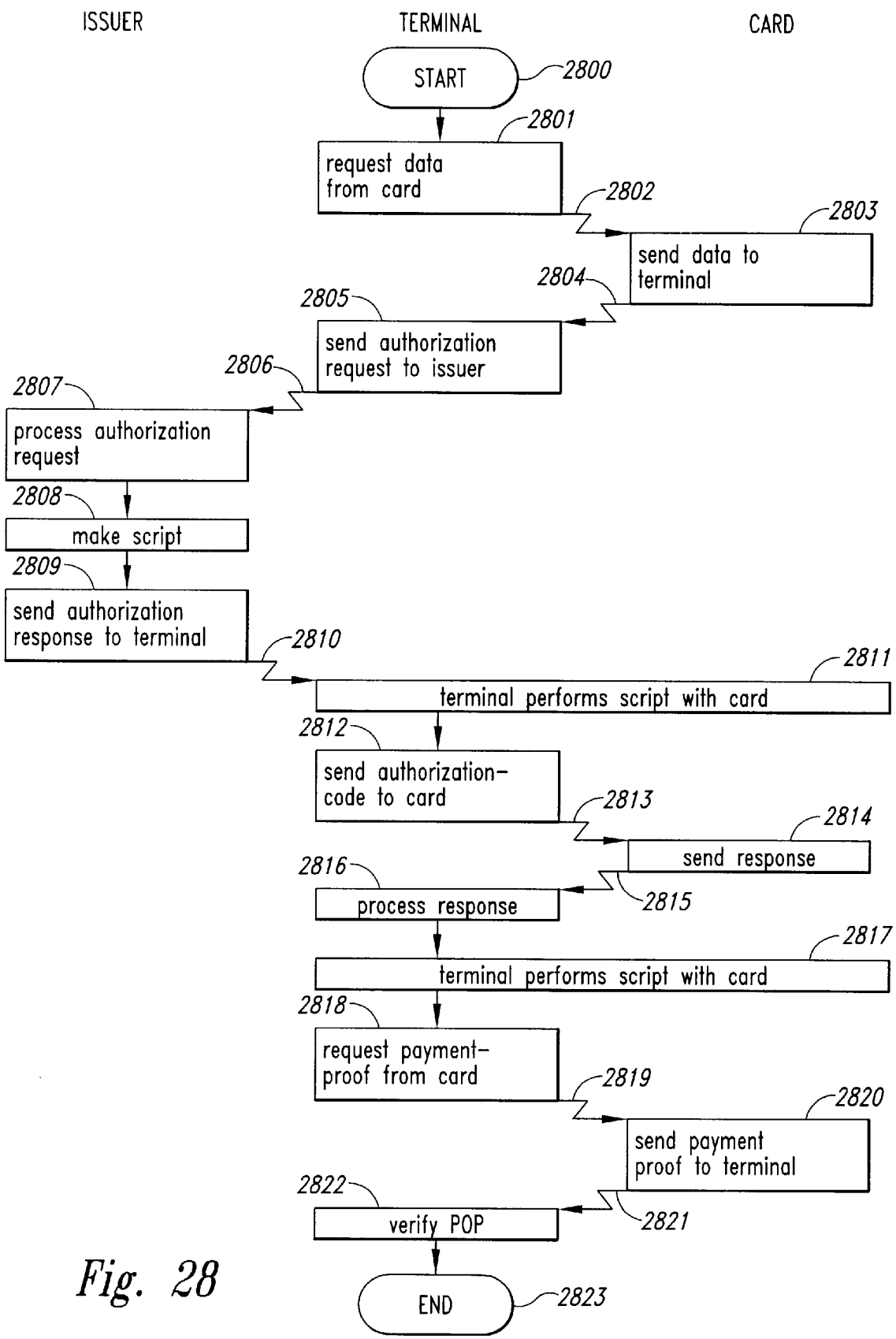
Figure 29:
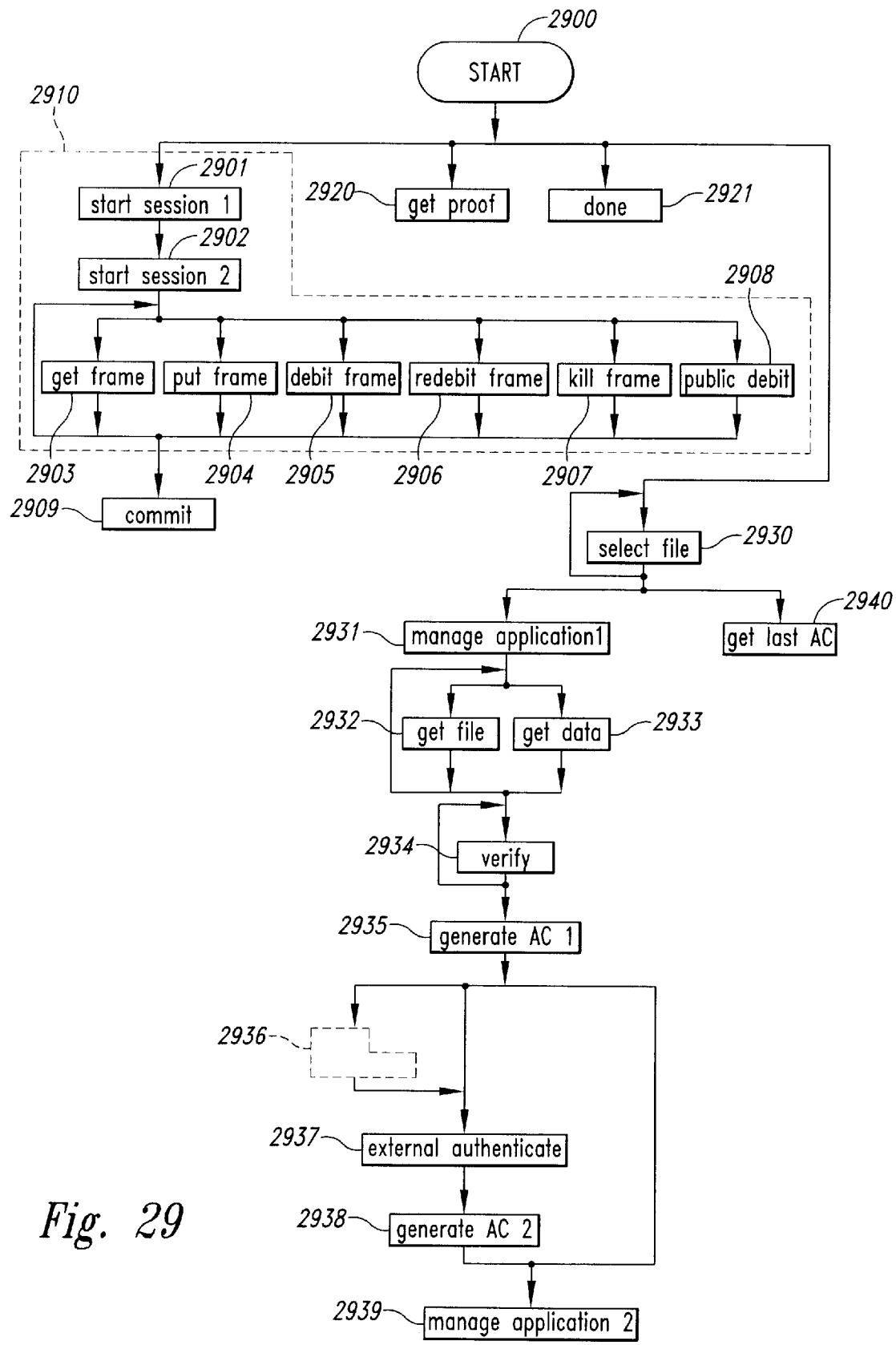
Figure 30:
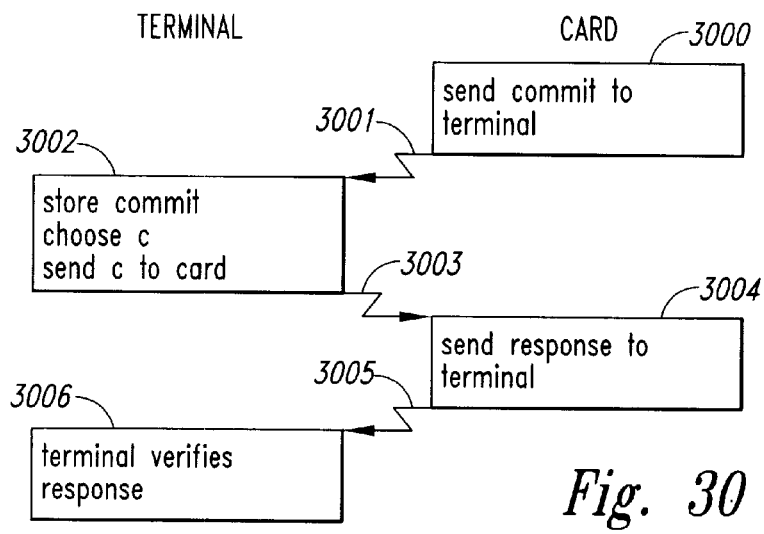
Figure 31:
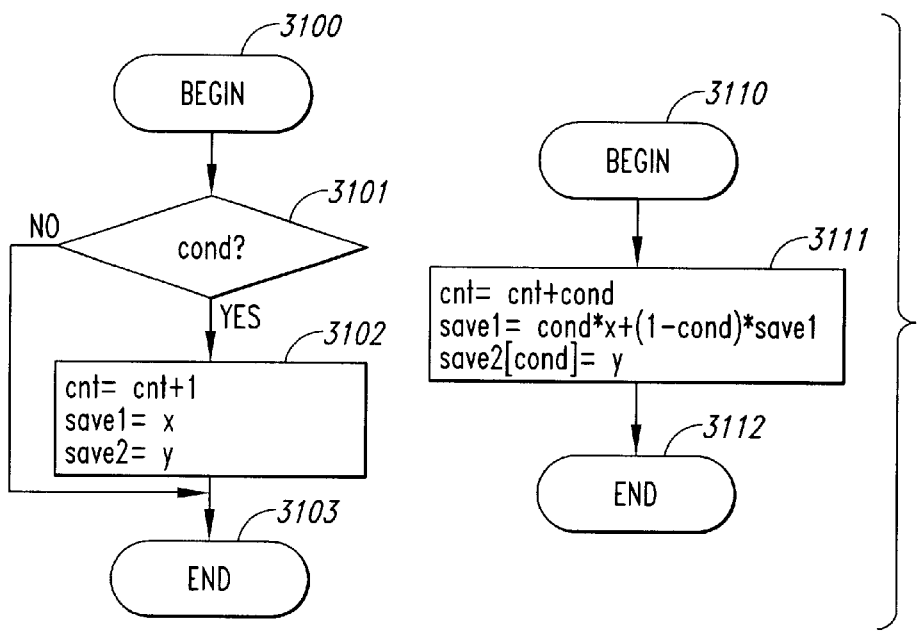
Figure 32:
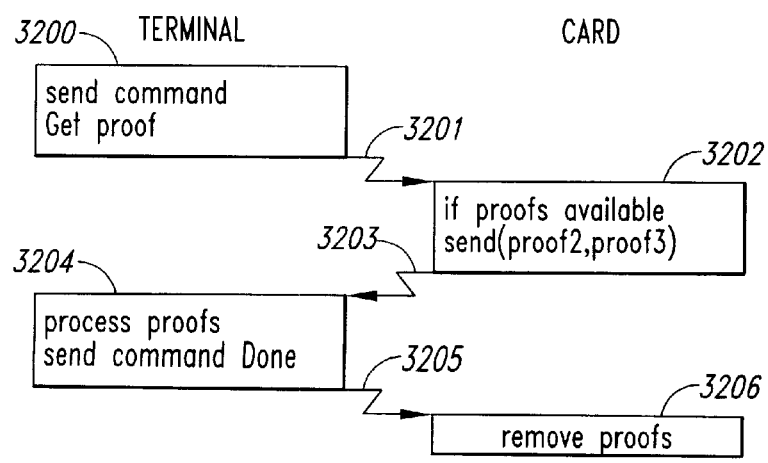
Figure 33:
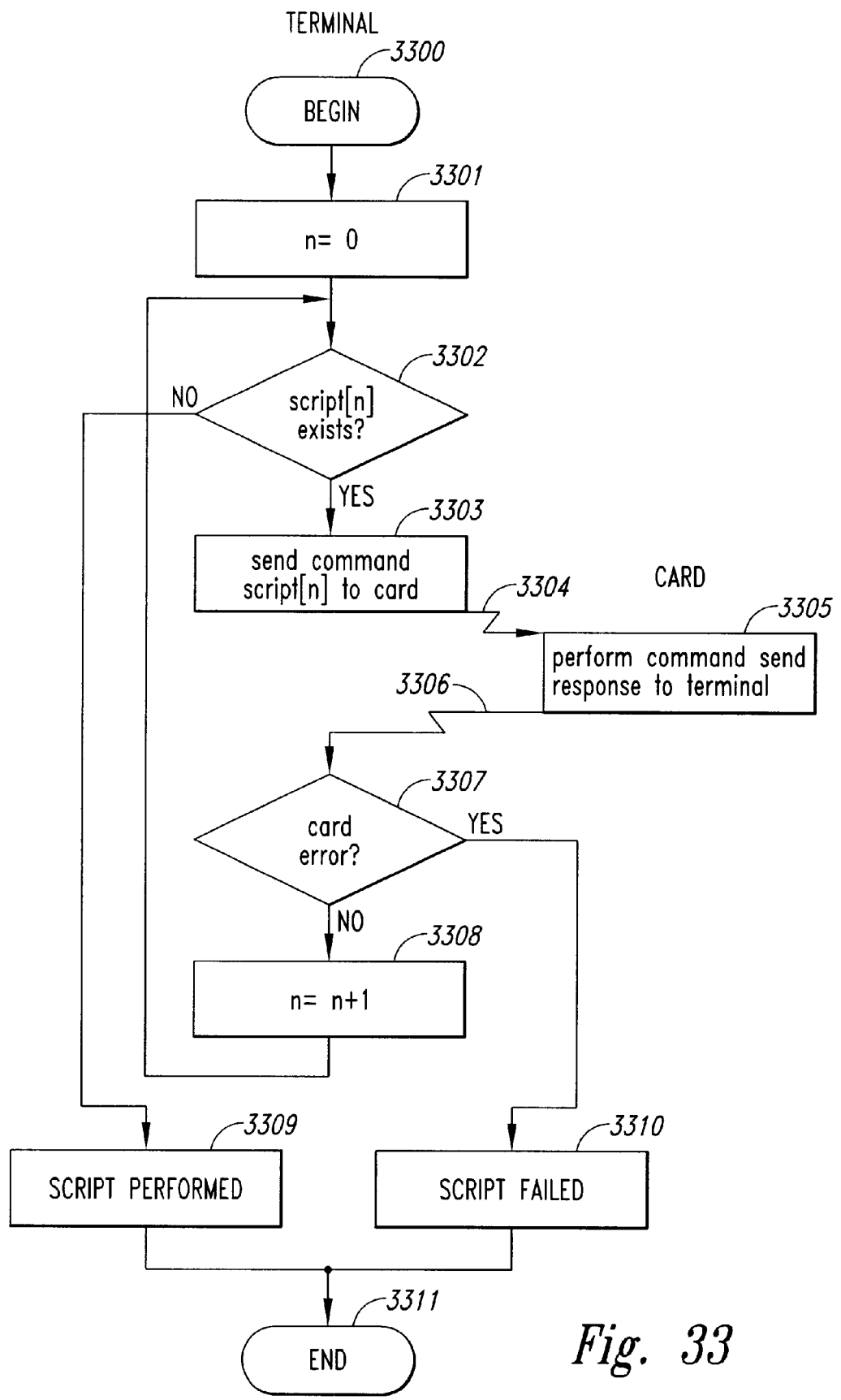
Figure 34:
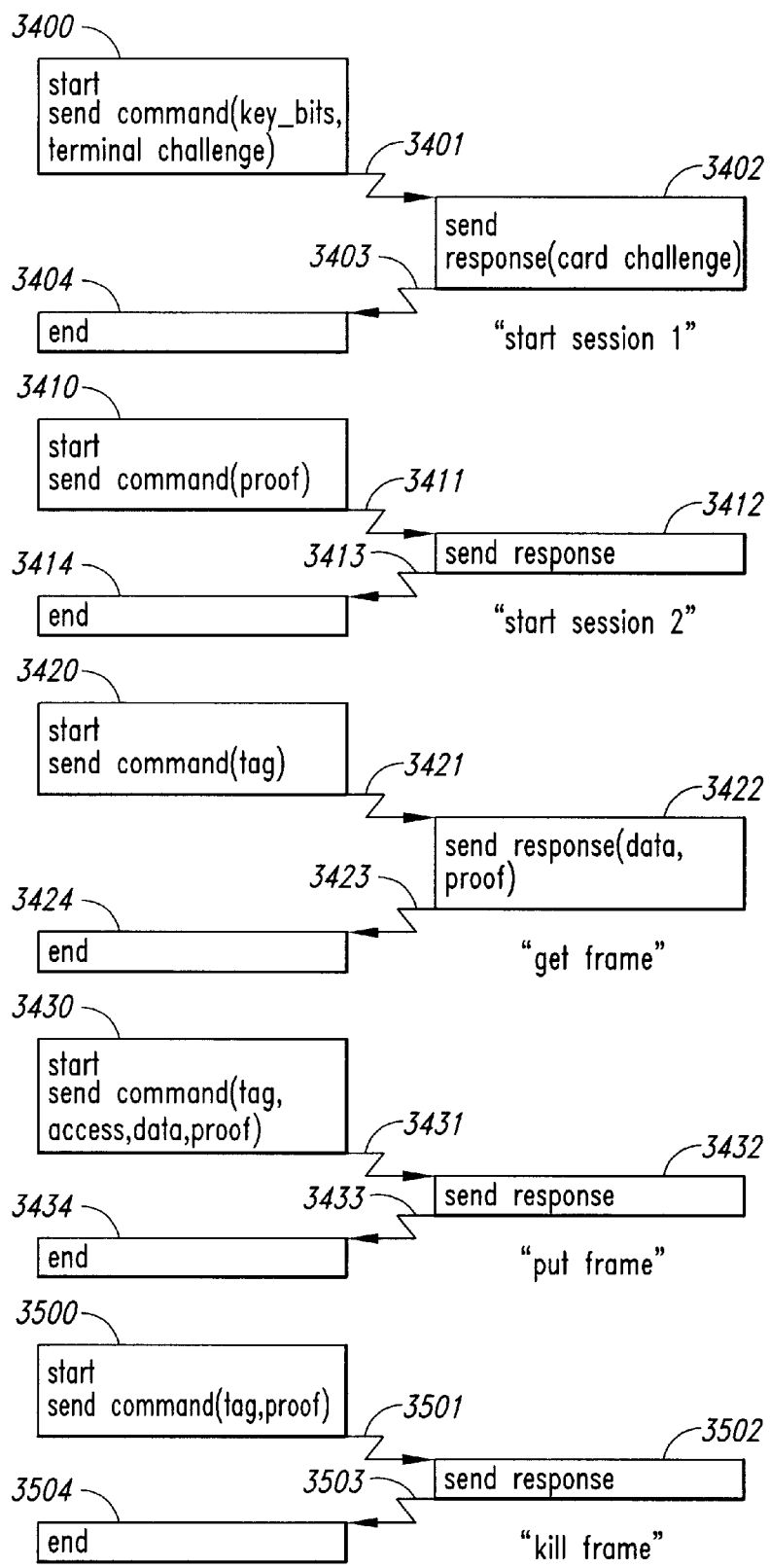
Figure 35:
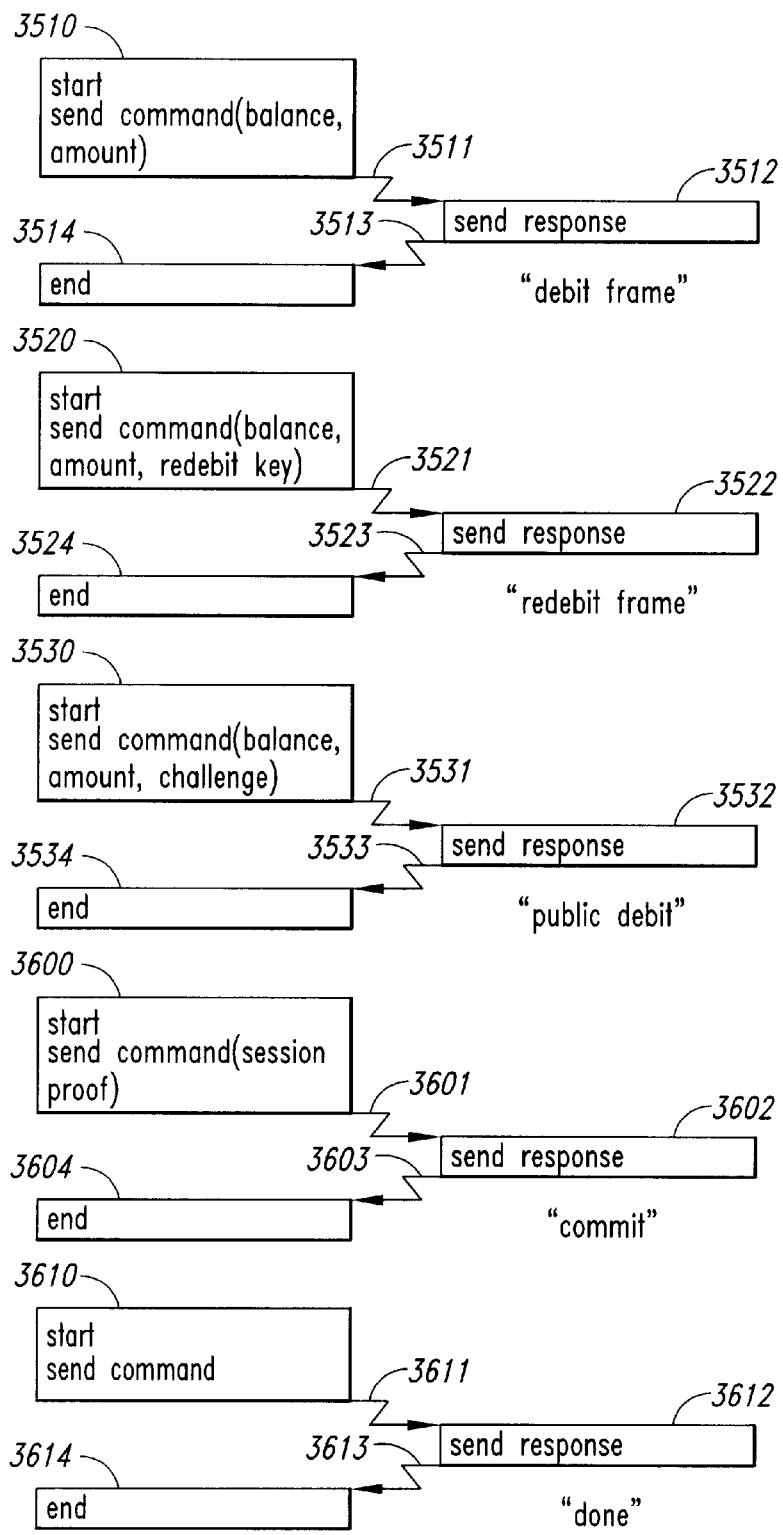
Figure 36:
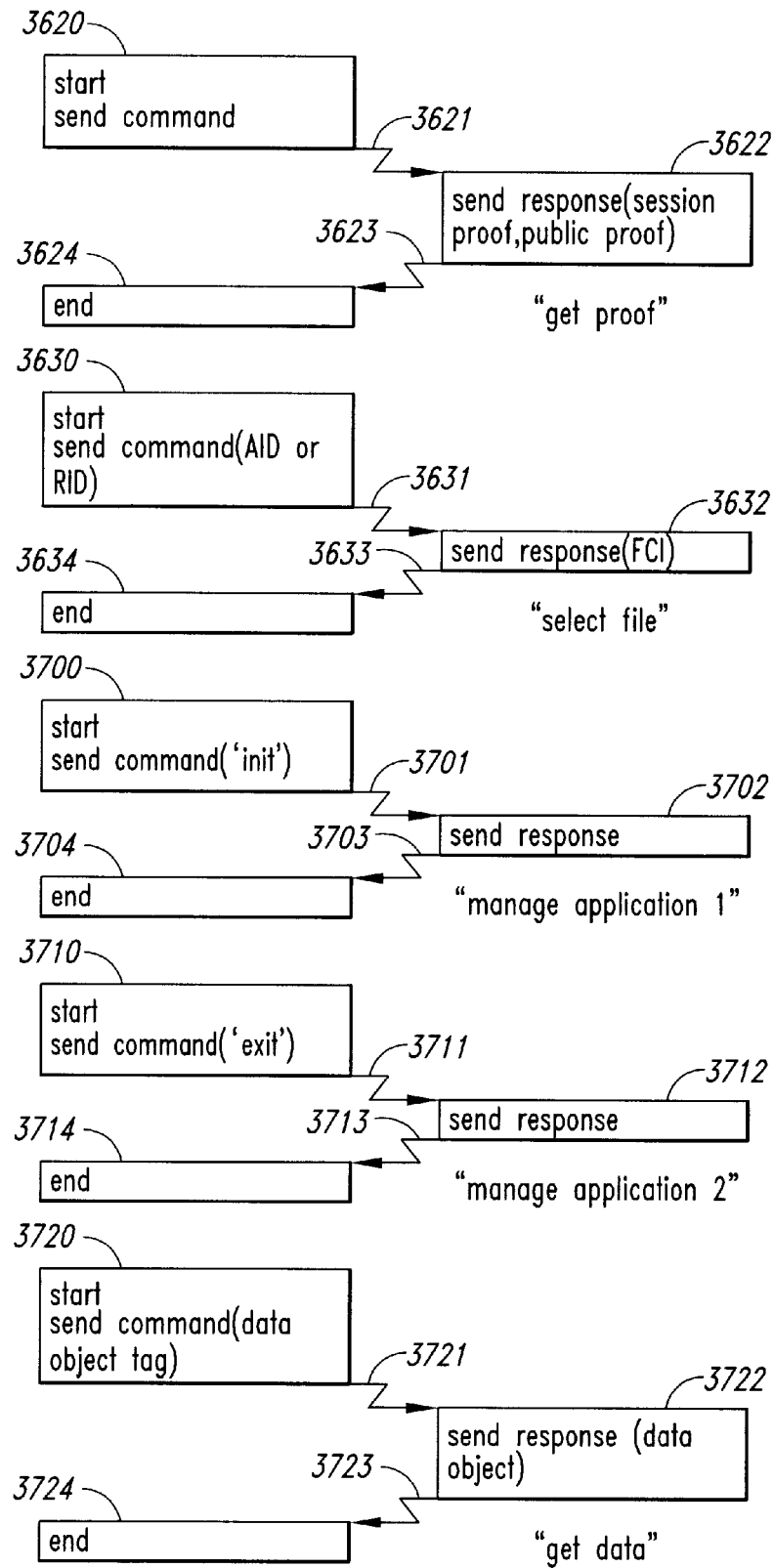
Figure 37:
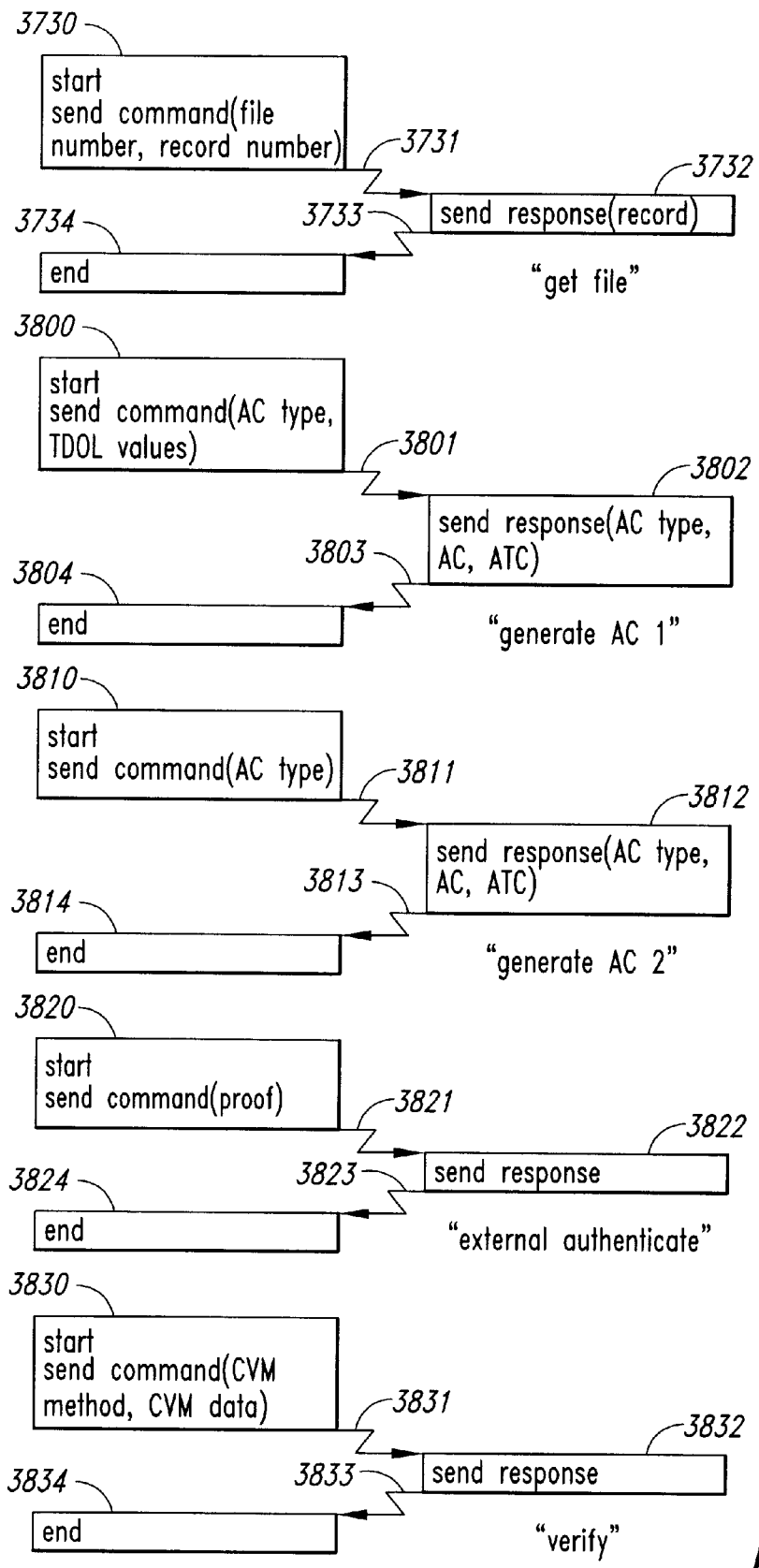
Figures 41, 42:
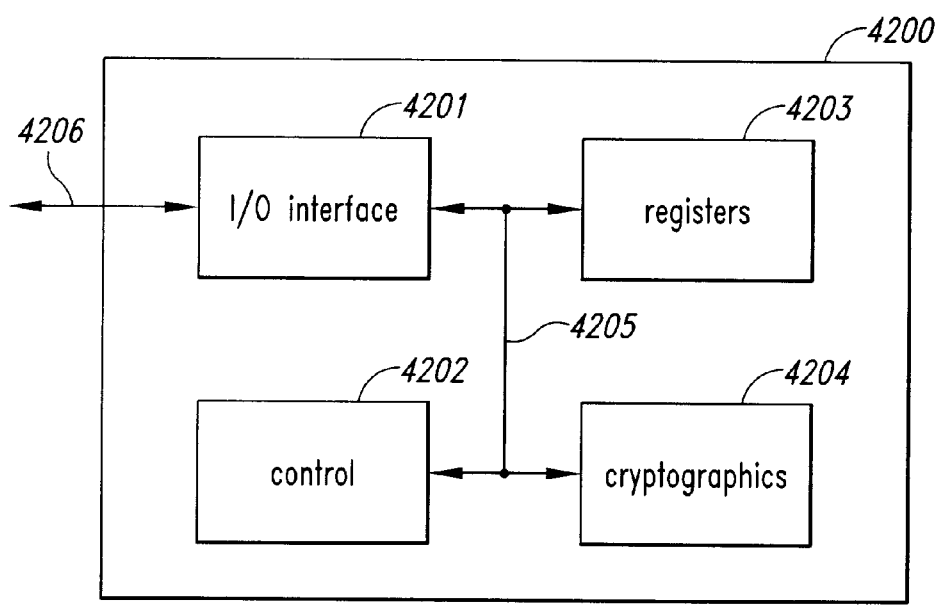
Figure 43:
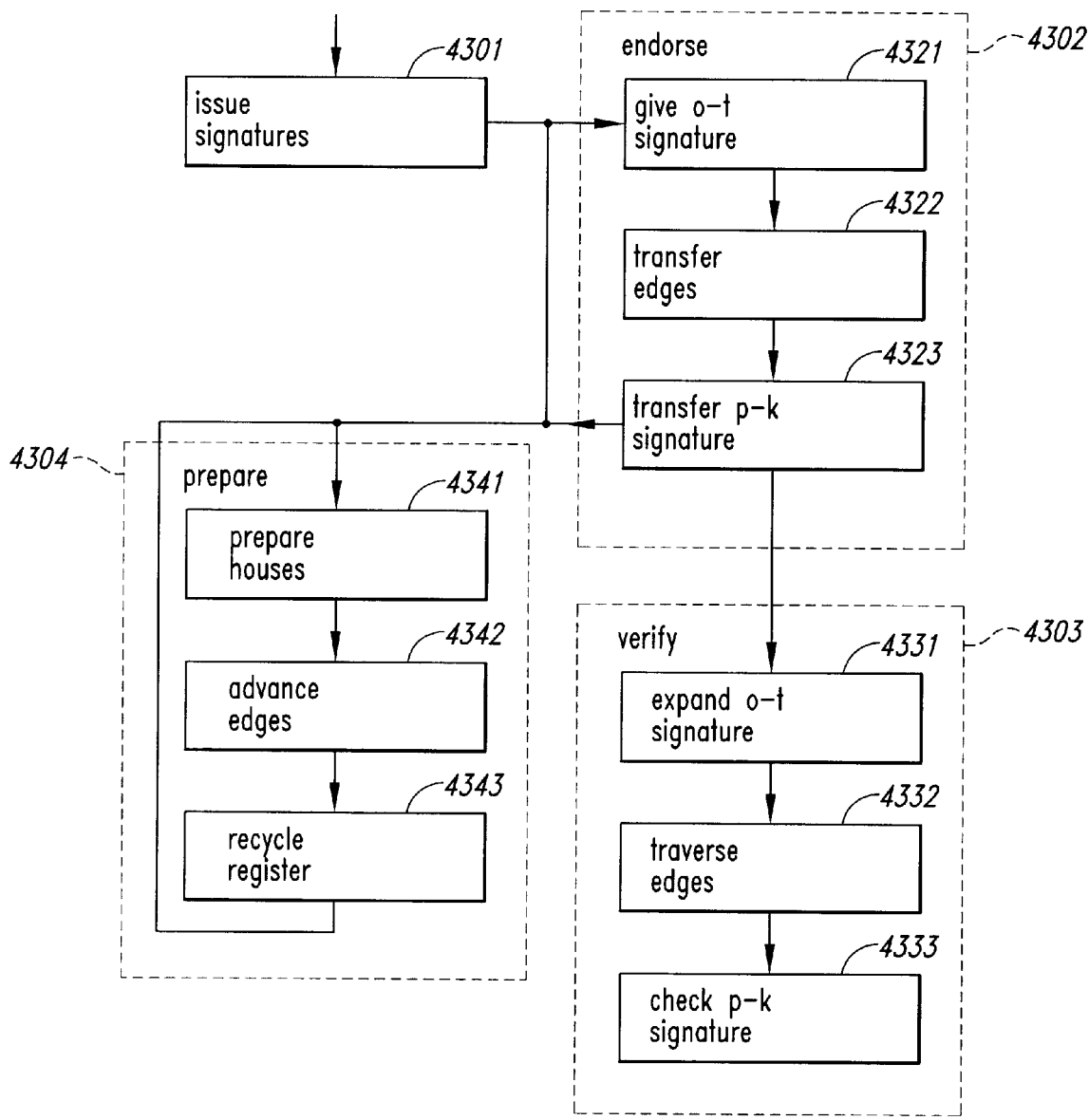
Figure 44:
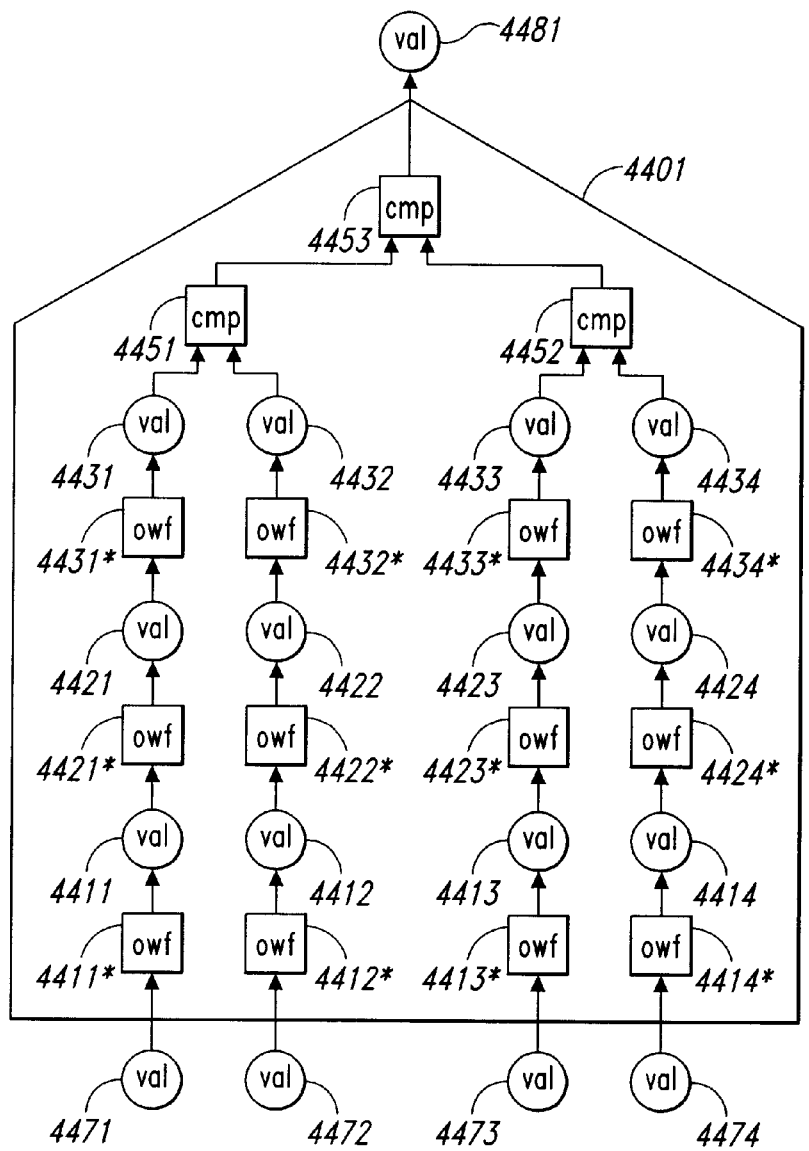
Figure 45A:
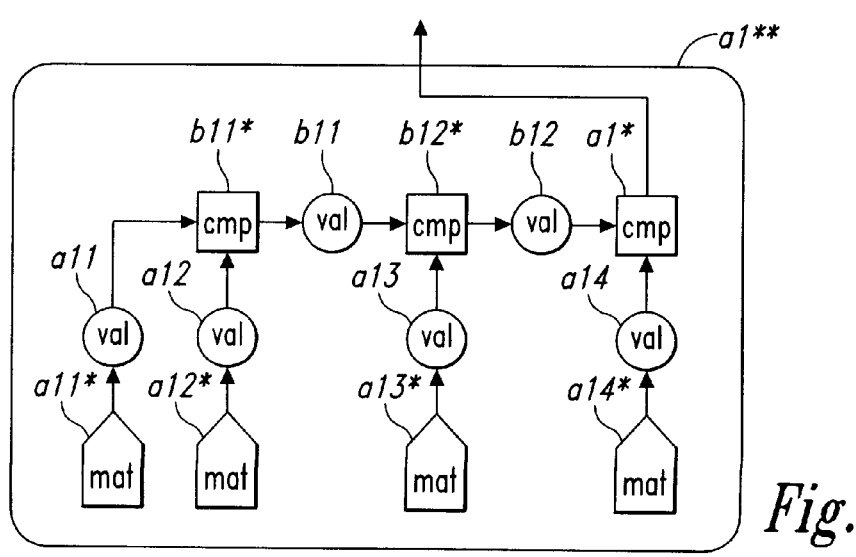
Figure 45B:
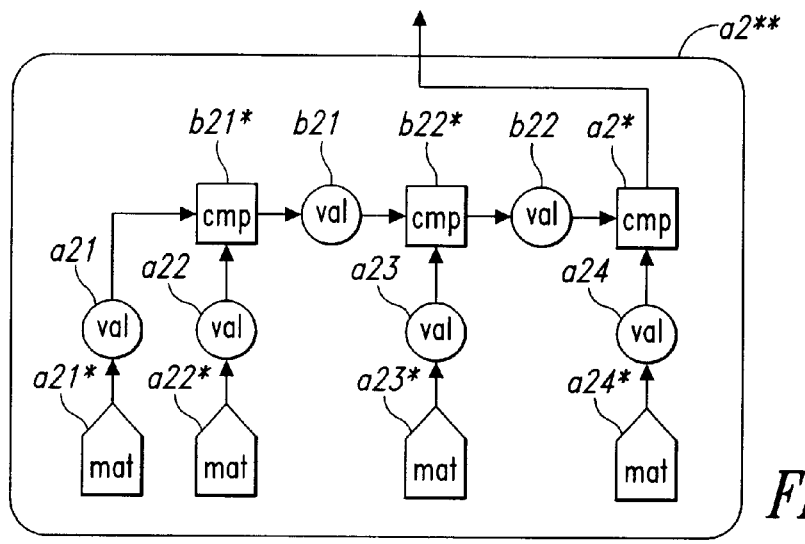
Figure 45C:
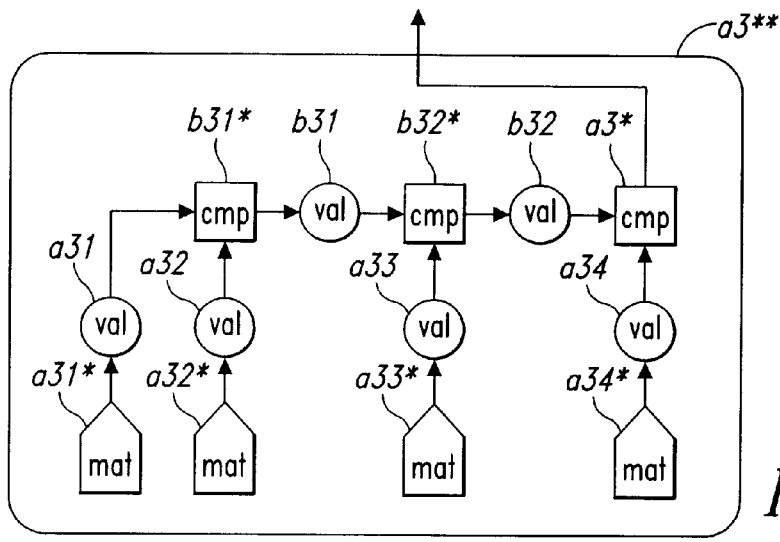
Figure 45D:
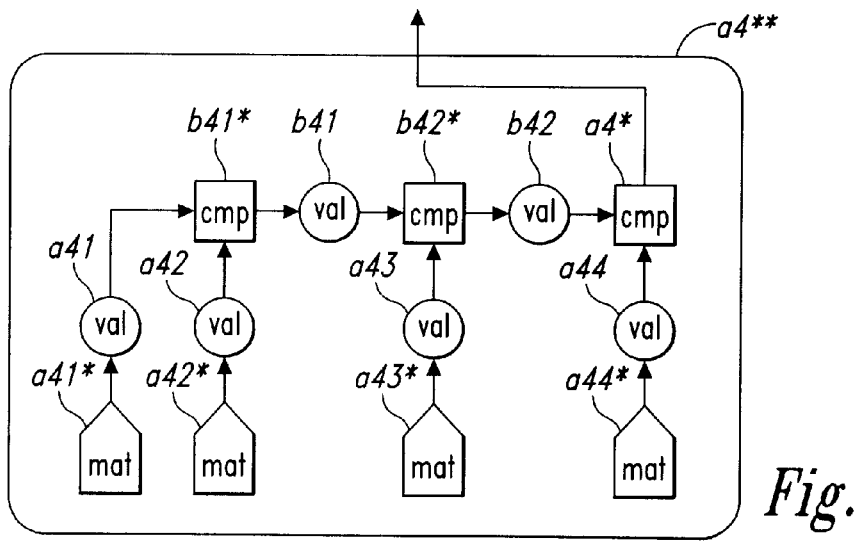
Figures 45E, 46:
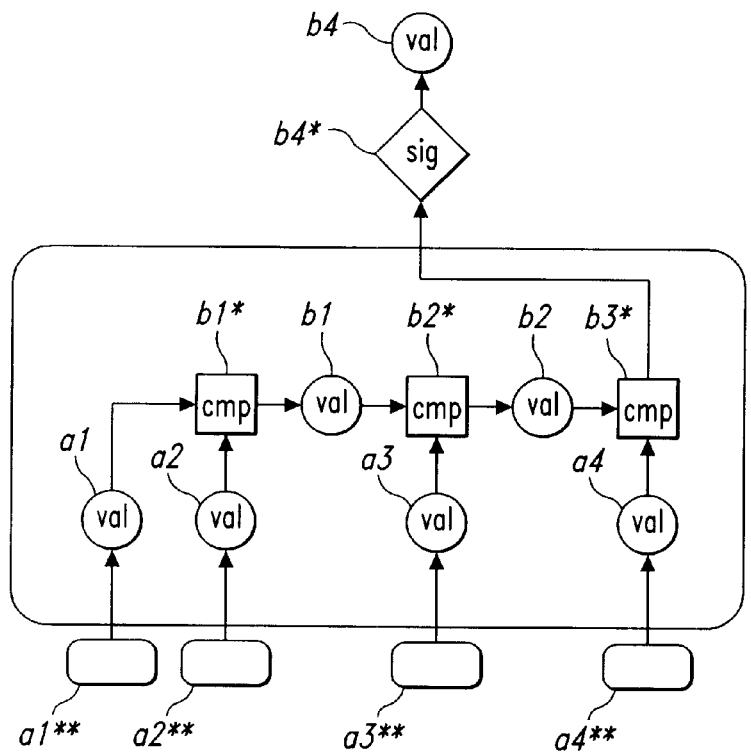
Figures 47, 48, 49:
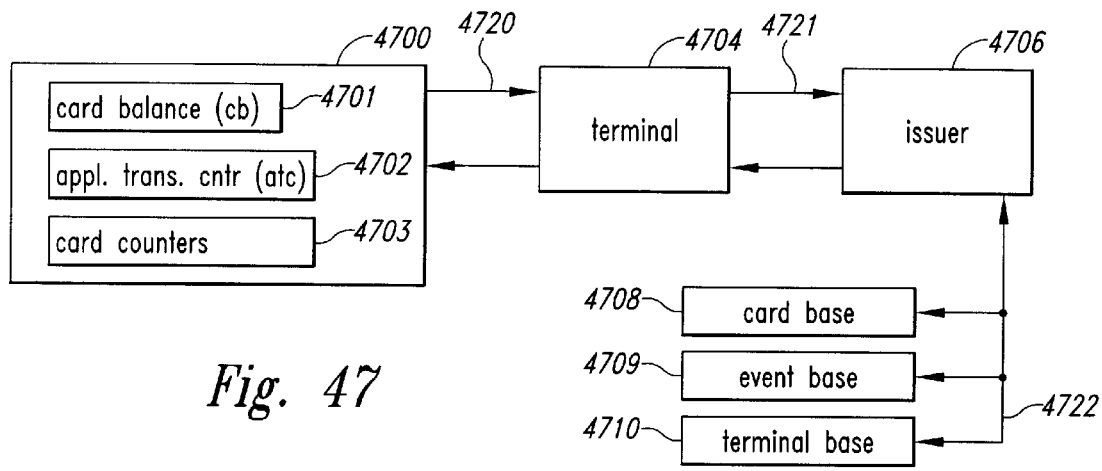
Figure 50:
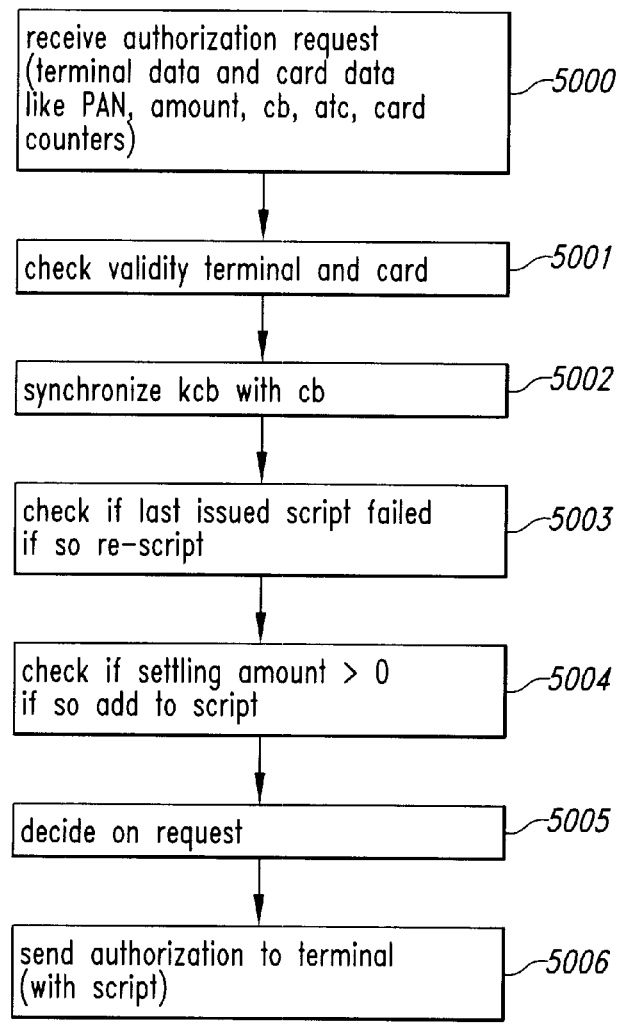
Figure 51:
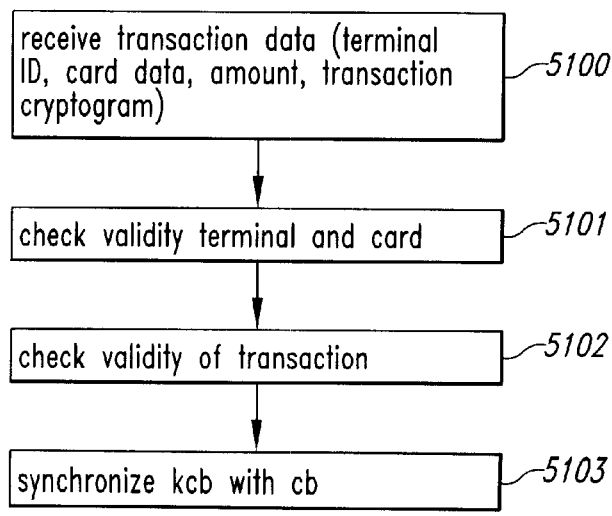
Figure 52A:
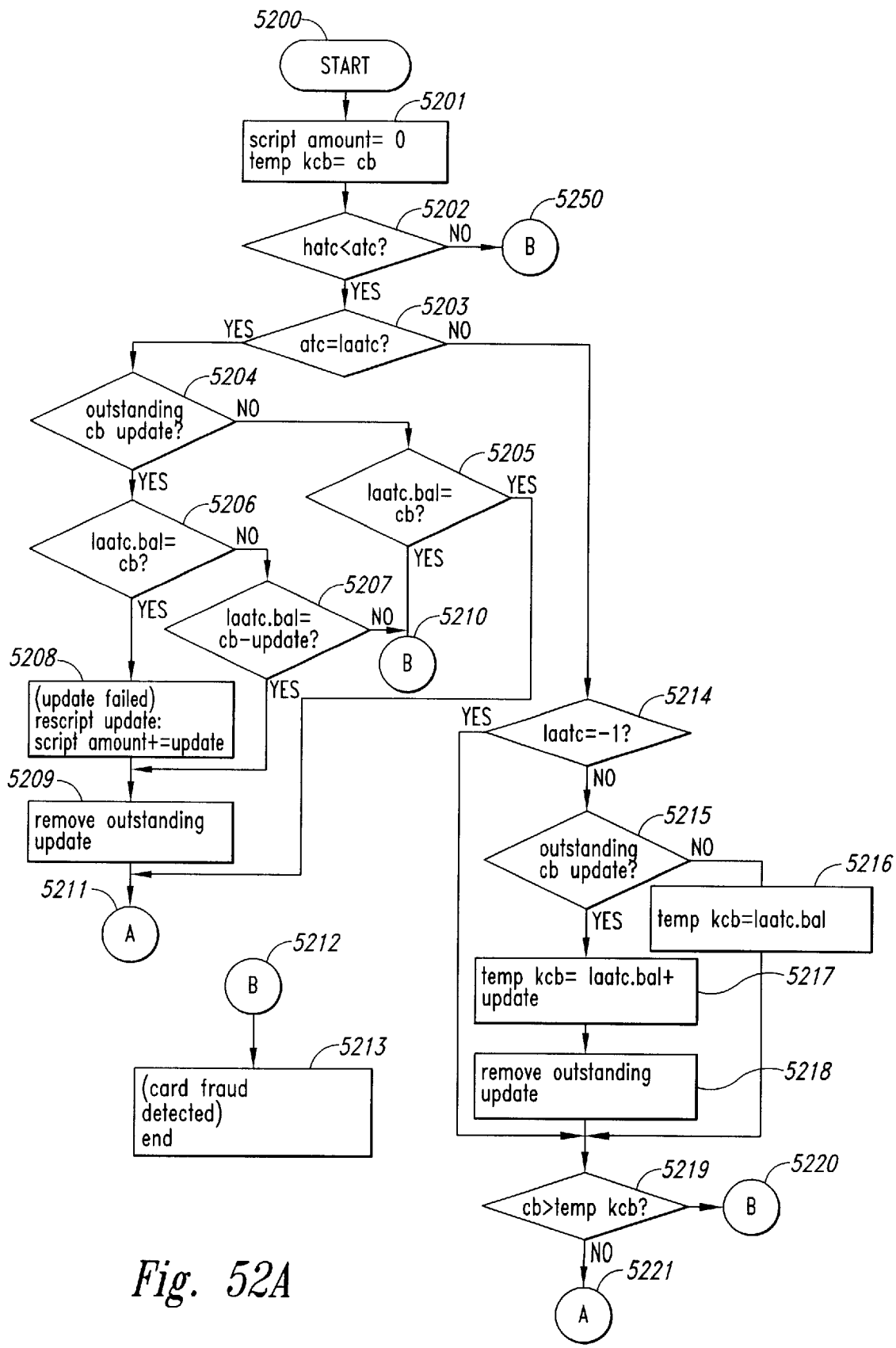
Figure 52B:
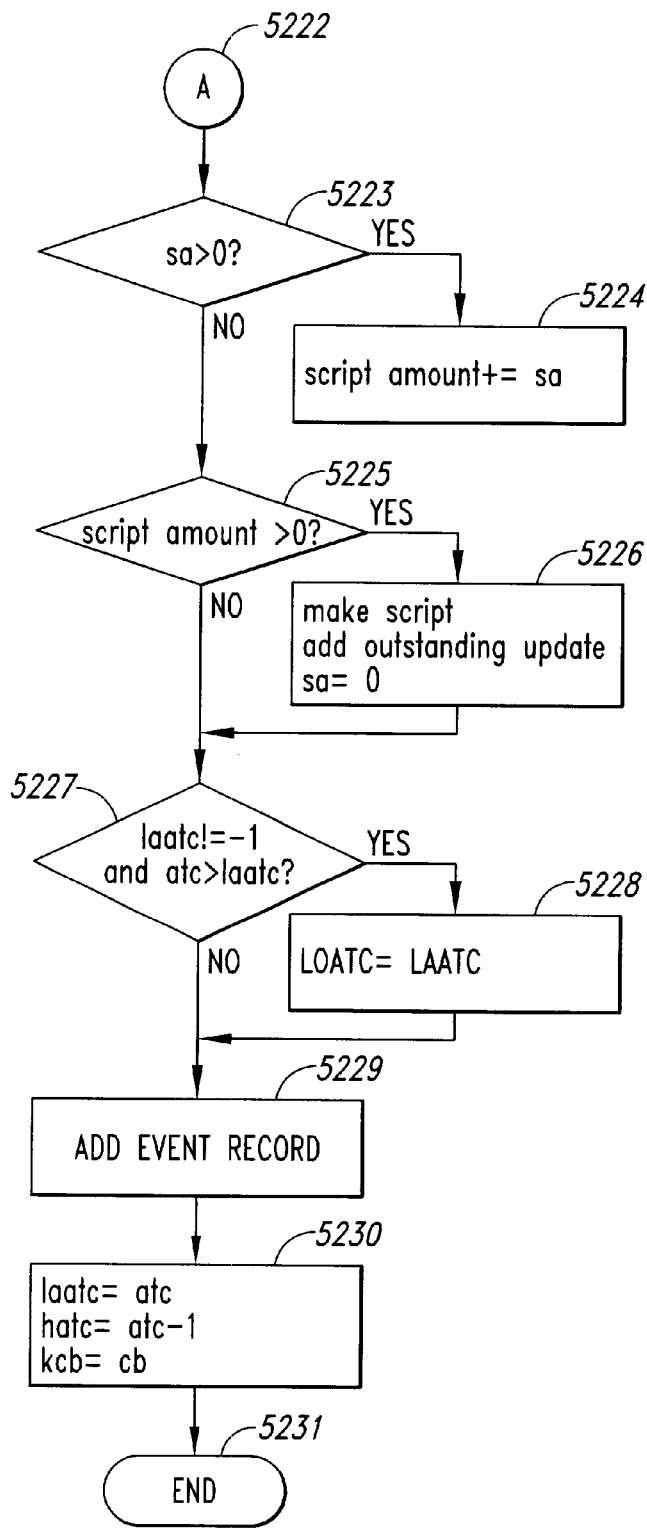
Figure 53:
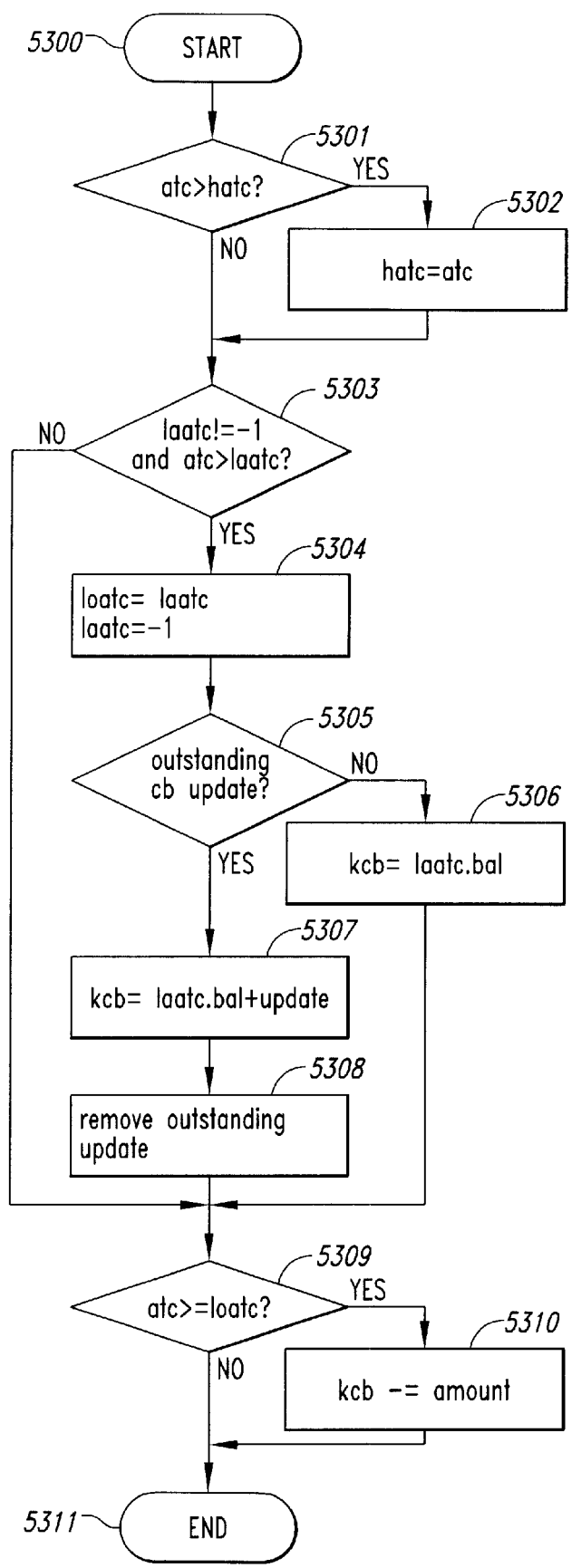

FIG. 8 shows a flowchart of a preferred embodiment of a card cancel process in accordance with the teachings of the present invention, which, together with FIGS. 13, 14, 15, 16, 17, 18 and 19 is believed to implement a secure data storage system of said card, and which, in particular, when executed at the end of a session is believed to rollback all the results on the card non-volatile memory of said session;

FIG. 9 shows a combination block and functional diagram of a preferred exemplary embodiment of a one time signature structure called a house in accordance with the teachings of the present invention;

FIG. 10 shows a combination block and functional diagram of a public key issuing party, in accordance with the teachings of the present invention;

FIG. 11 shows a block and functional diagram of a non-volatile memory model in accordance with the teachings of the present invention, which is believed to describe the write and erase behaviour of most types of non-volatile memory used in the art, in particular the write and erase behaviour of EEPROM;

FIG. 12 is a block diagram showing the use of volatile and non-volatile memory in a preferred embodiment of a card in accordance with the teachings of the present invention;

FIG. 13 shows a flowchart of a preferred embodiment of a card start update process, in accordance with the teachings of the present invention, which, together with FIGS. 8, 14, 15, 16, 17, 18 and 19 is believed to implement a secure data storage system of said card;

FIG. 14 shows a flowchart of a preferred embodiment of a card delete frame[i] process in accordance with the teachings of the present invention, which, together with FIGS. 8, 13, 15, 16, 17, 18 and 19 is believed to implement a secure data storage system of said card;

FIG. 15 shows a flowchart of a preferred embodiment of a card write frame[t,access,data] process in accordance with the teachings of the present invention, which, together with FIGS. 8, 13, 14, 16, 17, 18 and 19 is believed to implement a secure data storage system of said card;

FIG. 16 shows a flowchart of a preferred embodiment of a card reset process in accordance with the teachings of the present invention, which, together with FIGS. 8, 13, 14, 15, 17, 18 and 19 is believed to implement a secure data storage system of said card;

FIG. 17 shows a flowchart of a preferred embodiment of a card commit process in accordance with the teachings of the present invention, which, together with FIGS. 8, 13, 14, 15, 16, 18 and 19 is believed to implement a secure data storage system of said card;

FIG. 18 shows a flowchart of a preferred embodiment of a card find frame[t] process in accordance with the teachings of the present invention, which, together with FIGS. 8, 13, 14, 15, 16, 17, and 19 is believed to implement a secure data storage system of said card;

FIG. 19 shows a flowchart of a preferred embodiment of a card read frame[t] process in accordance with the teachings of the present invention, which, together with FIGS. 8, 13, 14, 15, 16, 17, and 18 is believed to implement a secure data storage system of said card;

FIG. 20 is a combination block and functional diagram showing mechanisms of encrypting data with a session-state and chaining data in said session-state chain and decrypting data with said session-state and chaining data in said session-state, in accordance with the teachings of the present invention;

FIG. 21 is a combination block and functional diagram showing the mechanism of 'crypting' data with a session-state and chaining data in said session-state as performed in the preferred embodiment of a card, and the mechanism of 'crypting' data with said session-state and chaining data in said session-state as performed in the preferred embodiment of a terminal, in accordance with the teachings of the present invention, which are believed to implement an encrypt decrypt pair, as shown in FIG. 20;

FIG. 22 is a combination block and functional diagram showing a preferred exemplary implementation of a mechanism of 'crypting' data with a session-state and chaining data in said session-state as performed in a preferred embodiment of a card, in accordance with the teachings of the present invention, which, together with the mechanism showed in FIG. 23, are believed to implement the mechanisms as shown in FIG. 21;

FIG. 23 is a combination block and functional diagram showing a preferred exemplary implementation of a mechanism of 'crypting' data with a session-state and chaining data in said session-state as performed in a preferred embodiment of a terminal, in accordance with the teachings of the present invention, which, together with the mechanism showed in FIG. 22, are believed to implement the mechanisms as shown in FIG. 21;

FIG. 24 shows a flowchart of a process called 'session' which involves a card and a terminal in a preferred embodiment, in accordance with the teachings of the present invention;

FIG. 25 shows a flowchart of a detail process called 'start session and proof keys', involving actions by a terminal, actions by a card and communication between said card and said terminal, in accordance with the teachings of the present invention, which, together with FIGS. 26 and 27 are believed to implement the process of FIG. 24;

FIG. 26 shows a flowchart of a detail process called 'command and exchange data', involving actions by a terminal, actions by a card and communication between said card and said terminal, in accordance with the teachings of the present invention, which, together with FIGS. 26 and 27 are believed to implement the process of FIG. 24;

FIG. 27 shows a flowchart of a detail process called 'commit session and end session', involving actions by a terminal, actions by a card and communication between said card and said terminal, in accordance with the teachings of the present invention, which, together with FIGS. 26 and 27 are believed to implement the process of FIG. 24;

FIG. 28 shows a flowchart of an EMV transaction process, involving actions by a terminal, actions by a card, actions by an issuer and communication between said card and said terminal and between said terminal and said issuer in a preferred embodiment, in accordance with the teachings of the present invention;

FIG. 29 is a flowchart showing all possible successful executable series of commands, issues by a terminal and performed by a card in a preferred embodiment, in accordance with the teachings of the present invention;

FIG. 30 shows a flowchart of a Commit-Challenge-Response process involving actions by a terminal, actions by a card and communication between said card and said terminal, in accordance with the teachings of the present invention;

FIG. 31 shows a flowchart of a non single execution path process and a single execution path process, both assigning values to variables depending on a conditional in accordance with the teachings of the present invention, which are believed to have the same result on the assigned variables;

FIG. 32 shows a flowchart of a 'Get Proof' process in a preferred embodiment, involving actions by a terminal, actions by a card and communication between said card and said terminal, in accordance with the teachings of the present invention;

FIG. 33 shows a flowchart of a process of performing a 'script' in a preferred embodiment, involving actions by a terminal, actions by a card and communication between said card and said terminal, in accordance with the teachings of the present invention;

FIG. 34 shows five detail flowcharts of processes called 'start session 1', 'start session 2', 'get frame', 'put frame' and 'kill frame' in a preferred embodiment, involving actions by a terminal, actions by a card and communication between said card and said terminal, in accordance with the teachings of the present invention in accordance with the teachings of the present invention;

FIG. 35 shows five detail flowcharts of processes called 'debit frame', 'redebit frame', 'public debit', 'commit' and 'done' in a preferred embodiment, involving actions by a terminal, actions by a card and communication between said card and said terminal, in accordance with the teachings of the present invention in accordance with the teachings of the present invention;

FIG. 36 shows five detail flowcharts of processes called 'get proof', 'select file', 'manage application 1', 'manage application 2' and 'get data' in a preferred embodiment, involving actions by a terminal, actions by a card and communication between said card and said terminal, in accordance with the teachings of the present invention in accordance with the teachings of the present invention;

FIG. 37 shows five detail flowcharts of processes called 'get file', 'generate AC 1', 'generate AC 2', 'external authenticate' and 'verify' in a preferred embodiment, involving actions by a terminal, actions by a card and communication between said card and said terminal, in accordance with the teachings of the present invention in accordance with the teachings of the present invention;

FIG. 38 shows a detail flowchart of a process called 'get last AC' in a preferred embodiment, involving actions by a terminal, actions by a card and communication between said card and said terminal, in accordance with the teachings of the present invention in accordance with the teachings of the present invention;

FIG. 39 shows a combination block and functional diagram of a preferred embodiment of a compact endorsement signature system involving four sets of parties in accordance with the teachings of the present invention;

FIG. 40 shows the non-volatile memory contents in accordance with the teachings of the present invention of the preferred exemplary compact endorsement signature structure of FIG. 5 by means of a tabular arrangement of town values, notations and actions;

FIG. 41 shows the operational steps in accordance with the teachings of the present invention of the preferred exemplary compact endorsement signature structure of FIG. 5 by means of a tabular arrangement of town values, notations and actions;

FIG. 42 shows a combination block and functional diagram of an exemplary embodiment of an endorser party in accordance with the teachings of the present invention;

FIG. 43 shows a flowchart of a general endorsement scheme process in accordance with the teachings of the present invention;

FIG. 44 shows an exemplary one-time signature structure in accordance with the teachings of the present invention;

FIG. 45 shows a preferred exemplary endorsement structure in accordance with the teachings of the present invention, in which FIGS. 45a–45d are exemplary first level cascade structures and FIG. 45e is an exemplary second level cascade structure;

FIG. 46 shows the operational steps in accordance with the teachings of the present invention of the exemplary structures of FIG. 45 by means of a tabular arrangement of registers names and notations;

FIG. 47 shows a combination block and functional diagram of the interaction between a card and the issuer in the preferred embodiment of a system like FIG. 1, with details added to card entity concerning some registers, and details added to the issuer entity concerning maintained databases in accordance with the teachings of the present invention;

FIG. 48 shows a block diagram of a preferred embodiment of a record in a card database of FIG. 47 in accordance with the teachings of the present invention;

FIG. 49 shows a block diagram of a preferred embodiment of a record in a event database of FIG. 47 in accordance with the teachings of the present invention;

FIG. 50 shows a flowchart of a preferred embodiment of a issuer process that mainly synchronizes the issuers known balance with a card balance during an on-line transaction, in accordance with the teachings of the present invention;

FIG. 51 shows a flowchart of a preferred embodiment of a issuer process that mainly synchronizes the issuers known balance with a card balance during the clearing process of off-line transactions, in accordance with the teachings of the present invention;

FIG. 52 shows a flowchart of an exemplary implementation of the process FIG. 50, in accordance with the teaching of the present invention; and FIG. 53 shows a flowchart of an exemplary implementation of the process FIG. 51, in accordance with the teaching of the present invention.

BRIEF SUMMARY OF THE INVENTION

In accordance with the forgoing and other objects of the present invention, a brief summary of some exemplary embodiments will now be presented. Some simplifications and omissions may be made in this summary, which is intended to highlight and introduce some aspects of the present invention, but not to limit its scope in any way. Detailed descriptions of preferred exemplary embodiments adequate to allow those of ordinary skill in the art to make and use the inventive concepts are provided later.

An endorsement scheme that allows preferably hundreds of endorsements to be stored in less than a thousand bytes on a simple microcontroller smart card would be commercially interesting, but cannot be achieved by techniques known in the prior art. The present invention overcomes these limitations of the prior art.

The inventive concept provides hierarchical structuring of multiple one-time signatures within a single public key signature. The hierarchy is formed from compressing one-way functions, also sometimes known as hash or message digest functions, serving as the internal "nodes" in a special tree structure. The tree's "leaves" are the one-time signatures and its "edges" are values that are inputs and sometimes outputs of the compression functions. Thus the root represents the final compression of all the one-time signatures in the structure, and the output of this compression is signed by the digital signature technique.

Each endorsement involves a subset of the tree including the single one-time signature that is used in, and only in, that endorsement. Also in the subset is the public key signature and a path of edges from the leaf to the root. The values represented by all edges incident in the nodes of the path, apart from those edges on the path, are included.

The endorsements are made in an order that, in cooperation with the structuring, lets the card use a relatively small number of non-volatile registers at each stage. Furthermore, the amount of computation required between each endorsement is also limited to a small amount. Moreover, stepping from the last one-time signature in one digital signature to the first of the next digital signature requires essentially only the same resources as stepping between any two one-time signatures within the same digital signature.

One of the particular preferred embodiments, which is disclosed in detail later, uses a "cascade" of two-argument compressing functions as a building block. The first compressing function in the cascade takes two inputs from outside the cascade. All subsequent compresses in the cascade taken one argument from the previous compress and one from outside the cascade. Thus, with only an output of one compress in a cascade along with all subsequent inputs to the cascade, the output of the entire cascade can be verified.

The cascades are structured into a low hierarchy, preferably only two high, although any hierarchy could be used. The cascades at the low level, called "streets," take their inputs directly from one-time signatures, called "houses." The cascades at the higher level, called "towns," take their inputs from the outputs of the cascades at the lower level. Thus, a complete ordering is imposed on the houses of a street and the streets of a town.

Roughly stated, in the preferred embodiment, the endorsements may be thought of as proceeding from house to house in order. When a house is visited, its one-time signature is used in an endorsement. In addition to this "actual" traversal for endorsements, there are two "preparatory" traversals conducted in parallel.

The first preparatory traversal moves down the next street visiting almost all the houses. (If there is a next street in the current town ordering, this is traversed; if there are no more streets in the current town, then the first street in the next town is traversed). The purpose of the first preparatory traversal is to obtain and store the leaf edges for a street so that they are ready when that street is entered and the first house is used in an endorsement.

The second preparatory traversal moves through the next town. The purpose of this traversal is to obtain and store the edges coming from all the streets of the next town, except the first street. These will be needed in endorsements when the new town is initially entered by the actual traversal and endorsements are coming from its first street.

Tamper resistant devices often store some information in non-volatile memory. The preferred embodiment is capable of atomic multi-updates allowing several modifications in the non-volatile memory to be done all at once, even under arbitrary interruptions. Secrecy of critical data is maintained under attacks involving UV irradiation of the smart card chip, while at the same time allowing recovery in the case of technical failures.

Sessions are introduced which cryptographically link the actions that make up a transaction, ensuring that the constituent actions are all performed in order and without any other actions in-between. The sessions also provide a single proof system for an entire transaction, eliminating the need for specialized elementary actions for specific transactions. Even under arbitrary interruption the sessions ensure that either the transaction is completed and the cryptographic proofs exchanged properly, or the transaction is not executed at all.

In the preferred embodiment the tamper-resistant device does not reveal any information to the terminal in addition to the information explicitly communicated with the terminal, even if the terminal performs any or all of a general set of additional measurements on the card while it is in operation.

Several clearing methods are described which allow adequate clearing and settlement of financial and other transactions to occur without the need for a tamper-resistant device in the terminal or the need to communicate full transaction data form the terminal to the acquirer/issuer.

The EMV system is extended and generalized. The terminal's interests are properly protected by including a proper off-line authentication of the transaction data. The EMV system is generalized to provide all the functions needed for implementation of a wide variety of payment applications.

DETAILED DESCRIPTION OF PREFERRED EMBODIMENTS

The drawing figures and the detailed descriptions provided later make a number of simplifying assumptions for concreteness and for clarity in exposition. It will be appreciated, however, that these should not be taken to limit the scope of the invention.

Some lines and arrows in the drawing figures represent messages, which may be held initially or delayed on their way, passed through various parties, encoded and decoded cryptographically or otherwise to provide their authenticity and/or secrecy and/or error detection and/or error recovery. Thus the particular means or methods whereby messages are transferred are not essential to the present invention, and it is anticipated that any technique may be employed in this regard.

As will be appreciated, someone of ordinary skill in the art would be familiar with Bruce Schneier 1994 "Applied Cryptography, Protocols, Algorithms, and Source Code in C" and with the references contained therein. As will also be appreciated, someone of ordinary skill in the art would be familiar with Donald E. Knuth 1981, "The art of computer programming" parts 1 "Fundamental algorithms" and 2 "Seminumerical algorithms", and with the references contained therein.

Some background on the parameter values that are believed to apply, as will be appreciated, serves as a basis for some of the tradeoffs made in the preferred embodiment.

A typical user transaction should, it is believed, not introduce more than roughly a second delay if it is to be perceived as acceptably fast. Of course, highway-speed road tolls, and even mass transit situations, may require substantially faster transactions. The endorsement signatures are well suited to such high-speed transaction, as has been illustrated in the second above included reference.

An RSA signature today is minimally 64 bytes. Other digital signatures might be one third the size. The output of a compressing one-way or hash function is typically 16 bytes. A one-way function input or output can typically be 8 bytes. A smart card of one kilobyte non-volatile memory, already mentioned as a currently commercially interesting target for the invention, typically has various competing uses for its non-volatile storage. It is believed that less than the whole amount would be available for storage of signatures and other values needed in endorsement. Examples include identification data related to manufacturing and distribution, cryptographic keys for securing communication with an issuer, registers to hold card balance(s), transaction records, public key certificates of the issuer, key validity data, and so forth.

A blockcipher operation that might typically be used in constructing a one-way function can, it is believed, typically be done by a smart-card microcontroller between 100 and 400 times per second, depending on a variety of factors. At least several applications of such a blockcipher are anticipated to be required to implement a hash or compression function. A reading device can use special circuitry to compute blockciphers, it is believed, about two orders of magnitude faster.

Transmission of data between a smart card and the reading device is believed typically to be at about 1000 bytes per second, but can be sped up by at least a factor of 4 under some standard procotols.

Some general notions regarding cryptographic techniques will now be presented.

Assigning a variable a "random" value performs the function of creating a value that should not be readily determined by at least some party. Many means and methods are known in the art for generating such unpredictable quantities, often called keys. Some are based on physical phenomena, such as noise in semiconductors, or patterns detected in humans pushing buttons, or possibly deterministic cryptographic techniques sometimes called pseudorandom generators. It is well known in the art that these various techniques can often be combined, and that post-processing can often improve the results. Thus the particular means or methods whereby random values are derived is not essential to the present invention, and it is anticipated that any technique may be employed in this regard.

A "compression" function, as has already described, is an example of a technique very well known in the art as a hash or message digest function. Such a function takes an input larger than its output. It is believed computationally prohibitive, given the output, to find back any input that would yield it, even if some of the inputs are known.

The term "party" is used herein to indicate any entity with control over at least the secrecy of some information, usually at least one key. It is anticipated that a plurality of people may each know all or in effect part of some key, and they might be thought of collectively as a party. In other cases, a key may be substantially unknown to people, and reside in some physical device, and then the device itself or those who control it from time to time may be regarded as parties.

The method or means whereby information is transferred between parties is not essential to the present invention, and may be accomplished in any suitable way. For instance, output and input means may be brought into physical proximity with each other, or they may communicate remotely by any kind of communication network or technique. The information may be encoded in various forms, some of them cryptographic, and decoded and transformed between coding on its way. Similarly the information may be stored and/or detained in various forms and by various parties along the way.

The choice of party names, forms, and the number of parties are examples of choices made for clarity and convenience. Naturally, the inventive concepts disclosed here should not be interpreted as limited to a particular type, grouping, or multiplicity of parties nor should there be any other implications or naming conventions or the like.

Turning now to FIG. 39, general descriptions of the interconnections and cooperation of the constituent parts of some exemplary embodiments of the inventive concepts will now be presented.

Signature issuer party 3941, referred to for simplicity as the issuer, has at least a private key. A corresponding public key is made known at least to endorsee 3943 (as will be more fully described) and to any additional verifiers 3944.

Signature transporter and endorser party 3942, herein referred to simply as endorser, receives the signatures from issuer 3941 as shown by line 3951. Endorsee and verifier 3943, referred to for simplicity as endorsee 3943, receives an endorsement from endorser 3942 as indicated by line 3952. Additional verifier 3944 may also verify the endorsement, shown for simplicity as coming from endorsee over line 3953.

As will be appreciated, but is not shown for clarity, there may be plural instances of each party type. For example, there may be multiple endorsers, each endorsing signatures issues by the same issuer. There may be multiple endorsees, each capable of receiving an endorsement from any one of plural endorsers. There may be multiple additional verifiers, any one of which may be capable of verifying endorsements received from plural endorsees or others. Moreover, there may be plural issuers, some of which are capable of issuing identical signatures as well as others of which that are not.

Each signature is related to a message, the origin or which is not essential to the inventive concepts. Messages could, for example, come from the issuer 3941, the endorser 3942, endorsee 3943, or verifier 3944, random sources, external events, or combinations of these. Any of the aforementioned parties may be aware of the message before they cooperate in an endorsement, or one or the other of them may supply all or parts of the message to the other, which is not being shown for clarity.

Turning now to FIG. 42, general descriptions of the interconnections and cooperation of the constituent parts of some exemplary embodiments of the inventive concepts will now be presented for endorser 3942.

A smart card 4200 or other portable data carrier, as will be appreciated, may perform the role of endorser 3941. It may be considered to be composed of several interconnected parts. The i/o interface 4201 communicates with the outside world, such as issuer 3941 and endorsee 3943 through interface link 4206, which may be galvanic contacts or contactless technology, as are well known in the smart card art. Also there may be special circuits or firmware for computing cryptographic functions 4204. Furthermore, control means 4202 manages the operation and coordination of the other parts. Most important for the present purposes are registers 4203 for storing values. These may be regarded as of two types, nonvolatile and temporary. All these components may cooperate together and/or with the i/o interface 4201, through mutual interconnection means shown for simplicity as bus 4205. An example embodiment would be in the Motorola SC-24 smart card chip, or near equivalents manufactured by Thompson Semiconductors for instance, and these may be embedded in industry standard smart cards.

Turning now to FIG. 43, general descriptions of the function and process steps of some exemplary embodiments of the inventive concepts will now be given.

The first step, as shown by flowchart box 4301, is the issuing of a compact endorsement signature by the issuer 3941 to the endorser 3942. This entails creating in turn all the houses and the edges. Then a digital signature is formed on the root output as already described. Although not shown explicitly for clarity, it will be understood that blind signature techniques could be used in the issuing process. For instance, it will be readily understood by those of skill in the art, an intermediary party not shown for clarity could form the one-time signatures and compression tree, provide it to a signer in a blinded form, and supply an unblinded form of the result to the endorser. Related techniques are also disclosed in the second above included reference.

Dashed box 4302 shows the endorse function. One component is box 4321 which forms a one-time signature that corresponds to the message. This is done by developing each digit to the point in the cascade required to encode the part of the message or the control, as is well known in the one-time signature art and as will also be described in more detail with reference to FIG. 44. This signature is given from the endorser to the endorsee 3943 for verification. The transfer of at least the edges needed to verify the signature, as already mentioned, is shown in box 4322. The digital signature is also provided from the endorser to the endorsee as shown in box 4323.

Dashed box 4303 represents the verification function performed by the endorsee on the compact endorsement signature provided as a result of the already mentioned dashed box 4302. First the one-time signature is shown as expanded in box 4331, which would for instance be the form with the most applications of the one-way function(s) applied. The result of this can then be used together with the edges supplied in box 4322, already mentioned, to traverse by application of compression function nodes all the way to the root. This results in the value upon which the digital signature mentioned already with reference to box 4321 is checked, as shown in box 4333. The signature need not be the type known in the art as that allowing "message recovery," since the edges of the compression tree are provided. Of course if the signature verifies, then the endorsee accepts it, otherwise not.

Dashed box 4304 depicts the preparation process. It may involve substantial computation between each endorsement, but it may also involve no computation, as indicated by the straight through return path. One aspect of preparation, indicated by box 4341, entails evaluating houses. These may for instance, and as already mentioned, be in the next street or town. When houses are fully evaluated the results will serve as input edges to compression nodes, as already mentioned. Box 4342 depicts the compression of edges and the saving in registers of the results, which may free up the need to store involved input registers or house outputs. Also as non-volatile storage becomes available to store new values, the old values should be erased or at least written over by the new values, as indicated by box 4343.

As would be appreciated by those of ordinary skill in the art, these various preparation steps could be performed at various times and in various orders without departing from the spirit of the present invention. For instance, in some settings the preparation may produce exactly what is needed for the next endorsement; in other cases, some preparation for a number of future endorsements may be made whenever there is time to do so. Although such preparation for future endorsements is not shown explicitly for clarity, it will be understood that employing some extra registers and storing in them the values that would be calculated some steps in advance, allows for such steps to be taken without requiring preparation.

Preparation may be made just before an endorsement or just after an endorsement or during an endorsement or while the endorser is idle. Another possibility, without attempting to be exhaustive, may occur substantially soon after a signature issuing, or at another time when no preparation is needed and the whole preparation dashed box may be passed through.

With reference to the above mentioned application of credit/debit card transactions and the like, some novel extensions to the operation shown in FIG. 43 just described will now be disclosed that are not shown for clarity but that will be understood by those of skill in the art.

Both on-line and off-line transactions are considered here. In a first type of on-line transaction, there may be at least a challenge issued on-line to an endorser and a response back on-line from the endorser, the concept of such challenge response protocols being well known in the art. The endorser might typically be a smart card.

In a second type of on-line application a transaction may comprise a single message sent on-line from the terminal receiving the endorsing card and a single corresponding response received by the terminal on-line from a server. In this second type of transaction, it will be understood by those of skill in the art that the message endorsed should contains a challenge value and that this challenge value is preferably derived from a "challenge seed" substantially at least influenced by a "modifier" sent in the substantially previous on-line transaction. The seed as will be understood, could for instance be essentially a stored value of the same type as would be used as a challenge in the first type of application, in which case the modifier would be simply a stored challenge. Or, it could also be a value that is updated in various ways, such as cryptographically, depending on the seed modifier(s) sent. The seed thus allows the terminal to develop a valid challenge that would be unpredictable even to someone with access to the terminal's inner workings.

In either type of on-line transaction, the response should depend on the challenge and could be the endorsement as described here. Or the response could be a conventional cryptographic authentication, as are well known in the art, and the full endorsement could be stored at the terminal for later forwarding or audit.

In off-line transaction, a challenge value is believed preferable that is similarly unpredictable as with an on-line transaction. A terminal that goes on-line sometimes, it will be understood, can update its challenge seed at those times and advance its challenge values through a sequence at least depending on this challenge seed. The result, it will be understood, is a sequence of challenge values that is unpredictable at least across on-line transactions.

While it is believed that the notation of FIG. 44 and FIG. 45 would be clear to those of ordinary skill in the art, it is first reviewed here for definiteness. Several symbols are used: circles stand for register values; house shaped blocks to be described with reference to FIG. 44 indicate one-time signatures; round-corner rectangles symbolize compression cascades; and diamond boxes are used to represent public key digital signatures. The lines and arrows show the edges that define the flow of outputs to inputs; arrows entering or leaving a diagram of course show the inputs of outputs, respectively, of the diagram.

The notation of FIG. 46 is a tabular arrangement of numbers and special symbols, the meaning of which will be described later with reference to that figure.

Turning now to FIG. 44, a preferred embodiment of a one-time signature structure will now be described in detail.

House shaped box 4401 shows the one-time signature itself. Its shape is used in FIG. 45, to be described, as an icon for the one-time signature. The particular dimensional parameters, 4 inputs and 3 internal stages, are chosen as illustrations for clarity and definiteness, but such choices are not intended to limit possible values or to imply the need for such a rectangular structure. Some embodiments may use smaller parameter values and others larger parameter values such as, for instance, 8 by 8. There are four input values, 4471 through 4474. Each input is mapped by a one way function, 4411* through 4414*, to produce an intermediate value 4411 through 4414, respectively. The next stage uses these values, 4411–4414, as inputs to the one-way functions 4421*–4424*, respectively, whose outputs define values 4421–4424, respectively. The final stage of one-way functions, 4431*–4434*, takes the values 4421–4424 as inputs and produces values 4431–4434, respectively.

The outputs of the final stage of one-way functions are shown being compressed by a hierarchy of two-input compressors for definiteness, although any suitable compressing structure might be used. Values 4431 and 4432 are compressed by compressor 4451, whose output feeds compressor 4453; values 4433 and 4434 are compressed by compressor 4452, whose output feeds the other input of compressor 4453. The output of compressor 4453 is shown as the final output 4481 of the one-time signature.

Two types of operations are performed on houses. One operation is computing there output by taking the input values 4471–4474 through the chains of one-way functions and through the compression hierarchy just described to produce output value 4481. The other operation is forming the one-time signature, as depicted in box 4321 already mentioned. The message to be signed is taken as a set of digits, as is well known in the art, and the one-way function chain corresponding to each digit is evaluated to a depth corresponding to the value of that digit. The output values corresponding to these one-way functions, one per digit, are the one-time signature.

Turning now to FIG. 45, a preferred embodiment of a compact endorsement signature will now be described in detail. The particular dimensional parameters, 4 streets each of 4 houses, has been chosen for clarity in exposition and definiteness, but such choices are not intended to limit possible parameters or to imply the need for such a regular structure. It is believed, however, that a roughly equal number of streets and houses does represent a good tradeoff. Larger parameter values, such as 8 streets of 8 houses, are believed also be a suitable choice in some circumstances.

The two level approach is believed best for the intended use. However, other structures can readily be derived from the inventive concepts disclosed here. Just to give one further exemplary embodiment, although not shown explicitly for clarity, it will be understood by those of skill in the art how a cascade can be split in two by a single compress inserted above it, without changing substantially the computation or register requirements, This would, for instance, allow the number of edges transferred to be reduced substantially.

Round-corner box a1** in FIG. 45A denotes a part of the structure referred to again in FIG. 45e, and may be called a street of 4 houses a11* through a14*, having output values a11 through a14, respectively. Each house stands for a one-time signature, as has already been described with reference to FIG. 44. Compressor b11* takes its inputs from values a11 and a12 and produces output value b11. Compressor b12* takes value b11 and value a13 as inputs and produces output b12. Similarly compressor a1* takes value b12 and a14 as inputs and produces output value to be further described with reference to FIG. 45E.

In like manner, round-corner box a2** in FIG. 45B denotes a part of the structure referred to again in FIG. 45E, and may be called a street of 4 houses a21* through a24*, having output values a21 through a24, respectively. Each house stands for a one-time signature, as has already been described with reference to FIG. 44. Compressor b21* takes its inputs from values a21 and a22 and produces output value b21. Compressor b22* takes value b21 and value a23 as inputs and produces output b22. Similarly compressor a2* takes value b22 and a24 as inputs and produces output value to be further described with reference to FIG. 45E.

Again in the same way, round-corner box a3** in FIG. 45C denotes a part of the structure referred to again in FIG. 45E, and may be called a street of 4 houses a31* through a34*, having output values a31 through a34, respectively. Each house stands for a one-time signature, as has already been described with reference to FIG. 44. Compressor b31* takes its inputs from values a31 and a32 and produces output value b31. Compressor b32* takes value b31 and value a33 as inputs and produces output b32. Similarly compressor a3* takes value b32 and a34 as inputs and produces output value to be further described with reference to FIG. 45E.

For the final similar street, round-corner box a4** in FIG. 45D denotes a part of the structure referred to again in FIG. 45E, and may be called a street of 4 houses a41* through a44*, having output values a41 through a44, respectively. Each house stands for a one-time signature, as has already been described with reference to FIG. 44. Compressor b41* takes its inputs from values a41 and a42 and produces output value b41. Compressor b42* takes value b41 and value a43 as inputs and produces output b42. Similarly compressor a4* takes value b42 and a44 as inputs and produces output value to be further described with reference to FIG. 45E.

In FIG. 45E, the four round-corner boxes a1 through a4, with their corresponding output values a1 through a4, respectively, are shown as inputs to a compression tree. The first compressor b1* takes its input from values a1 and a2; its output is value b1. Compressor b2* takes this output b1 and combines it with value a3 to produce value b2. In like fashion, compressor b3* transforms this output value b2 and value a4 into output b3*. Finally, this output value b3 serves as message input to public key digital signature producer b4* to produce compact endorsement signature b4.

Turning now to FIG. 46, the exemplary inventive structure already described with reference to FIG. 45 will now be provided with an operational description.

Each row of the table shown in FIG. 46 corresponds to a single endorsement. The rows of the table are numbered outside the table. Each column in the table corresponds to preferably nonvolatile register locations used to store values between endorsements. The carrot symbol ">" marks entries whose value has changed from the last row. A dot "." marks the entry whose value is the output of the house used in the endorsement corresponding to that row.

As will be appreciated, the first 4 columns are for clarity and convenience used to store the street edge values always in their street order positions. Only the part of the row from the entry marked by the dot up until and including the fourth column are needed for the current and any subsequent endorsements based on houses from the current street, except for a single output from any previous endorsement of the current street. The entries preceding the one marked by a dot are therefore largely available, are sometimes used to hold intermediate values, and are ultimately prepared with the values that they will need to contain when the next street is entered.

The last four entries in each row are used to hold the town edge values needed for the current endorsement. These values, as will be appreciated, are also always stored in order positions. As the streets are traversed, the early town edge values corresponding to the streets currently and previously traversed no longer need to be stored. The entries that they occupied may be used as temporary cells for developing and ultimately holding the town edge values that will be needed when the next town is entered.

For clarity in exposition, the town shown in the first rows has lower-case letters in its reference numbers, corresponding directly with the notation of FIG. 45. The second town shown appearing in later rows has all letters in the reference numerals shown in upper case.

Row 1 begins by showing the complete set of values for the first endorsement. Since the dot is on a11, the first house on the first street is used in the one-time signature. As will be apparent, the edge value for the first street, a1, is not needed since the first street is used; the hyphen symbol "-" indicates the lack of significant value held in this entry.

Row 2 shows that no changes in the register values are needed for this endorsement. All column entries except the second, which corresponds to the one-time signatures used in the endorsement, are explicitly transmitted by the endorser to the endorsee.

Row 3, the third endorsement, entails two changed register values, as indicated by the carrots. The first is b11, which is calculated as the compress of a11 and a12. Such compressions, as will occur later as well, may be taken as example of the "advance edges" function/step 4342 already described with reference to FIG. 43. The second, a22, is preparatory for the next street, and is calculated from the second house on the next street, as also shown in FIG. 45B.

Row 4 is the final endorsement for the first street. It requires a compress of b11 and a13 to obtain b12. Also the value of a23 is computed from the house a23*.

Row 5 is the first endorsement of the second street. The edge value a21 is shown as computed. Since an endorsement with house a21 is made, less computation is needed to complete the value of this edge. This extra efficiency is the reason that the first entry is left to be filled in last. The edge value a1 or the first street is needed at this point and it is easily calculated as the compress of b12 and a14. The value of register a24 is computed from the corresponding house. As endorsement has now moved to the second street, a2 is no longer needed.

Row 6 indicates evaluation but not nonvolatile storage of two houses, A21 and A22, and compressing the resulting two edge values to form B21 shown as stored.

Row 7 forms b21 as the compress of a21 and a22 and stores the result in the first house column. The second house column gets the edge value computed from the second house on the third street. The value of B22 is computed in preparation for the second town. First the value of the third house in the second street of the second town is computed and then this is used together with the first edge value of the second street of the new town, mentioned in row 6 above, to form by compression the value B22.

Row 8 begins by taking the first column from b21 to b22 by compressing b21 together with a23. Then a33 is computed from its house. Finally, the value of edge A2 is developed, first from computing A24 from its house and then compressing this with B22.

Row 9 fills the first register with the edge formed from the first house on the third street. The fourth column gets the value computed from the fourth house on the third street. The edge needed for skipping the first two streets, b1, is formed by first compressing b22 and a24 to obtain a2 and then compressing this with a1. Because endorsement is now in the fourth street, a3 is no longer needed.

Row 10 involves constructing only the value B31 for the next town. This is the compress of A31 and A32 that are each computed from their respective houses.

Row 11 first takes the first column forward from a31 to b31 by compressing the former with a32. Then a42 is computed from its house and replaces the second column value. In preparation for the next town, B31 is move forward to B32 by compressing with the value of A33 computed from its house.

Row 12 begins by taking b31 into b32 in the first column by compressing with a33 already stored. Also a43 is computed from its house and stored. Also A3 is compressed from B32 stored and A34 computed from its house.

Row 13 initially sets the first column to the value of house a41. Also house value a44 is put in place. To move b1 to b2, first a3 is compressed from b32 and a34, both stored and then this result is compressed with b1. Since endorsement is now in the fourth street, a4 is freed.

Row 14 only entails computing B41 from two values, A41 and A42, that are computed directly from their respective houses.

Row 15 starts out updating a41 into b41 by compressing the former with a42 stored. The second column is given the value of A12 computed directly. To progress B41 into B42, the value of A43 is computed directly from its house and then compressed with B41.

Row 16 also updates its first column by compressing the former value b41 with a43 stored to yield b42. By computing directly from the house, A13 is obtained. To compress B42 into A4, the value of A44 is computed directly from its house.

Row 17 is the first endorsement from the second town. The value of A11 is computed through the endorsement and stored in the first column. And A14 is computed from its house value.

Row 18 requires not register changes. It is identical to row 2, except that it is for the second town. Thus the process between the first and second towns is ready to repeat again between the second and third towns.

OVERVIEW

An overview of a second preferred embodiment is given in FIG. 1. Only a single issuer 101, card 102, terminal 103 and acquirer 104 are shown, but the system can contain a plurality of issuers, cards, terminals and acquirers, which are not shown for clarity.

There are four entities in the system: the issuer 101, the card 102, the terminal 103 and the acquirer 104. The issuer is an organization, or a conglomerate of organizations that issues the cards and guarantees the correct operation of the card to the other participants, for example, but without limitation, a bank. The card is a tamper-resistant computer device that is trusted by the issuer, for example, but without limitation, a smart card. The terminal is a computing device capable of communicating with a card. The acquirer 104 is an organization which helps to collect the data from the terminals. The acquirer, if it is a distinct entity from the issuer, typically works in close cooperation with the issuer.

When a card is first produced, it is typically initialized by, or on behalf of, the issuer. This is called personalization, and is done using a data channel 110, 111. The personalization might for example, but without limitation, involve giving the card a set of cryptographic keys and system configuration parameters. Once personalized, the card can be used to perform transactions.

Before a transaction is made, a data channel 112, 113 is established between the card and the terminal. There are various transactions that can be performed. Many of them do not require that the card or the terminal communicate with either the issuer or the acquirer during the transaction. We call those transactions "off-line". Some transactions require the terminal to communicate with the issuer during the transaction. These kinds of transactions are called "on-line". For these transactions a communication channel 118, 119 between the terminal and the issuer is used. Some examples, without limitation, of transactions are: data reading by the terminal, data writing by the terminal, payment from the card to the terminal, reloading of the card with more electronic money, etc.

The acquirer 104 is an entity that collects information from one or more terminals, and optionally handles some or all of the clearing and settlement of the transactions. For this purpose, the acquirer communicates with the terminal through the communication channel 114, 115, and with the issuer through communication channel 116, 117. Some examples, but without limitation, of the functions of the acquirer are: gathering information about the transactions the terminal participated in, collecting the cryptographic proofs of payments from the terminals, updating system parameters in the terminals, forwarding information regarding the financial transactions to the issuer, collecting the money for these transactions from the issuer, distributing the money received to the owners of the respective terminals.

COMPACT ENDORSEMENT SIGNATURES

Compact endorsement signatures use disposable cryptographic elements which are called "houses". Each house is used only once to sign or authenticate a message. Several such houses are combined into a "town" for reasons of efficiency.

A HOUSE

Figure 2:
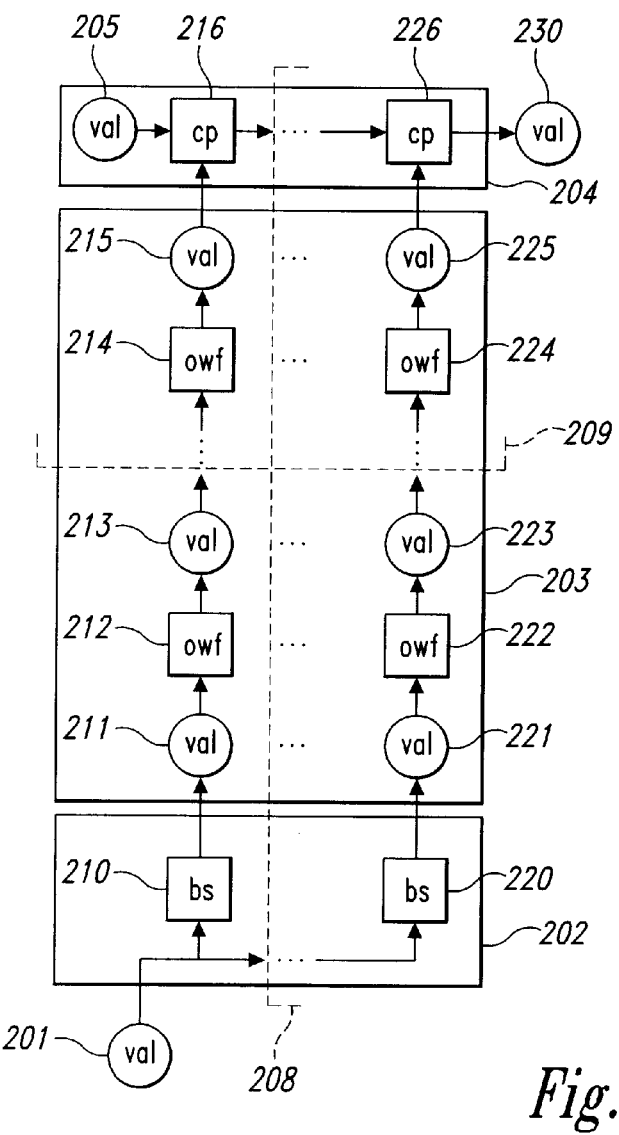
FIG. 2 shows a combination block and functional diagram of a one time signature structure called a house, in accordance with the teachings of the present invention.

The basic construction of a 'house' in the preferred embodiment is shown in FIG. 2. A house consists of a starting value called the house origin 201, a set of expansion functions 202, a set of iterated oneway functions 203, an iterative cryptographic hash function 204 and a house result value 230.

A house contains a plurality of columns, two of which are shown explicitly in FIG. 2. The first one consists of items 210, 211, 212, 213, 214, 215, 216, and the second one of items 220, 221, 222, 223, 224, 225, 226. The remaining columns are represented by 208 and are not shown in detail for clarity.

Considering the first column, this starts with a cryptographic oneway function 210 that takes the house origin 201 as input and yields the first value in the column 211 as output. This is then used as input to a chain of oneway functions. Each chain contains one or more oneway functions. Only two oneway functions of the chain are shown in FIG. 2, the remaining steps of the columns are not shown for clarity, and are represented by 209. The first oneway function 212 takes the first column value 211 as input and yields the second column value 213, which is the input to the next oneway function, etc. The last oneway function in the chain 214 yields the last column value 215.

The iterative cryptographic hash function 204 consists of a publicly known starting value 205 and a sequence of compression functions, one for each column. The starting value 205 is one of the inputs to the compression function of the first column 216 that takes the last column value of the last column 215 as the other input and yields the first intermediate hash value. Each subsequent column ends with a compression function similar to 216 that takes the previous intermediate hash value as one input, the last column value of that column as the other input and yields the next intermediate hash value.

The last column, consisting of 220, 221, 222, 223, 209, 224, 225, 226 is built in a similar way as the first column, these items corresponding to 210, 211, 212, 213, 209, 214, 215, 216 respectively. The compression function 226 of the last column takes the next to last intermediate hash value as one input, the last column value of the last column 225 as the other input and yields the final hash value 230, which is called the house result value.

An exemplary house is shown in FIG. 9. The house origin value 901 corresponds to value 201. The set of expansion functions 902 consists of cryptographic oneway functions 910, 920, 930, 940, 950, 960, 970 all of which use the house origin value 901 as an input, and which yield the first value in the columns 903 (corresponding to 203): 911, 921, 931, 941, 951, 961 and 971 respectively. These values are used as inputs to the first oneway functions in the chains 912, 922, 932, 942, 952, 962, 972 respectively, which yield the second column values 913, 923, 933, 943, 953, 963, 973 respectively. These are then the input values for the second oneway functions in each chain 914, 924, 934, 944, 954, 964, 974 respectively, which yield the third column values 915, 925, 935, 945, 955, 965, 975 respectively. These are then used as input values for the third oneway functions in each column chain 916, 926, 936, 946, 956, 966, 976 respectively which yield the last column values 917, 927, 937, 947, 957, 967, 977 respectively. These last column values form the input to the cryptographic hash function 904 (corresponding to 204), which starts with a publicly known starting value 905 which is an input to the first compression function 918 which also takes the value 917 as an input and which yields the first intermediate hash value 919 as a result. The first intermediate hash value 919 and the final column value of the second column 927 are the inputs to the second compression function 928 which yields the second intermediate hash value 929. This chain continues in the same fashion with items 938, 939, 948, 949, 958, 959, 968, 969, 978, 979 respectively. The last value 979 is the house result value which corresponds to item 230.

All the cryptographic oneway functions that start a column (such as 910, 920, 930, 940, 950, 960, 970) are different, so that they yield different result values even though they have the same input value. As will be described more fully later, several houses may all use the same house origin value. Within a set of houses that uses the same house origin value, all the cryptographic oneway functions that start a column are typically different. Furthermore, these oneway functions are such that it is believed to be impractical to reconstruct the house origin value given all the output values of these oneway functions. Such functions are used in other systems, among others in cryptographically strong pseudo-random generators, well known in the art.

In the preferred embodiment, the oneway functions in the column chains (such as 912, 914, 916, 922 etc. to 976) are all different within a house. Furthermore, within a set of houses that use the same house origin value, all the oneway functions in the column chains are different. Each of the compression functions such as 918, 928, 938 etc. differs within a set of houses that use the same house origin value. As will be obvious to a person ordinarily skilled in the art, these functions can be made different in many ways, for example, but without limitation, they can be made dependent on a counter which is incremented at every function application, or the exact position within a house or set of houses could be used to differentiate the different functions. It is believed that using different functions in different positions improves the security of the system.

The height of a column is the number of column values, which is one more then the number of oneway function in the chain.

The house result 230 depends on the house origin 201. Even though it might involve a large number of intermediate results, the result 230 can still be computed from the house origin using only a fixed amount of memory, irrespective of the number of columns or the height of each column. This is achieved by computing through each of the columns in turn, and applying the compression function to the final value of each column before starting on the next column. The details of this computation will be obvious to someone ordinarily skilled in the art.

A TOWN

As will be described later, the house output value will be signed using a digital signature scheme and the card will store that signature. To reduce the storage requirements several houses may be combined into a town, as shown in FIG. 3.

Figure 3:
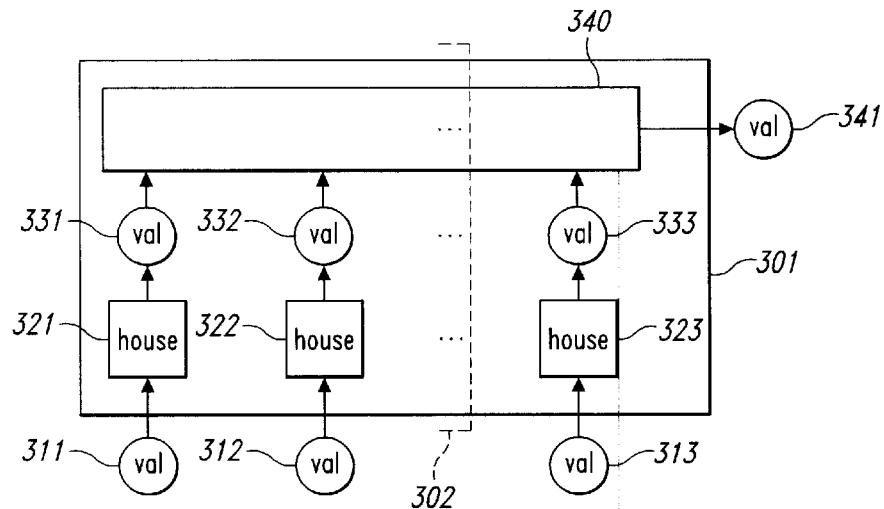
FIG. 3 shows a combination block and functional diagram of a first preferred compact endorsement signature structure called a town, in accordance with the teachings of the present invention.

A town consists of a plurality of houses, three are shown in FIG. 3 as 321, 322, 323; the remaining houses are not shown for clarity and are represented by 302. Each of the constituent houses of a town has a house origin value (corresponding to 201 in FIG. 2); 311, 312, 313 are the house origin values of 321, 322, 323 respectively. Each of the houses also has a house result value, corresponding to 230 in FIG. 2; 331, 332, 333 are the house result values of 321, 322, 323 respectively. All the house result values are used as inputs to a cryptographic hash function 340 that yields the town result value 341.

In the preferred embodiment all the houses in a town are of the same architecture: they have the same number of columns, the same height for each column etc. It is believed that this gives the easiest implementation.

Figure 4:
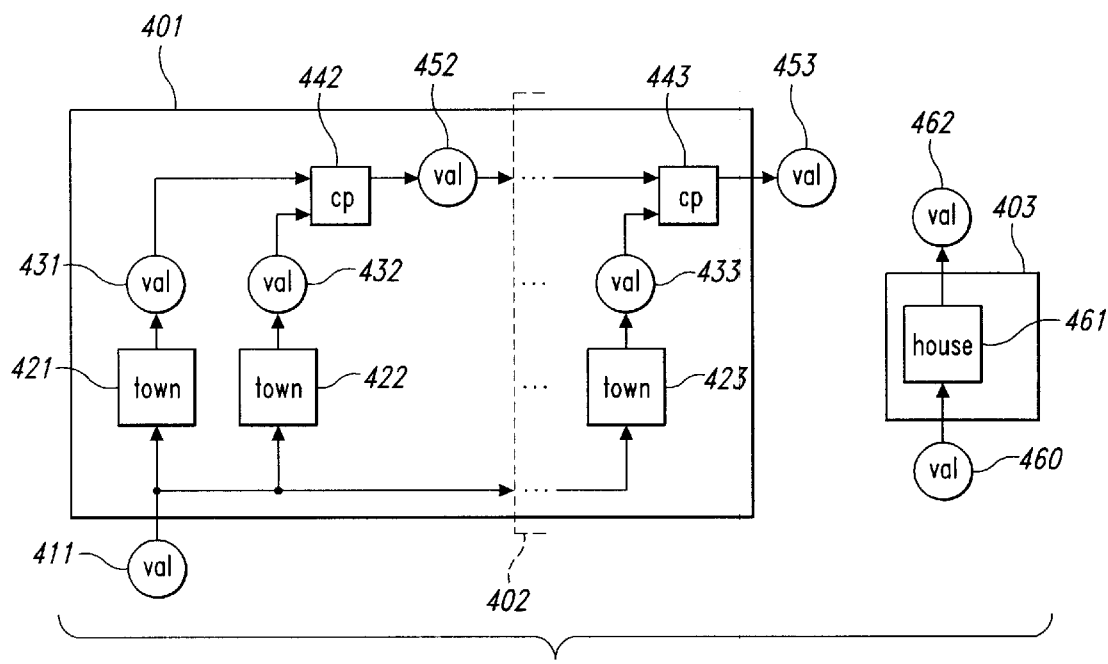
FIG. 4 shows a combination block and functional diagram of a second preferred compact endorsement signature structure called a town, in accordance with the teachings of the present invention, which is believed to allow an efficient implementation.

The construction of a town in the preferred embodiment may be described recursively, as shown in FIG. 4. A singleton town 403 has a single constituent house 461. The town origin value 460 is used as the house origin value (corresponding to 201 in FIG. 2) of the house 461. The house result value (corresponding to 230 in FIG. 2) is the town result value 462.

A general town 401 has a plurality of constituent towns, three of which are shown as 421, 422, 423; the remaining are not shown for clarity and are represented by 402. Each of the constituent towns is either a general town or a singleton town. The town origin value 411 is used as the town origin value for each of the constituent towns. A sequence of compression functions is used to combine the town result values of the constituent towns and yield the town result value of the general town 453.

The town result value of the first constituent town 431 is the first input to a compression function 442 that takes the town result value of the second town 432 as a second input and yield the first intermediate value 452. This intermediate value is then used as the first input to the next compression function, which takes the result value of the next constituent town as a second input and yields the next intermediate value. This chain continues until the last constituent town where compression function 443 takes the previous intermediate value as a first input and the town result value of the last constituent town 433 as a second input and yields the town result value of the general town 453.

The compression functions such as 442 and 443 are chosen in such a way that the result of the chain of compress functions is a cryptographic hash function. Such iterative hash functions are well known in the art.

In the preferred embodiment, the recursion depth used in each of the constituent towns is always the same, and the number of constituent towns in a general town only depends on the recursion depth. It is believed that this results in the most practical implementation. Each recursion level is called a dimension, and a town with n recursion levels is called an n-dimensional town. For example: a general town whose constituent towns are all singleton towns is a one-dimensional town. A general town whose constituent towns are all one-dimensional towns is a two-dimensional town, etc. This also allows an easy characterization of a town configuration. For example, a 7×4×5 town is a three-dimensional town that contains 7 constituent two-dimensional towns, each of which contains 4 constituent one-dimensional towns, each of which contains 5 constituent singleton towns, each of which is made up of a single house. Thus, the total number of houses in this town is 7×4×5=140. The number of constituent towns in a general town at each recursion level is called the size of that dimension. The singleton town is often ignored, and we will say that a one-dimensional town contains a plurality of constituent houses. In the preferred embodiment, the sizes of the dimensions are all the same, or differ by at most one. It is believed that this gives the most efficient implementation.

A preferred exemplary 3×4 town is shown in FIG. 5. The two-dimensional general town 501 contains three constituent one-dimensional towns 502, 503, 504, each of which contains four constituent houses. The town origin 505 is used as the house origin of each of the houses in the town 560, 561, 562, 563, 530, 531, 532, 533, 510, 511, 512, 513. These houses each produce a house output value namely 564, 565, 566, 567, 534, 535, 536, 537, 514, 415, 516, 517 respectively. The house result values of the first one-dimensional town 504 are combined by a chain of compress functions 568, 570, 572 that generates the intermediate values 569 and 571 and the town result value 573 of town 504. The house result values of the other one-dimensional towns are combined in a similar way, as shown by 538, 540, 542, 539, 541, 518, 520, 522, 519, 521 which results in the town result values 543, 523 of towns 503, 502 respectively. The town result values 573, 543, 523 of the one-dimensional towns 504, 503, 502 are combined in a similar way by functions 581, 583 and intermediate value 582 which results in the town result value 584 of town 501.

TOWN CREATION

For the description of the processes that involve a town we will use the example as shown in FIG. 5. How these processes extend and generalize to a general town will be obvious to someone ordinarily skilled in the art.

A town is created by choosing a town origin 505 and computing the town result 584 from that. The town result is computed using a straightforward, although extensive, computation involving the origin. As an example, but without limitation, an elegant way of computing the town result 584 is shown in the FIG. 41. The houses are computed in the order shown in the first column. The second column shows which values will be in memory after the house in the first column was computed. The last column shows which values are in memory after applying any compression functions whose input values are both in memory. After applying any compression functions, the next house is computed as shown in the first column of the next row. The generalization to a general town is best described recursively. It is believed that a singleton town like 403 can be computed with a fixed amount of memory, as it basically only involves computing a house. To compute the general town 401, we first recursively compute town 421, store the value 431, recursively compute town 422 with result 432, combine values 432 and 431 using compression function 442 to value 452, compute the next town recursively etc. It is believed that by interleaving the applications of the compression function with the computation of the constituent towns, each recursion level uses a fixed amount of storage independent of the number of constituent towns, so that the storage required to compute an entire town is only proportional to the number of dimensions of a town.

Once the town result 584 has been computed, the issuer signs this result using a public key digital signature scheme. There are several ways in which this can be accomplished. If the issuer is crating the town, then he just computes the digital signature on the town result. This is shown in FIG. 10. The signing process 1002 takes two inputs namely the message to be signed 1001, and the secret key used to create a digital signature 1004. The output value of the signing process 1003 is called the digital signature. By using the town result 584 as the message input value 1001, the issuer can compute the digital signature on the town result, which we call the town signature. The town origin 505 and the town signature are then sent to the card 102 where they are stored in non-volatile memory. It is anticipated that other data can also be included in the message being signed as the town signature.

There are several other ways in which the town might be created. For example, but without limitation, the card could choose a random town origin 505, compute the corresponding town result 584, and send the town result to the issuer together with a cryptographic authentication that convinces the issuer that the town result the receives was computed by a valid card. The issuer then signs the town result to get the town signature, and sends the town signature back to the card. The card stores the town origin 505 and the town signature in non-volatile memory. A blind signature scheme might also be used, where the card first blinds the town result 584 before sending it to the issuer. Using a blind digital signature scheme the issuer can sign the town result without ever learning the actual value of the town result.

Using some or all of these creation techniques, the card can acquire one or more towns, each of which consists of a town origin 505 and a town signature. Reloading a card with more towns would typically be one of the transactions which the terminal might perform with a card.

HOUSE SPENDING

The process of using the houses is called spending. In this process the card uses a house to sign or authenticate a message, for example, but without limitation, the card can use a house to create a message to the terminal which represents a certain amount of money, which the terminal can verify for validity without having access to any secret cryptographic keys.

The basic spending process is described in FIG. 30. This process is an example of a wide class of cryptographic protocols known as commit-challenge-response protocols. These are well known in the art, and have been used in a variety of zero-knowledge protocols, identification protocols, signature schemes etc. Some examples of such protocols are the Guillou-Quisquater protocol, Feige-Fiat-Shamir protocol etc. A commit-challenge-response protocol starts with one party (the prover) sending a commit message to the other party (verifier). The verifier then chooses a challenge which it sends back to the prover. Finally, the prover sends a response to the verifier. The prover will typically use the commit value, the challenge value and some other (secret) data to compute the response. The verifier will typically be able to verify that the response is correct based on the commit value and the challenge value. It will typically be the case that a cheating prover can provide correct commit and response messages if he can guess the value of the challenge in advance. The number of different possible challenge values is thus an important aspect of these kind of protocols. If the number of different challenge values is small, then a single execution of the protocol process will not convince the verifier very much, and the execution will have to be repeated to fully convince the verifier. This is used on many zero-knowledge protocols. If the number of different challenge values is large, then the protocol can be converted to a signature scheme by defining the challenge to be chosen as the cryptographic hash of the message to be signed and the commit value sent by the prover. This eliminates the need for interaction and allows the prover to send all the data in a single message to the verifier. This conversion is again well known in the art, and is for example used in the Fiat-Shamir signature scheme. In several schemes the amount of computational work increases when the number of possible challenge values is increased, making it desirable to keep the number of challenge values to a minimum. The spending process will now be described, which is a specific embodiment of a commit-challenge-response protocol in which the card is the prover and the terminal is the verifier.

The process in FIG. 30 starts at step 3000 at the card which sends a commit value to the terminal in message 3001. The purpose of the commit value is to fix the house the card will use in the spending. For example, but without limitation, the commit value could consist of the town signature, the town result value and an identification of the house within the town. When message 3001 is received by the terminal, the terminal starts execution of process step 3002. The terminal stores the commit value, and chooses a random challenge c. As the last action of step 3002 the terminal sends the challenge c to the card in message 3003. The terminal might use various means to generate the random challenge c. For example, but without limitation, this could include a real random number generator, a pseudo-random number generator etc. The challenge chosen could also depend on information sent by the acquirer or issuer to the terminal, thus taking away same freedom from the terminal which is believed to make some attacks harder to perform. When message 3003 is received by the card, it starts execution of process step 3004 in which the card computes the response associated sends the response to the terminal in message 3005. When message 3005 is received by the terminal, it starts execution of process step 3006 in which the terminal verifies that the response matches with the commit value and the challenge.

Figure 7:
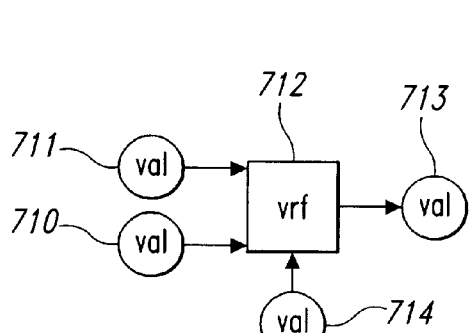
FIG. 7 shows a combination block and functional diagram of a public key verifying party, in accordance with the teachings of the present invention.

The commit value must uniquely identify and authenticate the house that will be used by the card in this process. This typically involves identifying the town and the house within the town. The town is authenticated by the town signature. To properly authenticate the house, several intermediate values in the town must also be sent to the terminal, either in the commit message or in the response message. For example, in FIG. 5 if house 532 is used, the following values are sent to the terminal: 536, 539, 537, 573, 523. (Value 536 is not strictly necessary as it can be computed from other response data, but in the preferred implementation it is sent as it is believed that this is easier.) Using these values, the terminal can verify that the house with house result value 536 is indeed a constituent house of the town 501. The terminal applies the various compression functions to compute the town result value 584, and then verifies the town signature using a signature verification process. The signature verification process is shown in FIG. 7. The verification function 712 takes three inputs: the signature 711, the message 710, and the public key 714, and yields a single bit result 713. The result indicates whether the digital signature was indeed the signature on message 710 with respect to the public key 714.

Having authenticated the house, the house can now be used. We will use the house in FIG. 9 as an example. The response data that the card sends includes exactly one value in each of the columns. In the first column, that is one of the values 911, 913, 915, or 917. In all the other columns, one of the four column values is included in the response data. The terminal receives these column values, and applies the necessary oneway functions to compute the final column values in each of the columns 917, 927, 937, 947, 957, 967, 977. The compression function 904 is then applied to these values which yields the house result value 979. The terminal verifies that this matches the house result value used earlier to authenticate the house in the town, or uses the house result value to authenticate the house in the town. The choice of which value in each column is sent encodes the challenge c. For ease of reference, each of the column values has an associated digit value. The digit value of the last column value is 0, the digit value of the next to last column value is 1 etc.. In FIG. 9 the first column value has a digit value of 3, in the actual preferred embodiment, the column height is 8, so that the digit values 0, 1, 2, 3, 4, 5, 6, 7 are used. It is believed that using a power of two for the column height allows easier encoding/decoding of actual data into the column digit values. The challenge c is thus converted into a sequence of digits, which indicate the column values included in the response data. In this way a card can use a house to perform a commit-challenge-response protocol with the terminal. It is believed that this protocol by itself convinces the terminal of the fact that the card is genuine in the sense that it has a valid town, which was originally signed by the issuer, which only gives such valid towns to genuine cards.

Figure 6:
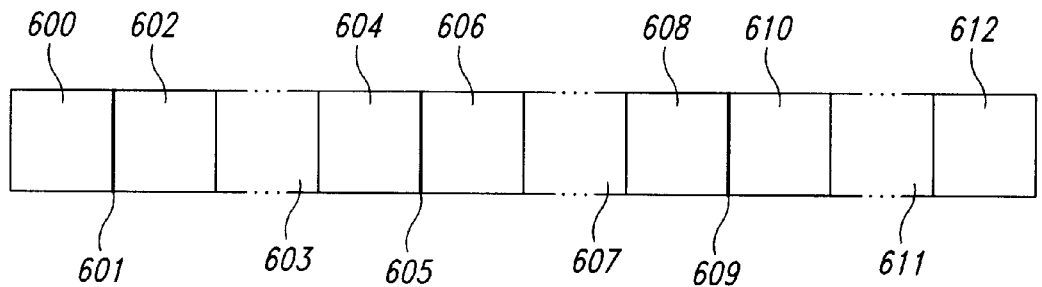
FIG. 6 is a block diagram showing exemplary data elements and control elements that are signed using a one time signature structure of FIG. 2, in accordance with the teachings of the present invention, in a way which is believed to enhance security.

FIG. 6 shows a number of digit values (digits) which are used to encode c and any extensions which we will describe fully later. Each square, such as 600, 602, 604, 606, 608, 610, and 612 represents a single digit, with 603, 607 and 611 representing any number of additional digits. The boundaries 601, 605 and 609 separate the digits into different fields which will be discussed fully later. A (sub)sequence of digits usually encodes an integer, using the standard encoding of integers into digits of the appropriate radix, well known in the art. If the columns are of different heights, then the maximum digit value varies over the digit position. In this case a mixed radix encoding of the integers is used, which is also well known in the art.

For each of the column values given to the terminal, the terminal can of course compute the subsequent column values. This corresponds to a lowering of the corresponding digit value. This would allow the terminal to modify the digits unless precautions were taken. The control value is used to protect against this. A subset of the columns (and thus of the digits) are designated as the protected columns (digits). The control value, seen as an integer, encodes some constant minus the sum of all the digit values in the protected columns. The control value itself is also coded into some columns. For example, but without limitation, the control value could be coded into digits 610, 611, 612 and the protected digits could consist of 600, 603, 604, 606, 607, and 608. The terminal can only apply more oneways to a column chain and thus only lower the value of any one digit. If the terminal tries to lower the value in any of the protected digits, then the control value increases, which means that at least one of the encoding digits of the control value increases. This would require the terminal to invert one of the oneway functions in the column of the increasing control digit, which is presumed to be impractical. In the preferred embodiment the range of control values is fixed at 0–63, which allows for 9 protected columns. (All columns have height 8, so each protected digit has a value of at most 7, so 9 columns lead to a maximum sum of 63. Using 63 as the constant to subtract from gives exactly the range 0 to 63 to the control value, which can be encoded in two digits of radix 8.) It is believed that the most significant control digit is the most attractive digit to try to increase by inverting the appropriate oneway function, as increasing this digit gives a lot of flexibility in changing the protected columns. The most significant digit of the control value is therefore duplicated in two separate columns, for a total of three control columns. It is believed that the double encoding of the most significant digit provides extra security against an attack which attempts to invert a oneway function with the aim of increasing one of the control digits. It is furthermore believed that the number of control columns increases only logarithmically with the number of protected columns.

The spending protocol implements a commit-challenge-response protocol between the card and the terminal in which the number of different challenge values depends on the number of columns in a house and the height of each column. The challenge value is encoded in the protected columns, and the control columns are added as described above. This can now be used to sign messages. For short messages where there are at most as many possible messages as there are challenge values, the message itself can be used instead of the challenge value. However, most applications need to sign larger messages then would be practical here, among others to prevent replay attacks. This method of using a commit-challenge-response protocol is well known in the art.

A more general scheme is the direct conversion of the commit-challenge-response protocol to a signature protocol by choosing the challenge to be the hash of the commit message and the message to be signed. This requires a challenge value of approximately 128 bits or more, which can be achieved using 43 protected columns of height 8 plus 3 control columns for a total of 46 columns. This method of using a commit-challenge response protocol is well known in the art. It is believed that including the commit message in the hash used to compute the challenge is not even necessary for these house based systems.

A commit-challenge-response protocol can also be used to authenticate messages in those cases where the effective contents of the message to be authenticated is small. By effective contents we mean the data in the message except of the data that is used to prevent playback attacks etc. for example, but without limitation, in payment systems the only important piece of the message being signed is the amount of the payment. The challenge can now be chosen in two parts, the first part being the message that is authenticated, and the second part being a value chosen by the verifier in a manner not predictable by the prover. It is believed that this method provides full authentication of the message and at the same time protects the verifier from playback attacks. This use of the commit-challenge-response protocol will be referred to as signing a short message. A typical exemplary application is the case of payments (i.e. payments from the card to the terminal). The challenge c is divided into 4 sequences of digits, as shown by the separators 601, 605 and 609 in FIG. 6. The first digit 600 encodes the currency of the payment. The digits 602, 603, and 604 encode the amount of the payment. The digits 606, 607, 608 are chosen randomly by the terminal, and finally digits 610, 611, and 612 encode the control value. The protected digits are 600, 606, 607, and 608. A typical configuration has 1 currency column, 5 amount columns, 7 random columns and 3 control columns, which accommodates 8 currencies, 15 bits resolution of the amount of the payment and 21 random bits. Using an ordinary digital signature, the 21 random bits would not be enough to protect the terminal from playback attacks. However, it is believed that in a commit-challenge-response protocol, and in this specific instance of a commit-challenge-response protocol in particular, this does protect from such attacks, as the card must commit to the house to be used in the first message, and cannot change that based on the value of the random part of the challenge. The amount digits are not included in the protected digits, which allows the terminal to arbitrarily decrease any of the amount digits. It is believed that this only decreases the amount encoded in the signature, which is not in the interest of the terminal.

Another method allows the use of commit-challenge-response protocols with a small set of possible challenge values to be used to authenticate arbitrarily long messages. This is done by choosing the challenge value as a uniformly distributed function of the cryptographic hash of the message where the message is extended with a number that was generated in a mutually random fashion (also known as a fair coin flip). such a mutually random number is a number which is constructed in a cooperative process between two parties in such a way that both parties are ensured that the number is in fact random. At the start of the process in FIG. 30, both the card and the terminal know the message m to be signed. In process step 3000 the card generates a random number a, and computes a commit value A on it, for example, but without limitation, A can be formed by hashing a and a large enough random string of bits. In message 3001 the card sends A to the terminal, along with the rest of the commit message. The purpose of A is for the cord to show the terminal that it has fixed it's choice of a without revealing a to the terminal. Such bit commitment schemes are well known in the art. The terminal then chooses a random number b in process step 3002, and sends b to the card in message 3003. In step 3004 the card computes the mutually random number d as a function of a and b, for example, but without limitation, d can be computed s the exclusive or of a and b. The actual challenge value c is then computed by first computing a cryptographic hash of the message m concatenated with d, and then applying a function that maps the has value uniformly to the set of possible challenge values, for example, but without limitation, the challenge c could be chosen as the least significant bits of the actual hash value. The value c is then coded into the protected digits of a house, the control digits are added and the card sends the response data associated with those digits to the terminal in message 3005. The card also includes the value a plus any information necessary to verify the commit value A in message 3005 which allows the terminal to reconstruct d and thus c, and also allows the terminal to verify that a is indeed the value committed to by the card in message 3001 by checking that the values a and A are consistent with each other. This use of a commit-challenge-response protocol will be referred to as authenticating an arbitrarily long message. The message m does not have to be known by both parties at the start of the process, but can also be included in message 3001 to the terminal. It is anticipated that part of the message might also be chosen by the terminal in step 3002 and communicated to the card in step 3004, in which case the card has the choice of accepting that part of the message or replacing it by a fixed value. It is believed that this authentication method provides authentication of the message to the terminal. It is believed that the probability of successfully cheating the terminal is in the order of one over the number of possible challenge values.

It is believed that compact endorsement signatures provide a high degree of flexibility; using a large house, the card can sign any message, using a more efficient smaller house, the card can sign a small message, or authenticate an arbitrarily long message.

When the house is used to authenticate an arbitrarily large message to the terminal, the card can at the same time send a secret-key authentication on the message for use by the issuer. (As the issuer originally produced the card, we assume that the card and the issuer have a secret key in common.) The secret-key authentication is first appended to the message, and the combination of the two is then authenticated to the terminal using a house. It is believed that this provides the benefit of a public-key signature to the terminal, with the speed and storage advantage of a secret key signature to the issuer. The terminal can namely discard the house and all associated data and only store the message and the secret-key authentication.

TOWN PRECOMPUTATION

The card must send several intermediate values of the town to the terminal during the spending process. To save computations these values are precomputed. As an example we will use the town of FIG. 5, the precomputation steps are shown in FIG. 40. The precomputations schedule shown in FIG. 40 are believed to be suboptimal in the sense that they require more storage on the card then the optimal precomputations schedule, but it is also believed that this schedule yields the easiest implementation.

FIG. 40 shows the values stored in memory at any step. The first column contains the number of the house in the town that is being spent, the second column the set of values that is precomputed in the current town (called A), the third column the set of values that is precomputed in the next town (called B). The next town is the town that will be used after the current town has been exhausted, in the sense that all the constituent houses have been used. For clarity all items referring to the next town are shown in slanted font in FIG. 40. The fourth column the set of values needed for the authenticating the house indicated in the first column within the town and the last column the number of values stored in memory.

The first row of FIG. 40 shows that when house 560 is being spent, the values 523, 543, 564, 565, 566, 567 are being used in the spending process. (As mentioned before the house result value of the current house is used in the preferred embodiment. Although this is not necessary from a functional point of view, it is believed that this provides for the easiest implementation.) The value 534 is computed (by computing the house result value of house 530) and stored.

The second row of FIG. 40 shows the situation when the next house 561 is spent. The same values as in the previous step are being used, and one more value is precomputed namely 535. When, in the third row, house 562 is being spent, the values 564 and 565 are no longer necessary for the spending process, but are combined using the compression function into value 569. This saves a storage space, which is used to precompute the next value 536. The next line shows a repeat of this process when house 563 is being spent: the values 569 and 566 are combined into value 571 and the free storage space is used to compute value 537. When spending house 530, the values 571 and 567 are combined into 573, the value 543 is no longer necessary and is replaced with the already precomputed values 534, 535, 536 and 537 which are now used in the spending process. The value 514 is precomputed in this step. This is also the point in which we start precomputing the next town. When all houses in the current town (A) have been spent, we obviously need the intermediate values of the next town (B) that are needed for the spending process for the first house in B. At this point we precompute value 534 in town B by computing the house 530 in town B which is the first step in computing 543 of town B. When spending house 531 the same set of values is used for the spending, the value 515 is precomputed, and in town B the house value 535 is precomputed, combined with the already stored value 534 to yield value 539. Only value 539 of town B is stored. This process continues as shown in the table. When spending house 533 the values 523, 541, 537 and 573 are being used, the values 514, 515, 516, and 517 have been precomputed in town A. In town B the value 537 is computed, combined with the value 541 which was already precomputed in town B and the result value 543 stored. When the next house 510 is being spent, the values 573 and 541' and 537 in town A are no longer necessary, they are combined using the appropriate compression functions into value 582. The values 514, 515, 516 and 517 which had already been precomputed in town A are now being used. Two new values are precomputed in town B namely 514 and 564. In the next rows the spending situations for houses 511, 512 and 513 is shown. The original values that were used for the spending 514, 515, 516, and 517 are step by step combined to 521 and 517 for the spending of the last house 513. The precomputations in town B involve precomputing 565, 566 and 567, and the precomputation of values 523 in steps with intermediate values 519 and 521. After the last house 513 has been spent, we switch to the next town. What used to be called town B now becomes town A. The values that were precomputed in town B during the spending of town A are exactly those necessary for the spending of the first house 560 in town B as shown by the next row of the table. Of course, the remaining values 521, 517 and 582 of the old town A are discarded as they are no longer needed. When all houses in a town have been spent, the town origin and the town signature are also discarded, as they will not be used again.

It is believed that this method of precomputations requires storage space proportional to the sum of the sizes of each of the dimensions of a town. Furthermore, it is believed that the precomputation involves computing at most as many houses as there are dimensions if multiple towns are used, and one less if only a single town is used. In FIG. 40 at most 2 houses are precomputed at any step, and of these at least one is in town B. If town A were to contain enough houses so that a second town is not necessary, then no precomputations in the next town need to be done. It is believed that this further reduces the necessary precomputations. It is believed that it is possible to load additional towns into the card. These can either be without any precomputation (e.g. the next town after town B), with (partial) precomputations (e.g. add a town B with the correct precomputations to an already existing town A), or existing towns and precomputations can be discarded and replaced with net town(s) with the right precomputations. These extensions will be obvious to someone ordinarily skilled in the art.

The precomputations mentioned above can of course be done by the card itself. An alternative is for the terminal to do manage the precomputations. The house result values in a town are not secret, so the card can compute those on demand and send the result to the terminal. A refinement is to let the card not compute the house result value, but just the last value in each column, send those column values to the terminal and let the terminal combine them to get the house value. The terminal can now manage the precomputations, reading, writing and deleting the necessary values in the card's memory. For example, but without limitation, when spending house 562 (see FIG. 40, third row) the terminal can ask the card to compute the house result value 536. The card can either store this as a precomputed value by itself, or send it to the terminal which then stores it back in the card as a precomputed value. The terminal furthermore reads the values 564 and 565 which are stored in the card's memory, deletes those values in the card's memory, computes the value 569 form the values 564 and 565 and writes the value 569 in the card as a precomputed value. In a similar manner all the other precomputation actions can be managed by the terminal. The terminal might do all these actions itself, or might contain a tamper-resistant device which performs and manages the precomputations. It is believed that this precomputation management system simplifies the implementation of the card. It is believed that any error by the terminal in managing or performing the precomputations does not lead to a security weakness, but can at most lead to a failure to properly authenticate a house in a town, thereby rendering the compact endorsement signature scheme ineffective until a recovery has been performed. It is believed that a terminal that detects an inconsistent precomputation state in a card can recover the card and bring it in to a consistent state with respect to the precomputations.

SECURE DATA STORAGE

FIG. 12 shows the basic layout of the non-volatile and volatile memory of the card in the preferred embodiment.

the volatile memory 1240 holds the variable 1241, called VNIU, which is described in detail below. Field 1242 holds the volatile memory variables that are not part of the Secure Data Storage. These are not shown for clarity.

The non-volatile memory 1200 is divided into three areas. Area 1201 is used to store the global non-volatile variables. Area 1203 is set aside for other applications or purposes, as known in the art. Area 1201 is shown in more detail as 1230, the dotted lines denoting an enlargement. The fields 1231, 1232, 1233, 1234, 1235 and 1236 are global non-volatile variables called NIU, COM, NDONE, NBROK, CLCOM and CLCAN respectively, and are described in more detail below. Part 1237 are global non-volatile variables that are not part of the Secure Data Storage system, which have not been shown for clarity. The NDONE variable is used in the session proofs, which will be described more fully later.

Area 1202 is shown in more detail as 1210, the dotted lines denoting an enlargement. This area is divided into a plurality of fixed-size smaller areas called frame slots. All frame slots have the same size and the same internal organization. One of the frame slots 1211 is showed enlarged as 1220, the dotted lines denoting an enlargement. Each frameslot consists of four fields, each of which can store a variable. The field 1221 is called the tag field, and holds a variable called 'tag'. Field 1222 is called the access field, and holds a variable called 'access'. Field 1223 is called the data field and holds a variable called 'data'. Finally, field 1224 is called the checksum field and holds a value (called the checksum) that serves as a checksum over the other three fields. The function to compute the checksum from the other three fields can be chosen in many ways, for example, but without limitation, it can be chosen as the number of zero bits which occurs in the other three fields, coded as a binary number. The four values tag, access, data and checksum are together referred to as a 'frame'.

The tag functions much like a filename in ordinary computers. It is used as a unique name to refer to the frame. All frame slots are the same size, thus the a frame fits in any of the frame slots. The interpretation of the data in a frame slot is solely dependent on the value of the tag field, and not on the position in the non-volatile memory the frame appears in. Whenever information about specific frame is needed, the non-volatile memory is searched for a frame slot with the proper tag value in the tag field. The other fields of that frame slot contain the other data of that frame. A value of zero in the tag field is used to indicate that a frame slot does not contain any valid frame data, and is therefore empty. Thus, a frame slot is the actual location where a frame is stored in the non-volatile memory. A frame is a set of values which is stored somewhere in the frame slots, which is identified by its tag value.

The access field is used to store data regarding the conditions that should be met before the data of the frame can be accessed. This corresponds with access rights associated with files in many operating systems. The data field contains data for the applications, the interpretation and formatting of this data depends on the applications.

In the preferred embodiment, the tag field is 2 bytes long, the access field 1 byte long, the data field 16 bytes long and the checksum field 1 byte long.

A MODEL FOR NON-VOLATILE MEMORY

For reliable and secure operations the card would typically require a reliable and secure non-volatile memory system. A typical smart card uses EEPROM technology for non-volatile storage of data. Inherent in this technology, and in many other non-volatile storage technologies, is that writing data is not instantaneous. There are two basic processes for EEPROM memory: wiring and wiping. During wiping, a block of bits is cleared to the default position, which we will without loss of generality denote by a binary 0 (although in some implementations wiped bit read as 1's). The block size for wiping is implementation dependent and might actually be 1, but typical minimum block sizes are 8 or 32 bits. This means that it is often not possible to wipe individual bits but only blocks of bits.

Writing is also done in blocks, but usually allows individual bits to be set to 1 (in our representation). In a typical implementation, when writing data to a memory block the bits that are written with a 0 value are not affected while those that are written with a 1 value are set to 1.

Both the writing and wiping process take time, typically on the order of a few milliseconds. If the operation is aborted for some reason within this time, the results are usually unspecified. It is believed that irradiating the EEPROM memory with UV light has similar effects as a partial or full wipe of the bits that are irradiated.

A functional model of a typical EEPROM memory is shown in FIG. 11. This figure gives the state diagram for a single bit of EEPROM memory. Each bit has three possible states labeled 1100, 1101, 1102. The state 1100 is what we call the 0 state. In this state the bit has a stable zero value, and will always be read as a zero. In state 1101, also called the 1 state, the bit has a stable one value, and will always be read as a one. In state 1102 the bit is in an intermediate state, called the ? state. In this state the value of the bit is not defined, and the result of a read operation is undefined. Although most implementations will at any specific read attempt return either a zero or a one value, we assume that it is not possible to predict what value is returned. As the value returned might also depend on other factors, including factors external to the card, such as temperature, supply voltage etc., we make no assumptions whatsoever about the values returned by read attempts.

The state transitions are also shown in FIG. 11. A bit in the 0 state 1100 will transition to the ? stat 1102 through state transition 1110 at the start of a write operation which attempts to write a 1 into this bit. The bit remains in the ? state for the duration of the write operation. A bit in the ? state 1102 will transition to the 1 state 1101 via transition 1111 at the end of a write operation which attempts to write a 1 into this bit. A bit in the 1 state 1101 transitions to the ? state 1102 via transition 1112 at the start of a wipe operation on a block of bits that contains this bit. A bit in the ? state 1102 transitions to the 0 state 1100 via transition 1113 at the end of a wipe operation on a block of bits that contains this bit. If the write or wipe operation is interrupted for any reason, the transitions 1111 and 1113 respectively are not made and the bit remains in the ? state 1102.

Under influence of UV radiation, any bit in the 1 state 1101 can also transition via 1112 to the ? state 1102, and from the ? state 1102, via 1113, to the 0 state 1100.

As will be obvious to someone ordinarily skilled in the art, this model applied, or can be applied to a wide variety of non-volatile memory technologies.

BROKEN MODE

In the preferred embodiment, the card has two basic modes, which we call 'broken' and 'not broken'. This mode is indicated by the NBROK variable 1234. This is a single-bit variable in non-volatile memory which occupies a whole block of bits so that it can be wiped without influencing any other variables in memory. Under normal circumstances, the card is in the 'not broken' mode, and the NBROK variable 1234 contains a value of 1. During the personalization of the card, this variable is set to a 1 value. The 'broken' mode when the NBROK variable 1234 is zero will described more fully later.

MULTI-UPDATES

The variables CLCOM (1235) and CLCAN (1236) each consists of an array of bits, one bit for every frame slot on the non-volatile memory. In the default state all the bits are 0. The variables NIU (1231) and COM (1232) are both single-bit variables which occupy an entire block of bits so that they can be individually written and wiped. The VNIU (1241) variable is a single bit variable in volatile memory.

FIG. 18 shows the process of finding a frame in the preferred embodiment. At the start 1800 the variable 't' contains the value of the tag of the frame to be found in the non-volatile storage. First, in step 1801 two new variables are initialized to zero, and an index counter 'idx' which will run over all frame slot indexes, which is initialized with the index value of the first frame. Next is a loop, comprising items 1802, 1803, 1804, 1805 which searches for frame slots with a tag value equal to 't', for which the associated bit in the CLCOM variable is 0. First, in step 1802 the frame slot with index 'idx' is inspected to see if the tag field contains the value 't', and whether the bit associated with that frame slot in the variable CLCOM is 0. If this is not the case, the process continues at item 1804. If this is the case, a frame slot has been found and the process continues at item 1803. At step 1803 the counter 'nr_found' is incremented by one, and the current value of 'idx' is assigned to a variable called 'store_idx', after which the process continues at step 1804. Step 1804 checks whether the frame just inspected by step 1802 was the last frame. If this is the case, the process continues at step 1810, otherwise it continues at step 1805. At step 1805 the 'idx' variable is incremented by one to the next index value, and processing continues at step 1802. The result of the process so far is that the variable 'nr_found' contains the number of frame slots that exist in the non-volatile memory whose tag value is equal to 't' and whose representative bit in the LCOM variable is zero. If the 'nr_found' variable is greater then zero, then the 'store_idx' variable contains the index of one of the frame slots found.

Steps 1810, 1811, 1820, 1830, 1840 decide which action should be taken based on the results of the earlier loop. In step 1810, the counter 'nr_found' is checked for a zero value. If 'nr_found' is zero, the process continues at step 1820 which sets the return value to indicate that no frame was found. If step 1810 determines that 'nr_found' is not zero, the process continues at step 1811 which checks whether 'nr_found' is greater than one and 't' is unequal to zero. If this is the case, the process continues at step 1840 which wipes the NBROK variable to 0 to enter the 'broken' mode, and jumps to the reset process for proper 'broken' mode processing. If in step 1811 the condition is false, the process continues at step 1830 which sets the return value to indicate that a frame was found. The process of finding a frame is terminated at step 1850 which occurs after either step 1820 or step 1830.

The process of reading a frame in the preferred embodiment is shown in FIG. 19. At the start 1900 the variable 't' contains the frame to be read. The first step 1901 consists of executing the find frame process (as shown in FIG. 18) to search for a frame with tag 't'. Next, step 1902 determines whether a frame was found. If no frame was found, the process continues at step 1910 which sets the return value to indicate that no frame was found. If step 1902 determines that a frame was found, the process continues at step 1903. This step retrieves the data from the frame slot, using the variable 'store_idx' which was set by the 'find frame' process of step 1901 to locate the proper frame slot. It then checks whether the checksum field has the right value. If this is not the case, the process continues at step 1930 which wipes the NBROK variable to 0 to enter the 'broken' mode, and jumps to the reset process for proper 'broken' mode processing. If step 1903 finds the right checksum value, the process continues with step 1920 which sets the return value to the frame data and indicates that the frame was found. The process of reading a frame is terminated at step 1940 which occurs after either step 1910 or 1920.

FIG. 13 shows the process of starting an update sequence in the preferred embodiment. At the start of this process 1300 another update can already be in progress, in that case both updates are combined into a single multi-update. In step 1301 the variable VNIU is inspected. If it is not equal to 1, then another update is already in progress, and no new update needs to be initialized; the process continues at step 1310. If step 1301 finds that the variable VNIU has a value of 1, it continues processing at step 1302. Step 1302 sets both NIU and VNIU to zero, after which it continues with step 1310. Step 1310 terminates the process.

FIG. 14 shows the process of deleting a frame in a frame slot in the preferred embodiment. At the start 1400 the variable 'i' contains the slot index number of the frame slot in which the frame to be deleted resides. The first action 1401 is to execute the 'start update' process as shown in FIG. 13 to be sure an update is in progress. In next step 1402 the i'th bit of the CLCOM variable is set to 1, after which the process terminates in step 1410.

FIG. 15 shows the process of writing data in a frame in the preferred embodiment. At the start 1500 the variable 't' contains the tag value of the frame to be written, the variable 'access' contains the access control code for the frame to be written, and the variable 'data' contains the data for the frame to be written. The first step 1501 executes the 'start update' process shown in FIG. 13. The next step 1502 executes the 'find frame' process of FIG. 18 to locate any existing frame with the same tag value. The next step 1503 inspects the return value of the 'find frame' process to determine whether a frame was found. If this is not the case, the process continues with step 1506. If step 1503 determines that a frame was found, the process continues with step 1505. Step 1505 executes the 'delete frame' process for the frame slot which contains the frame that was found in step 1502. The index value of the frame slot that was found was stored in the variable 'store_idx' by the 'find frame' process and is used here as an input to the 'delete frame' process to indicate which frame slot should be deleted. After step 1505 the process continues at step 1506. Step 1506 consists of the 'find frame' process of FIG. 18 to search for a frame slot with a tag field value of zero. The next step 1507 inspects the result of step 1506 to determine if such a frame slot was found. If no frame slot was found, the process continues with step 1520 which jumps to the cancel process of FIG. 8, which will be described more fully later. If step 1507 determines that a frame slot was found, the process continues with step 1508. In step 1508 the bit corresponding to the frame slot that was found by step 1506 is set in the CLCAN variable. The index number of the frame that was found by step 1506 was stored in the 'store_idx' variable, which is now used to set the proper bit. The next step 1509 writes new data in the frame slot which was found by step 1506. The tag field, access field and data field are written with the value of the 't' variable, 'access' variable and 'data' variable respectively. The checksum field of the frame slot is writen with the proper checksum value. The next step 1552 terminates the process.

FIG. 17 shows the 'commit' process in the preferred embodiment. The process starts at step 1700 and continues at step 1701 which determines whether the VNIU variable is equal to 10. If this is the case, the process continues at step 1730. If step 1701 finds VNIU to be equal to zero, the process continues at step 1710. In step 1710 the first action is to set the COM variable to 1. The CLCAN variable is then wiped to 0. Next, for each bit in the CLCOM variable which is equal to 1, the frame slot that is associated with that bit is cleared. Clearing a frame slot consists of wiping the tag field to a 0 value. Subsequently, the CLCOM variable is wiped to 0, after which the COM variable is reset to 0. Processing the continues at step 1721 which sets the NIU variable to 1. The next step 1722 sets the VNIU variable to 1, and the process continues at step 1730. Step 1730 terminates the commit process.

FIG. 8 shows the 'cancel' process in the preferred embodiment. The process starts at step 1750. The next step 1751 determines whether the VNIU variable is equal to 1. If this is the case, the process continues at step 1770. If step 1751 determines that VNIU is not equal to 1, it continues at step 1751. In step 1751, the first action is to wipe the COM variable to 0. Then the CLCOM variable is wiped to 0. Next, for each bit in the CLCAN variable which is equal to 1, the frame slot that is associated with t hat bit is cleared. Clearing a frame slot consists of wiping the tag field to a 0 value. The last action in step 1751 is wiping the CLCAN variable to 0. After step 1751 the NIU variable is set to 1 in step 1761. The next step is 1762 where the VNIU variable is set to 1. The process then continues at step 1770. In step 1770 the 'cancel' process is terminated.

FIG. 16 shows the 'reset' process in the preferred embodiment. The process starts at 1600. The next step 1601 inspects the NBROK variable to determine whether its value is equal to 1. If this is not the case, the process continues with step 1610 in which the NBROK variable is wiped to zero. After step 1610 the next step is 1611 which sends all public data in the non-volatile memory to the terminal. After step 1611 the process continues again at step 1611 in an infinite loop. If step 1601 determines that NBROK is equal to 1, the process continues at step 1602. Step 1602 inspects the NIU variable to determine whether it is equal to 1. If this is the case, the process continues at step 1641. If step 1602 finds that NIU is not equal to 1 the process continues at step 1603. Step 1603 inspects the COM variable to determine whether it is equal to 1. If this is the case, the process continues at step 1630. If this is not the case, the process continues at step 1620. In step 1620 the first action is to wipe the COM variable to 0. Then, the CLCOM variable is wiped to 0, after which all frame slots whose representative bit in the CLCAN variable are 1 are cleared. Clearing a frame slot consists of wiping the tag field to a 0 value. After this, the CLCAN variable is wiped to zero, and the process continues at step 1640. In step 1630 the first action is to set the COM variable to 1. Then, the CLCAN variable is wiped to 0, after which all frame slots whose representative bit in the CLCOM variable are 1 are cleared. Next the CLCOM variable is wiped to 0, and finally the COM variable is wiped to 0. The process continues at step 1640. In step 1640 the variable NIU is set to 1, an the process continues at step 1641. In step 1641 the variable NVIU is set to 1, after which the process is terminated in step 1650. The 'reset' process functions either as a 'cancel' process if no commit was in progress, or as a 'commit' process if a commit was in progress.

The 'commit', 'cancel' and 'reset' processes together also keep counters which indicate how many times a 'commit' process was completed, and how many times a 'cancel' process was completed. These counters are stored in a frame, which is updated after each 'commit' or 'cancel' process (this includes the 'commit' and 'cancel' parts of the 'reset' process). The details of these counters and their updates have not been shown for clarity. The counters are used to generate unique challenges.

In the preferred embodiment, the 'reset' process is executed after any interruption. For example, but without limitation, when the card is powered up, or after a reset of the card. A multi-update typically consists of a sequence of 'read frame', 'delete frame' and 'write frame' processes in any order. A multi-update is usually terminated with a 'commit' process or a 'cancel' process. If the card is interrupted during a multi-update, it will resume with the 'reset' process after the interruption.

It is believed that the processes shown in FIGS. 8, 13, 14, 15, 16, 17, 18, and 19 together provide the following functionality: Frames can be read using the 'read frame' process at any time. The data returned will always be the data that was last written with that tag value. The first 'delete frame' or 'write frame' process starts a multi-update. After a 'delete frame' process, the frame that was deleted can no longer be read using the 'read frame' process. After a 'write frame' process, the data returned by the 'read frame' process is the data last written with that tag value. If a 'cancel' process is executed, all modifications done in the multi-update are reversed. The 'read frame' process will now return the same information as it did before the start of the multi-update. If the multi-update is interrupted, then the 'reset' process which is executed after each interruption has the same effect as a 'cancel' process would have had before the interruption: all modifications to the data in the storage system are reversed. If a multi-update is terminated with a 'commit' process, then all modifications are retained, and it is no longer possible to reverse the modifications. If a 'reset' process is executed after a 'commit' process, the modifications are all retained. Assuming a non-volatile memory model as shown in FIG. 11, if the card is (possibly repeatedly) interrupted at arbitrary moments during the processes mentioned, it is believed that the effect will either be that of a 'commit' process at the end of a multi-update, or that of a 'cancel' process at the end of the multi-update. Furthermore, unless the 'commit' process was already started, the effect will always be that of a 'cancel' process. This provides what is usually called an atomic update of a database. Either all the changes are made, or none of the changes are made. This property is retained even under arbitrary interruptions.

It is believed that the effects of UV erasing as shown in FIG. 11 are limited to the following effects: Frames can be erased, and in any multi-update the update of any one frame can be prevented. This implies that the atomic update property is lost under UV erasing. However, it is believed that any practical UV erasing will result with high probability in the card entering the 'broken' mode. It is furthermore believed that UV erasing can never be used to create new frames, or alter the data of a frame.

SESSIONS

The basic structure of a session as implemented in the preferred embodiment is shown in FIG. 24. A session starts of with a 'start session & proof keys' process 2401. Then follows one or more 'command & data exchange' processes 2402, after which the session is terminated by a 'commit session & end session' process 2403. Both the card and the terminal are involved in a session. Each of these participants keeps a session state as will be described more fully later. Throughout the session, the session states kept by the card and the terminal should be identical. As will be described more fully later, the session stats on both sides are updated using a chaining function which has been chosen in such a way that it implements an iterative cryptographic hash function. The purpose of a session is to link several independent actions together in such a way that they behave as a single indivisable action. An independent action can be any type of action, and could even be a session itself. Typically an independent action would be a fairly simple actions, such as reading or writing a frame, but it is believed that some applications require the use of fairly complex independent actions.

The 'start session & proof keys' process as implemented in the preferred embodiment is shown in FIG. 25. This process involves the terminal 103 which executes steps 2501 and 2505, and the card 102 which executes steps 2503 and 2507. The process starts at step 2501. The terminal selects which keys will be used in the session, the chooses a terminal challenge value. As the last action of step 2501 the terminal sends the terminal challenge value and the choice of keys to the card in message 2502. When message 2502 is received by the card, the card starts execution of process step 2503. The first action in step 2503 is to choose a card challenge. Next the session state is initialized to a known value to start the chain. Next, all the keys selected by the terminal in step 2501 and indicated in message 2502 are chained. As described more fully later, the chaining involves using a chaining function to update the session state based on the other data (in this case the keys). The next action is to chain the terminal challenge, and then the card challenge. As the last action of step 2503 the card sends the card challenge in message 2504 to the terminal. When message 2504 is received by the terminal, the terminal starts execution of process step 2505. In step 2505 the first action is to initialize the session state to the same starting value as used by the card to initialize the session state. Next, all the keys selected in step 2501 are chained, the terminal challenge is chained, and the card challenge is chained. This should result in the session state of the terminal having the same value as the session state of the card at the completion of step 2503. The next action in step 2505 is to encrypt an authentication code which functions as proof that the terminal has indeed chained the proper keys. The last action in step 2505 is for the terminal to send the proof in message 2506 to the card. When the card receives message 2506 it starts execution of step 2507 of the process. The card decrypts the proof sent by the terminal and verifies it against the current sessions state. If this verification fails, the process is aborted. If the verification is successful, the card sets a state indicator 'in session', and the process is terminated. The card retains the information regarding which keys were chained during this process, so that it can be used to determine access rights to different frames in this session. The terminal and card challenge value will typically vary over time and can, for example, but without limitation, be chosen using a random generator. In the preferred embodiment the card challenge consists of the 'cancel' counter and the 'commit' counter.

The keys mentioned above are stored in frames in the card. Each frame that contains a key is partitioned into two halves. The first half usually contains a diversification number, the second half contains the secret key data. The frame can be read using the standard 'read frame' process, provided the terminal has access as specified by the access field of the frame. When a frame containing a key is read, the part containing the secret key is replaced by zeroes, preventing the secret key data from being read. For some applications, the key is diversified: the secret key used by the card (and stored in the second half of the key frame) is a function of a master key and the diversification number stored in the first half of the frame. A terminal with access to the master key first reads the diversification number by reading the key frame, computes the secret key used by the card and can thus start a session with this key. Note that access to the diversification number can be protected by another key by setting the access field of the key frame to a proper value.

The 'command & exchange data' process as implemented in the preferred embodiment is shown in FIG. 26. Each 'command & exchange data' process consists of an elementary function, for example, but without limitations, reading a frame and writing a frame. The first step of the process 2601 is executed by the terminal. The first action is for the terminal to select a command. The last action of step 2601 is for the terminal to send the command data to the card in message 2602. When message 2602 is received by the card, it start execution of process step 2603. The first action in this step is for the card to check whether it is in a session. If this check fails, the process is aborted, otherwise the process continues with the next action. The command data received in message 2602 is chained (thus updating the session state) and the command is executed. Execution of the command can involve several actions, for example, but without limitation, the reading, deleting and writing of frames, as shown in FIGS. 19, 14, and 15. Any response data from the card to the terminal is then chained. As the last action of step 2603 the card sends the response data in message 2604 to the terminal. Upon reception of message 2604 the terminal starts execution of process step 2605. The first action is to chain the command data originally sent to the card. The next action is to chain the response data of the card. The process is then terminated. The command data and the response data are also encrypted using the then-current session state as a key, but this is not shown for clarity. If the command involves access to frames, then the card verifies whether the key which is required for that operation was used in the 'start session & proof keys' process of this session. For example, if the terminal reads a frame, the card ensures that the keys used to create the session state allow read access to the frame using the 'access' field of the frame. A similar verification is made for writing and deleting frames.

The 'commit session & end session' process as implemented in the preferred embodiment is shown in FIG. 27. In the first step of this process 2701 the terminal chains the command code for this process. It then encrypts a proof using the current session state. As a last action in step 2701 the terminal sends the proof to the card in message 2702. Upon reception of message 2702 the card starts execution of process step 2702. The card also chains the command code for this process, and the decrypts the proof sent by the card in message 2702. If the proof is invalid, the process is aborted, otherwise it is continued. The card then increments a commit counter and encrypts a second proof using the session state. Optionally the card also creates a public proof 'proof P', and stores these proofs in non-volatile memory. The last action in step 2703 is to send a message 2704 to the terminal indicating the card is ready to commit to the session. Upon reception of message 2704 the card starts execution of process step 2705. The only action in this step is for the terminal to send a message 2706 to the card indicating it should commit to the session. Upon reception of message 2706 the card starts execution of process step 2707. The first action is to set the COM variable to one. This is in fact the first action of step 2710 in FIG. 17 which shows the 'commit' process, all other actions already explained in FIG. 17 not being shown for clarity. At the same time the NDONE variable is set to one, indicating that the proof of this session has not successfully been sent to the terminal. Setting the NDONE variable and the COM variable should be atomic, which is achieved by setting the NDONE variable in the 'commit' process, in the 'reset' process if it finds the COM variable to be one. The NDONE bit is set to zero during the 'cancel' process and the 'reset' process if it finds the COM variable to be zero. The card then sends the second proof, and optionally the public proof to the terminal in message 2708, after which the card completes the 'commit' process of FIG. 17. Upon reception of message 2708 the terminal starts execution of process step 2709. This involves decrypting the second proof, and optionally the public proof. If the proofs are satisfactory, the terminal sends a message 2710 to the card. Upon reception of message 2710 the card starts execution of process step 2711 which clears the NDONE bit to 0. As will be obvious to someone ordinarilly skilled in the art, the NDONE bit can also be stored in a frame which is always updated during a session. This automatically solves the problem of setting the NDONE and COM variables at the same time.

This process is only relevant for sessions in which a frame was written or deleted. An update of the frame system, as described earlier, will start at the first write or delete operation. The 'commit session & end session' process is the usual way in which the 'commit' process of FIG. 17 is executed which then terminates the update.

As long the NDONE bit is one, the terminal can ask the card to re-send the second proof, and optionally the public proof, both of which are still retained by the card. This is shown in FIG. 32. The process starts at step 3200 in which the terminal sends the 'Get Proof' command to the card in message 3201. Upon reception of message 3201 the card starts execution of process step 3202. If the NDONE bit is still one, and thus the proofs are still available, the card sends the proofs to the terminal in message 3203. If the NDONE bit is zero, then no proofs are sent. When the terminal receives message 3203 it starts execution of process step 3204 in which it verifies the proofs and sends the 'Done' command to the card in message 3205. Upon reception of message 3205 the card starts execution of process step 3206 in which it sets the NDONE bit to zero. This implies that the proofs can no longer be read by the terminal.

It is believed that step 2705 and the messages 2704 and 2706 allow the terminal to bring the card to the very edge of the commit without actually doing it. It is believed that if at this point the terminal resets the card, then all frames revert to the value they had before the session, as the COM variable has not yet been set. It is believed that the additional step 2705 decreases the amount of time between the final message from the terminal to the card, and the sending of the proof in message 2708. It is believed that the setting of the COM bit in step 2707 has the result of both updating all the frames to their new value and enabling the proof to be sent.

The session state, which is maintained both by the card and the terminal, is used to link all the actions in a session together. FIG. 20 shows the basic idea. Suppose the terminal wants to read a specific frame from the card in a 'command & exchange data' process of FIG. 26. The actions of the card are shown in as item 2000 and the actions of the terminal are shown as item 2020. The card takes the existing session state 2011 and the data read from the frame 2013 as inputs to a function 2010. This function combines the existing session state 2011 with the data 2013 and yields a new session state 2012. The same two inputs are also combined in a different way to yield the encrypted data 2014 which the card sends to the terminal. The terminal has a similar process in which the existing session state of the terminal 2031 and the encrypted data just received from the card 2033 are used as inputs to a function 2030 which yields both a new session state 2032 and the decrypted data 2034. These functions are chosen in such a way that if the existing sessions states 2011, and 2031 are identical, then the two new session states 2012, and 2032 are identical, the decrypted data 2034 is identical to the original data input 2013. When the terminal sends data to the card, the same system with the roles reversed is used. The updating of the session state is the chaining referred to earlier. The functions 2010 and 2030 are chosen in such a way that they implement an iterative cryptographic hash function on the data that passes through them, the session state being the hash output.

In FIG. 20 there are two functions 2010 and 2030. As the card can be both sender and recipient, it would need an implementation of both functions. To simplify this, the preferred embodiment ues the solution in FIG. 21. The card has an implementation of the function 2110, and the terminal an implementation of box 2130. The existing session state is still used as inputs 2111 and 2131 to the functions, and both yield the new session state 2112 and 2132 as outputs. When the card wants to send data to the terminal, it uses the data input value 2113. Function 2110 updates the session state, and encrypts the data depending on the session state and outputs the encrypted data as 2114. This value is sent to the terminal, which uses it as input 2133 to function 2130 which also updates the session state and decrypts the data to provide output value 2134. Functions 2130 and 2110 are such that, if the existing session states 2111 and 2131 are identical, the output data 2134 is equal to the input data 2113, and the new session states 2112 and 2132 are also identical. If the terminal wants to send data to the card, it uses the data as input 2133, and the existing session state as input 2131. The function 2130 has two output values, 2132 which is the new session state, and 2134 which is the encrypted data. The terminal sends the encrypted data to the card, which uses it as input 2113 to function 2110 (which takes the existing session state as input 2111). Function 2110 yields two outputs, the new session state 2112 and the decrypted data 2114. Functions 2110 and 2130 are such that in this case too, if the existing session states 2111 and 2131 are identical, then the data output 2114 is equal to the data input 2133, and the new session states 2112 and 2132 are also identical. Thus, the same function is used for both sending and receiving.

The construction of function 2110 in the preferred embodiment is shown in FIG. 22. Item 2200 corresponds to function 2110. It takes two inputs, the existing session state 2201 and the data input 2202, and yields two result values, the new session state 2204 and the data output 2203. The session state 2201 is used as input to a cryptographic oneway function 2210 marked 'ksb' which produces the encryption/decryption value 2211. This is xorred with the data input 2202 by function 2212 which yields the data output value 2203. The data output value 2203 and the existing session state 2201 are then used as input to the chain function 2213 which yields the new session state 2204 as an output. In the preferred embodiment, both the oneway function 2210 and the chain function 2213 are different functions every time this function is computed in a session.

The construction of function 2130 in the preferred embodiment is shown in FIG. 23. Item 2300 corresponds to function 2130. It takes two input values, the existing session state 2301 and the data input 2302 and yields two result values: the new session state 2304 and the data output 2303. The existing session state 2301 is used as input to a cryptographic oneway function 2310 marked 'ksb' which yields the encryption/decryption value 2311 which is xorred with the data input 2302 by function 2312, yielding the data output 2303. The existing session state 2301 and the data input 2302 are used as input to the chain function 2313, which yields the new session state 2304 as output. The constituent building blocks of function 2300 and 2200 are identical in their functionality.

It is believed that the session system provides the following functionality: The terminal can only start sessions with a keyset for which the terminal has access to all those keys.

If the terminal does not have access to the keys, the verification in step 2507 will fail with high probability. If an adversary that has access to only a proper subset of the keys in use tries to eavesdrop, she will not be able to read the actual data being exchanged between the card and the terminal as the data is all encrypted using the session state. It is believed to be impractical for the attacker mentioned before to reconstruct the session state without access to all of the keys used. If an attacker tries to add certain commands to a session, then the session state of the card and the terminal will no longer be the same. This results with high probability in a failed proof in step 2703, which in turn results in an aborted transaction. This automatically results in a cancellation of any multi-update that is in progress. The session system links all actions together, and ensures that if any data in the card is modified, it is done by exactly the commands chosen by the terminal, and that the commands are executed in order. The terminal can still choose in step 2705 whether to complete the session and commit to all the updates, or to abort the session, and thereby the associated multi-update. If the card is interrupted at any point during a session, the associated multi-update has not finished which results in the card reverting back to its original state. If the card is interrupted after setting the COM variable to 1 in step 2707, for example by an inadvertent power down, then the terminal can still recover the second proof (called 'proof2' in FIG. 27) and the optional public proof. If the card is interrupted before the COM variable was set, the proofs cannot be retrieved from the card. This implies that, even under arbitrary interruptions of the card, either the multi-update happens and the terminal can read the proofs, or the multi-update is canceled and the terminal does not get the proofs.

It is anticipated that the card can store data about past transactions. This information can later be used for many purposes, for example, but without limitation, for accounting and testing purposes, or to possibly reverse the effects of a completed transaction.

SECRET KEY DEBIT/REDEBIT

Apart from reading and writing frames, the preferred implementation also supports a debit/redebit process which makes for an easier implementation of a pre-paid card for payments. This allows a balance register (sometimes called a balance) stored in a frame to be decreased (debited) by a specific amount using a different access key then the key used to write that frame. The redebit process allows the terminal to decrease the previous value of the register if, and only if, that terminal was the last one to perform a debit or redebit process on that register, this being protected by some simple authentication codes. During a redebit process the terminal must send the session state that was in use during the previous debit/redebit process on that balance register. As the debit/redebit process usually uses the session proof as a proof that the debit was performed, the usual arrangement is for the terminal to have a tamper-resistant device which has the keys necessary for this process, which keeps track of the total amount that has been debited in this way, and which securely stores the temporary key which allows the terminal to execute a redebit process with the card. A typical application for the redebit function would be for a coffee machine. Once the user has selected the required drink, the terminal debits the card for the amount of the drink and starts the machine. If the machine fails to provide the drink (for example due to a malfunction) the terminal can do a redebit command with a 0 decrement effectively giving the money back to the owner of the card. As both the debit and the redebit process require a different access key then the write-frame process requires, the terminal in the coffee machine does not need to have access to a key which would also allow the terminal to increase the value of a card. The details of this process are not shown, and will be obvious to someone ordinarily skilled in the art.

CONSTANT TIMING

The main use of tamper resistant computational devices, such as the card in our system, is to keep certain data secret and to securely execute some processes. Even if the function is only to execute some processes securely, the only way for the outside world to know that the card actually performed the process and that the results are genuine is for the card to authenticate the results of the process. This is generally done using cryptographic authentication systems, which require the storage and use of some secret key information. Most designs take proper care to ensure that the secret keys are kept secret and not sent out by the card. However, most designs are done on the level of the communication between the card and the interfacing device (terminal).

For this section we will assume that the terminal is trying to extract additional information from the card by any means. Apart from the standard communication, the terminal can measure several other things, such as the time between a command and its reply, or the power supply current that the card draws at any moment. These measurements have the potential of revealing more information about the internal operations in the card.

It is believed that at least one actual implementation of a smart card suffers from these problems. The card in question has a special co-processor on chip to allow it to do RSA signatures. It is believed that the terminal can determine when the co-processor is being used by measuring the power supply current as a function of time and the electro-magnetic field around the smart card chip. The RSA algorithm involves an exponentiation with a secret exponent. The exponentiation is, in this implementation, done using a square-and-multiply algorithm well known in the art. This algorithm involves a large number of squarings interlaced with a smaller number of multiplications. Measuring the activation times of the co-processor allows the terminal to deduce whether the next step is a multiplication or a squaring. With this knowledge the actual secret key used by the card in creating the RSA signature can easily be recovered.

It is believed that public-key algorithms are generally more susceptible to this kind of attack then secret key algorithms, but many secret key based systems still stuffer from these attacks. If, for example, a PIN verification routine in a smart card compares each digit in succession and aborts the comparison as soon as a mismatch is found, then the time between the start of the verification command and the 'PIN incorrect' response reveals which of the digits is wrong. It is believed that this reduces the average number of attempts that have to be made before the right PIN is found in an attack from 5000 to less then 40 for a 4-digit decimal PIN. Similar attacks are believed to work against certain secret-key based implementations. An obvious solution is to ensure that all processes which might reveal additional information to the terminal are executed in a fixed amount of time. It is believed that this can be achieved by inserting properly timed delay loops at appropriate places.

It is believed that many existing smart card implementations will reveal the presence of a file or directory on the card by the timing differences of the responses. Even in cases where the terminal does not have access to said file or directory, the timing of the response will differ depending on whether the file or directory exists or whether it does not exist. Furthermore, several smart card implementations will reveal the presence of files and/or directories to any terminal, even if the terminal has no access to the related smart card application. It is believed that it is standard practice for a smart card to reveal its identity number to any terminal. It is believed that terminals might use this information to invade the privacy of the owner of the smart card.

It is believed that for least one specific smart card chip it is possible to determine which instruction is being executed by detailed measurements of the power supply current as a function of time, allowing the terminal to determine which half of an IF statement was executed, even if the time taken for both branches was the same. As is usual in the art of cryptography, we always assume that the actual code used in the card is known to any attacker. It is a well established principle of cryptography and security systems that the security should only rely on the secrecy of key material, and not on the secrecy of the processes applied to the keys.

In the preferred implementation the card is careful not to reveal any additional information under these attacks. To ensure security against these attacks the card uses a single execution path. This means that for any process involving information which is not already known to the terminal, and to which the terminal might not have access, the same sequence of instruction is always used. For example, in the computation of a house such as FIG. 9, the architecture (number of columns and height of each column) is not secret from the terminal, but the actual values are. For any given architecture, the card always uses the same sequence of instructions to compute the house result value 979 from the house origin value 901, independent of the value of the house origin 901.

An example of how this is achieved is given in FIG. 31. The first process consisting of steps 3100, 3101, 3102 and 3103 show a typical conditional execution sequence. Starting at 3100 the first step 3101 verifies a certain condition 'cond'. If this condition is false the process continues at step 3103, otherwise it continues at step 3102. In step 3102 a counter 'cnt' is incremented, and two variables 'save1' and 'save2' are assigned with values 'x' and 'y' respectively. After step 3102, processing continues in step 3103 where the process is terminated. The second process consisting of steps 3110, 3111, 3112 shows a functionally equivalent process which does not use a conditional execution construction. After the process start in step 3110, the first action in step 3111 is to convert the condition 'cond' to an integer value which is 0 if the condition is false, and 1 if the condition is true. There are standard techniques for converting conditions to such an integer value which are widely used in certain higher-level language implementations. In step 3111 the value 'cond' is used to represent this value. The counter increment is now replaced by an addition: the value 'cond' is added to the counter. This has the same effect as incrementing the counter only if 'cond' equals 1. If the condition was false, then 'cond' is 0 and the operation has no effect. If the condition was true, 'cond' has a value of 1 and the addition adds exactly one to the value of 'cnt'. The action 'save1=x' is converted to a more complex action 'save1= cond*x+(1-cond)*save1'. If the condition was false, then 'cond' is equal to 0, and thus 'cond*x' is also equal to zero. At the same time '(1-cond)' is equal to 1, and thus '(1-cond) *save1' is equal to 'save1'. The sum of both expressions is equal to 'save1', so that the assignment has no effect. This is of course equivalent to the skipping of this action in the first process. If the condition is true, then 'cond' is equal to 1 and '(1-cond)' is equal to 0, so that the right hand side of the assignment has a value equal to 'x'. This is of course equivalent to the action 'save1=x' in the first process which is only executed if the condition is true. The third action shows another equivalent formulation, the variable 'save2' is replaced by an array with indexes '0' and '1'. The value of 'y' is assigned to 'save2[cond]', which implies that if the condition is true then 'y' is assigned to 'save2[1]' and if the condition is false then 'y' is assigned to 'save2[0]'. If the original 'save2' variable is put in the new 'save2[1]' and 'save2[0]' is discarded after the process, then 'save2[1]' will have the same value as the variable 'save2' had after their respective processes, assuming an equivalent starting state. These new actions in step 3111 are called functionally equivalent to the actions in step 3102 which are only executed if the condition 'cond' is true. The process terminates in step 3112.

As a more detailed example we will discuss FIG. 18 which shows the 'find frame' process discussed before. In the preferred implementation, this is one of the processes that uses a fixed execution path. The loop consisting of steps 1802, 1803, 1804, and 1805 is executed a fixed number of times, namely once for each frame slot. The number of frame slots is not a secret, so no special care has to be taken. However, the conditional execution by steps 1802 and 1803 might reveal if and where in the memory the frame was found, while this data might not always be available to the terminal. Thus, steps 1802 and 1803 are implemented in a single execution path using the techniques shown in FIG. 31. Steps 1810, 1811, 1820 and 1830 are also implemented using a single execution path, this involves rewriting the actions of steps 1820 and 1830 into a single sequence of actions which depends on the values of two conditionals. This is a simple generalization of the techniques shown in FIG. 31 and as will be obvious to someone ordinarily skilled in the art. The jump to step 1840 is not done within the single execution path. This enters 'broken' mode, which basically prevents any further normal processing. It is believed that it is unnecessary to hide this fact from the terminal, as it will be quite obvious to the terminal that the card has entered 'broken' mode.

In the preferred embodiment the single execution path is used for all processes for which the execution path taken might reveal any information to the terminal which the terminal would otherwise not learn. It is believed that this provides the best security against any of the attacks mentioned above. Obviously the single execution path does not imply that the same data is always being used in the actions. It is believed that no implementation using secret keys can be protected against an attacker which is able to determine both the execution path, and the data being used in the process.

EMV

The preferred embodiment includes an implementation of the EMV system. It is appreciated that someone of ordinary skill in the art would be familiar with the specifications of the EMV system which were referenced earlier. The preferred embodiment implements the EMV system and incorporates several improvements, among others a dynamic off-line authentication of the data sent by the card to the terminal.

The preferred embodiment is shown in FIG. 28. The process starts at the terminal in step 2800, which is followed by step 2801 in which the terminal asks the card for the application data. This request is coded into message 2802. When message 2802 is received by the card, it starts execution of process step 2803. In step 2803 the card sends the application data requested to the terminal in message 2804. In the EMV system and in the preferred embodiment this sending of application data is actually achieved using several requests in sequence, these are not shown for clarity. Upon reception of message 2804 the terminal starts execution of process step 2805. Execution of steps 2805, 2807, 2808, 2809, 2811, 2812, 2814, 2816, and 2817 occurs only when the transaction is conducted on-line. In the off-line case these steps are omitted (see EMV specifications for more detail). It constructs an authorization request and sends it to the issuer, or a representative of the issuer in message 2806. When message 2806 is received by the issuer, it starts execution of step 2807, in which it processes the authorization request. The next step 2808 consists of the creation of a valid script for the terminal, after which both the authorization response and the script are sent in step 2809 to the terminal in message 2810. When message 2810 is received by the terminal it start processing of step 2811. In step 2811 the terminal processes the script it received from the issuer, this involves sending the commands and data given in the script to the card and awaiting any response. The EMV specifications allows the script to be executed before or after the external authentication in steps 2812, 2814 and 2815. Both possibilities are shown in FIG. 28, and a simple extension would allow two scripts to be used. Our preferred embodiment typically executes the script in step 2811. After step 2811 the terminal in step 2812 sends the authorization code to the card in message 2813. The card verifies the code in step 2814 and sends the result of the verification to the terminal in message 2815. Upon reception of message 2815 the terminal executes process step 2816 in which it verifies the response. The next step 2817 is again the execution of a script with the card (see comments for step 2811). All actions described so far are an embodiment of the EMV specifications. In step 2818 the terminal requests a payment proof of the card, which it sends in message 2819. Upon reception of message 2819 the card executes step 2820 in which it computes the appropriate payment proof and sends the result to the terminal in message 2821. Upon reception of message 2821 the terminal starts execution of process step 2822 in which it verifies the proof of payment, after which processing terminates at step 2823.

Most of the steps described above correspond directly to actions specified in the EMV specs. The preferred embodiment adds a dynamic authentication to the EMV specifications. In the EMV system there is no provision for convincing the terminal of the authenticity of the card and the messages the card sends in the off-line case. The proof of payment of step 2820 (called TC in EMV) is based on a secret key proof, and it is believed that it is not the intention to let the terminal verify the TC. Therefore, in the off-line case in EMV the terminal is susceptible to replay attacks, as are well known in the art. The preferred embodiment uses the compact endorsement signatures to rectify this. In step 2820 a second element is added to the payment proof. The TC is still sent, but in addition the card authenticates all the data it sent to the terminal during the transaction using a compact endorsement signature in the variant that can authenticate an arbitrarily long message, as described earlier. If message 2821 is lost during transmission then the terminal can ask the card to retransmit the data, in the same manner as the proof(s) of a session can be retransmitted, as shown in FIG. 32. It is believed that the terminal can verify the compact endorsement signature and thus be assured of the authenticity of the data sent by the card, and therefore also of the correctness of the TC.

The script that the issuer creates can be used to securely perform a variety of functions, a typical application would be the increasing of a balance of some form. The scripts are just a set of commands which the terminal sends to the card. These are chosen in such a way by the issuer that they constitute a session, as described earlier. A direct session between the card and the issuer to increase a balance would involve more then 2 messages between the terminal and the issuer: the start session process alone would require 2 messages between the card and the issuer (and therefore between the terminal and the issuer). The old limit would have to be read, and then the new limit written requiring more messages. Most existing networks for financial transaction authorization are built upon a 2 message authorization, adding additional messages could lead to complications. The preferred embodiment uses the sessions in a different way, allowing the increase to occur using the existing sessions and using only 2 messages between the terminal and the issuer. As mentioned before, the card challenge consists of some counters. These counter values are included in the data sent in messages 2804 and 2806. The issuer now has enough information to simulate the behaviour of the card in the session, specifically it knows the card challenge that the card will use. This allows the issuer to generate all necessary messages for the successful completion of a session. Instead of a special 'add amount to balance' function, the preferred embodiment uses the standard read frame and write frame functions. To this end, the current value of the balance is also included in messages 2804 and 2806. The issuer includes a 'read frame' function in the script. The issuer already knows the answer, but the answer is also chained into the session state, as described earlier. If the balance was changed to a different value before the execution of the script, this will result in a different chain state in the card, which results in a failed proof in the 'commit session & end session' process. As an example, but without limitation, a complete script would consist of a 'start session & proof keys' command, a 'read frame' on the balance, a 'write frame' on the balance, and a 'commit session & end session' command. To prevent the terminal from withholding the script, the authorization code sent in message 2813 depends on the data of the script, so that the authorization will fail if the terminal does not execute the script. As will be obvious to someone ordinarilly skilled in the art, the authorization code can also be used to notify the card that a script is to be performed in step 2817.

The process of performing a script is shown in more detail in FIG. 33. The process begins at step 3300 at the terminal and continues a step 3301 where the terminal sets an index variable 'n' to zero. The next step 3302 checks whether the 'n'th command in the script exists. If the 'n'th command does not exist, processing continues at step 3309. If the 'n'th command does exist, processing continues at step 3303. In step 3303 the terminal sends the command and associated data of the 'n'th command in the script to the terminal in message 3304. Upon reception of message 3304 the card starts processing of step 3305 in which it performs the actions associated with the command and sends the response to the terminal in message 3306. Upon reception of message 3306 the terminal starts processing of step 3307, in which it checks the response message for an error code. If the card reported an error, processing continues at step 3310. If the card did not report an error, the process continues at step 3308, in which the terminal increments the 'n' variable by one. The process then continues at step 3302. In step 3309 the terminal signals a successful completion of the script process. In step 3310 the terminal signals a failure in the script process. In either case the process continues with step 3311 where the process is terminated.

The EMV specifications include some unspecified 'risk management' which the card performs, some specific 'risk management' which the terminal performs, an unspecified authorization process which the issuer performs for on-line transactions. The preferred embodiment uses a general structure which can be used to implement both credit card transactions, pre-paid debit card transactions, ATM card transactions etc. The card keeps a balance representing the amount that can still be spent using that application. In every successful payment, the card decreases this balance by the amount of the payment. The card will refuse an off-line payment for an amount that exceeds the balance in the card, and will request an on-line transaction. To increase the balance of the card, the issuer can send the appropriate commands in the script which increase the balance. In the preferred embodiment the card increases the ATC (Application Transaction Counter) only for successfully completed transactions.

In the preferred embodiment, once the the card has issued an ARQC and thus asked for an on-line transaction, the card will not perform any off-line transactions until a successful on-line transaction has been completed.

In the preferred embodiment the issuer keeps a database of all on-line requests, and of all the payment data it receives from the terminals (possibly through the acquirer) relating to off-line payments. For any off-line or on-line payment, the ATC value of the card is included in the data that reaches the issuer. For on-line transactions, the balance of the card is included in the data that reaches the issuer. The information related to different transactions might reach the issuer in a non-chronological order. As the card increases the ATC only for successful transactions, the issuer knows exactly how many 'previous' transactions it can still expect. Specifically, in any on-line transaction, the issuer learns the current ATC of the card, and therefore knows how many off-line transactions the card made since the previous on-line transaction. The issuer also learns the current balance of the card, and can thus determine the total amount of the off-line transactions since the previous on-line transaction. It is believed that this provides adequate information to the issuer to make the necessary decisions for the on-line transaction, and any possible script to increase the balance on the card.

The interaction between the card and the issuer are shown in FIG. 47. This shows the card 4700, the terminal 4704 and the issuer 4706. The card has a balance (CB) 4701, a cryptogram counter (ATC) 4702 and some card counters 4703. In the preferred embodiment there are two counters, one of them is incremented for each 'commit' process, the other is incremented during each 'commit' or 'cancel' process. These counters are used as the card challenge in the sessions. The card and terminal communicate over communication channel 4720; the terminal and the issuer communicate over communication channel 4721. During a transaction the terminal typically sends a single message to the issuer, which replies with a single message. The issuer uses three databases: the card base 4708, the event base 4709 and the terminal base 4710, and communicates with those data bases using communication channel 4722. The terminal base contains data associated with each terminal, and is not shown in detail for clarity. FIG. 48 shows the data fields of a record in the card base. The first field 4800 contains the primary account number (PAN) and the sequence number. This is a unique identification of the card, the primary account number usually corresponds to the credit card number, or bank account number, while the sequence number distinguishes several cards that use the same PAN, for example, but without limitation, two credit cards on the same account. The next field 4801 contains information about the card status and configuration, which is not shown in detail for clarity. In field 4802 the highest known ATC of the card is stored. Field 4803 stores the ATC value of the last completed on-line transaction, that is, for which the issuer has received the corresponding TC. In field 4804 the issuer stores the ATC value for the last ARQC it received. In field 4805 the issuer maintains the known card balance KCB, which is the issuers best approximation of the current balance of the card. The last field 4806 contains a settling amount SA, which is the amount the issuer plans to add to the card's balance in the next on-line transaction. FIG. 49 shows the fields of a record of the event base, each record representing an event. The first field 4900 contains the PAN and sequence number, which uniquely identifies the card. The field 4901 contains the ATC of the event, field 4902 the status of the event, field 4903 the amount of the event, field 4904 the card counter values for the event, field 4905 the card's balance during the event, and finally field 4906 the settling data for the event.

FIG. 50 shows a global overview of the issuer processing during an on-line transaction. In the first step 5000 the issuer receives the authorization request for the transaction, including terminal data and card data. The terminal data typically includes the terminal identity; the card data typically includes the PAN and sequence number, the amount of the transaction, the current value of the card counters, the card balance, the current atc etc. In the next step 5001 the issuer makes some elementary checks on the validity of the data received. In step 5002 the issuer updates the known balance KCB based on the actual carc balance CB. In step 5004 the issuer checks for a settling amount for the card, and adds it to the script amount. In step 5005 the issuer decides whether or not to accept the transaction, and finally in step 5006 the issuer sends the authorization for the transaction to the terminal, with an optional script to perform any necessary adjustments of the balance. FIG. 51 shows a global overview of the issuer processing when it receives the transaction data relating to an off-line transaction from a terminal. In the first step 5100 the issuer receives the transaction data, which typically includes a terminal identifier, card data, the amount and a transaction cryptogram. In the next step 5101 the issuer checks the validity of the terminal and card data. In step 5102 the issuer checks the validity of the transaction, among other things it checks that the cryptogram is correct. In the final step 5103 the issuer updates the known card balance KCB based on the card balance given with the transaction.

FIG. 52 is in two parts, shown as FIG. 52A and FIG. 52B. It shows a more detailed description of the issuer processing during an on-line transaction shown in less detail in FIG. 50. Some steps of this processing are not shown for clarity. The first step 5200 is the start of the process. At this point the issuer has already received the authorization request, including the card identity, the terminal identity, the ATC, the ARQC, the amount, the card counters, the card balance CB etc. In the next step 5201 the issuer sets a variables called 'script amount' to zero, and a variable called 'temp kcb' to the given card balance CB. The 'script amount' variable will contain the amount for which a script will be generated, the 'temp kcb' is used to update the KCB stored by the issuer. The issuer looks up the record for the card in question in the card base, and also the record for the terminal in question in the terminal base. The issuer verifies that the ARQC cryptogram is valid, that the terminal is valid, that the card is valid, that the card has not exceeded its expiration date and that the card has not been blocked. In the next step 5202 the issuer checks whether the HATC (highest known atc) is less then the current ATC. If this is not the case the process continues at step 5213, as indicated by the labels 5250 and 5212. In this case the ATC of the card is lower then the highest known ATC from that card, so the card's ATC must have decreased. A proper functioning card never decreases the ATC, so this is classified as an 'card fraud detect', an attempted fraud by the card, which is practice means that the tamper-resistance of the card must have been broken, that the card must have malfunctioned, or that something else in the system is wrong. If the condition in step 5202 is true, the process continues at steps 5203. In step 5203 the issuer checks whether the ATC is equal to the ATC of the last authorization request. If this is the case, processing continues at step 5204, if this is not the case processing continues at step 5214. If the ATC is equal to the LAATC, then the last transaction was not completed successfully, as the ATC would have increased had it completed successfully. Thus, getting a second authorization request with the same ATC value implies that the previous transaction was not completed. It is, however, possible that the script was executed but the transaction didn't complete. As all scripts in the preferred embodiment modify the card balance, the issuer can detect whether the script was performed or not. It is anticipated that for scripts that do not modify the balance, some other value will be used for this function. In the preferred embodiment, the card will not perform an off-line transaction after a failed on-line transaction, so no off-line transactions can occur between a failed on-line transaction and the next on-line transaction. In step 5204 the issuer checks whether a script was issued during the last authorization request, by looking up the recorded events in the event base. If no script was issued, and thus no update of the CB is still outstanding, the process continues at step 5205, otherwise it continues at step 5206. In step 5205 the issuer checks whether the balance recorded in the event base for the last authorization request is the same as the current card balance. If this is not the case, processing continues at step 5213 (via 5210 and 5212). Otherwise, processing continues at step 5223 (via 5211 and 5222). In step 5206 the issuer checks whether the CB is equal to the balance recorded in the event base during the previous authorization request. If this is the case, processing continues at step 5208, otherwise, it continues at step 5207. In step 5207 the issuer checks whether the card balance is the sum of the balance recorded for the previous authorization request and the update amount of the script issued during that authorization process. If this is not the case, the card balance has changed in an inexplicable way, and processing continues at step 5213 (via 5210 and 5212), otherwise processing continues at step 5209. In step 5208, the issuer knows that the script of the previous on-line transaction was not completed, and adds the update amount of that script to the 'script amount' variable. In the next step 5209 the issuer marks the record in the event base that contained the information about the script of the previous on-line transaction as either 'completed' or 'incompleted'. That script is then no longer outstanding. After step 5209 processing continues at step 5223 (via 5211 and 5222). In step 5213 the process stops and has detected an error. In step 5214 the issuer checks whether the last authorization request atc LAATC is equal to −1. If this is the case, processing continues at step 5219, otherwise it continues at step 5215. The value −1 is used to indicate that the last authorization request was part of a successful transaction. In step 5215 the issuer checks in the event base whether there is still an outstanding script to update the CB. If this is the case, processing continues at step 5217, otherwise it continues at step 5216 where the 'temp kcb' variable is set to the value of the balance during the last authorization request. In step 5217 the 'temp kcb' variable is set to the sum of the balance during the last authorization request and the amount of the update of the outstanding script. In the next step 5218 the script in question is marked as 'completed', thus removing it from the 'outstanding' state. In steps 5217 and 5218 there was an outstanding script, and now a new ATC is seen by the issuer, thus the previous authorization transaction was successfully completed. At the start of step 5219 the 'temp kcb' variable is an upper bound on the current balance of the card, and in step 5219 the issuer checks whether the card balance CB is larger then 'temp kcb'. If this is the case, processing continues at step 5213 (via 5220 and 5212), otherwise it continues at step 5223 (via 5221 and 5222). In step 5223 the issuer checks whether the settling amount is positive. If this is not the case, processing continues at step 5225, otherwise it continues at step 5224 where the settling amount is added to the 'script amount' variable, after which processing continues as step 5225. In step 5225 the issuer first verifies that the amount of the transaction is at most the sum of the current card balance BC and the 'script amount' variable. If this is not the case, the card balance is insufficient and the issuer does not give an authorization for the transaction. Next the issuer checks whether the script amount is not zero. If this is not the case, processing continues as step 5227, otherwise it continues at step 5226 in which the issuer creates a script for the card using the data available, adds the essential script information to the event base, and sets the settling amount in the card base to zero, after which processing continues at step 5227. In step 5227 the issuer checks whether LAATC is not equal to −1, and whether ATC is greater then LAATC. If this not the is the case, processing continues at step 5229, otherwise the process continues at step 5228 where the LOATC value is set to the LAATC after which the process continues at step 5229. In step 5229 the issuer adds a record to the event base containing the essential information about this transaction. In the next step 5230 the issuer updates the LAATC value to ATC, the HATC to ATC-1 and the KCB value to CB, after which process is terminated in step 5231. After the process the issuer sends a response to the terminal, containing the authorization cryptogram, the optional script etc.

FIG. 53 shows a more detailed description of the issuer processing when it receives the transaction data of an off-line transaction, which was shown in less detail in FIG. 51. Before the start of the process, the issuer receives the transaction data, typically including the card PAN and sequence number, the amount, the terminal id, the ATC, the card balance etc The issuer retrieves the record associated with that card from the card base. The issuer verifies the validity of the various identities, and checks that the transaction cryptogram TC is valid. The issuer looks up the PAN/sequence number/ATC combination in the vent base to check that this transaction number has not occurred before. The process starts at step 5300. In the next step 5301 the issuer checks whether ATC is greater than HATC the issuer has for that card. If this is not the case, the process continues at step 5303, otherwise it continues at step 5302 in which the HATC value is set to the ATC value, after which the process continues at step 5303. These steps ensure that the HATC value is maintained as the largest ATC value for which a valid TC was received. In step 5303 the issuer checks whether LAATC is equal to −1 and ATC is greater or equal to LAATC. If this is not the case, the process continues at step 5309, otherwise it continues at step 5304. In step 5304 the issuer sets the LOATC to LAATC, and sets the LAATC to −1. This serves to maintain the LOATC value, which is defined as the last ATC value for which the issuer knows an on-line transaction was successful with that card. In the next step 5305 the issuer checks whether a script was issued during the last on-line transaction by looking in the event base. If this is the case, processing continues at step 5307, otherwise it continues at step 5306. In step 5306 the issuer sets the KCB value to the card balance that the issuer received during the last authorization request, and continues at step 5309. This is an upper limit to the current card balance. In step 5307 the issuer sets the KCB value to the sum of the card balance during the last authorization request and the amount of the update value used in the script of that request. This again is an upper limit to the current card balance. In the next step 5308 the issuer marks the event record associated with that script as 'completed'. In step 5309 the issuer checks whether ATC is greater or equal to LOATC, if this is the case then the amount of the transaction is subtracted from the KCB value in step 5310. The process terminates in step 5311.

It is believed that the processes shown in FIGS. 52 and 53 implement a secure method for managing the card balances, ensuring that the card does not get a higher balance than intended, and that any attempted increases in the balance of the card are completed.

The processes shown in FIGS. 52 and 53 are fairly specific to the card as implemented in the preferred embodiment. Depending on various implementation details, the exact order and type of actions in the issuer processes might vary, as will be obvious to someone ordinarilly skilled in the art.

For a credit card application the balance would be the OTB (Open To Buy). This is the amount of money that the user can charge to the credit card before a transaction will be refused. It is believed that most current credit cards have such an OTB limit (sometimes called the credit limit). It is believed that having the card maintain the OTB allows off-line transactions to occur without the risk of exceeding the OTB. Under some circumstances, the OTB should be increased, a typical example of such a circumstance is when the user has paced an outstanding credit card bill: the amount paid can be added to the OTB. Typically this will not be communicated to the card directly, as there is no communication link available. The card continues to use its old OTB value, until an on-line transaction occurs. One of the possible reasons for an on-line transaction is that the OTB in the card is exhausted. During that transaction the issuer can send a script to the card increasing the OTB to the new value and allowing further off-line transaction to occur. It is believed that the preferred embodiment can be used in this way with only a small fraction of the transactions being on-line, and without compromising security. The credit card might also be used to perform traditional credit card transactions, not using the EMV system. This might result in the OTB being decreased without the card's knowledge. It is believed that the issuer can use the script to reduce the OTB in the card. As will be obvious to someone ordinarilly skilled in the art the issuer might also split the 'real' OTB of the credit card, and give part of it to the card for use in off-line transactions, while keeping the other part in at the issuer for use in traditional credit card transactions. It is believed that using the script, the issuer can in such a setting increase or decrease the card's OTB depending on the OTB remaining at the issuer, thus balancing the two OTBs in case one of them is depleted more then the other.

For a pre-paid debit application the balance would represent the amount of money stored on the card. During payments this amount typically decreases. Again the card can do an arbitrary number of off-line transactions until the balance has been exhausted. In an on-line transaction, the issuer can increase the balance using a script. In pre-paid applications this would require the user to pay the issuer for the additional money that it puts on the card. This might for example, but without limitation, be accomplished by integrating a bank account withdrawal (similar to the cash withdrawals at current ATMs). During an on-line transaction, the card has already been authenticated. The EMV specifications already allow a cardholder verification procedure to be included, such as the entry of a PIN code. The card authentication and the PIN code entry provide the same functionality as current cash withdrawals at ATMs, and could possibly be used in a pre-paid withdrawal where the cardholders bank account is debited, and the balance on the card is credited. In the preferred embodiment the card has an option to require a PIN during a transaction, in that case the card will not complete a transaction without a valid PIN, such a mandatory PIN enforced by the card is not included in the EMV specification. As will be obvious to someone ordinarilly skilled in the art, such mandatory verifications enforced by the card can also be applied to any other cardholder verification method.

For an on-line debit application the balance itself is not really necessary. The balance can be rendered ineffective by various means, among others giving it a very large value. The card authentication and the cardholder verification mentioned above can be used to directly debit the cardholders bankaccount in an on-line transaction, which might also credit the terminal owner's bankaccount at the same time.

It will be obvious to a person of ordinary skill in the art that a single card can contain several EMV compatible applications, and can thus be used for several of these applications.

CARD INSTRUCTIONS

In the preferred embodiment the card is a smart card, and communicates with terminals using the ISO 7816 standard protocol. In this protocol the terminal issuer a sequence of commands to the card. Every command consists of a command header sent from the terminal to the card, some optional data transfer from the terminal to the card and an optional data transfer from the card to the terminal, and finally a result code sent by the card to the terminal. An overview of the sequence in which the commands are meant to be used is shown in FIG. 29. The card does not allow any other sequence. At any point in time the terminal can start at step 2900, follow the arrows and issue the commands in the order encountered. After step 2900 the terminal continues either at 2901, 2920, 2921 or 2930.

In step 2901 the terminal sends the first of two command that together implement the start session process of FIG. 25. Subsequently in step 2902 it sends the second command of the start session process. The terminal then sends one or more commands from the set 'get frame' 2903, 'put frame' 2904, 'debit frame' 2905, 'redebit frame' 2906, 'kill frame' 2907 and 'public debit' 2908. After this sequence of commands the terminal sends a 'commit' command which terminates the session, and executes the 'commit' process described earlier. After a session the terminal can start again and issue the 'get proof' command 2920 to get the proofs from the previous session, and the 'done' command 2921 when the proof has been successfully read. The commands mentioned so far implement the basic card functionality.

The EMV implementation is largely separate and conforms to the EMV specifications mentioned above. It starts at step 2930 in which the terminal sends a 'select file' command, which is repeated any number of times. To start a new transaction, the terminal continues with step 2931, to get the transaction proof of the last transaction again the terminal issues the 'get last AC' command 2940 after step 2930. In step 2931 the terminal issues the 'manage application 1' command, after which it enters a loop in which it executes either of the commands 'get file' 2932 and 'get data' 2933 one or more times. After this loop, the terminal sends the 'verify' command 2934 one or more times. (Execution of the verify command is optional under some circumstances, but this is not shown here for clarity.) The next step is for the terminal to send the 'generate AC 1' command. For an off-line transaction the terminal continues at step 2939, for an on-line transaction the terminal continues at step 2936 in which it sends a sequence of commands from a script to the card. The commands that can appear here in 2936 are exactly those that appear in the dotted frame 2910 and are not shown in detail for clarity. Execution of step 2936 is optional. The next command is 'external authenticate' 2937, after which the terminal sends the 'generate AC 2' command in step 2938. Command 2937 and 2938 are optionally. Finally the terminal sends a 'manage application 2' command.

For an off-line transaction, the correspondence between FIGS. 28 and 29 are as follows: The steps 2930 and 2931 are administrative and not shown in FIG. 28. The steps 2801 and 2803 are implemented using the commands 2932 and 2933. Command 2934 is not shown in FIG. 28 for clarity. For an off-line transaction, steps 2805 till 2817 are not executed. Steps 2818 and 2820 correspond to command 2935, the next command the terminal issues is 2939 which is not shown in FIG. 28 for clarity.

For an on-line transaction the correspondence between FIGS. 28 and 29 are as follows: The steps 2930 and 2931 are administrative and not shown in FIG. 28. Commands 2932, 2933 and 2935 together implement steps 2801 and 2803, the command 2934 not being shown in FIG. 28 for clarity. The script of step 2811 corresponds to commands 2936 which basically involves an arbitrary session. The external authenticate command 2937 corresponds to steps 2812, 2814, 2816. Step 2817 is not supported in the command set shown in FIG. 29. Steps 2818 and 2820 are implemented by command 2938, while command 2939 is not included in FIG. 28 for clarity.

FIGS. 34, 35, 36, 37 and 38 show the detailed steps of all the commands. Every command consists of three steps, we will use the 'start session 1' command as an example. The first step 3400 is executed by the terminal. The terminal sends a message 3401 to the card which includes a command code to tell the card which command is being executed, and which might include some other data. When the card receives the message 3401 it starts execution of the second step 3402. This involves the card sending a message 3403 back to the terminal. This message consists of some optional data, plus a result code. When the message 3403 is received by the terminal, the terminal starts execution of the third step 3404. No action is taken in the third step apart form the analyses of the contents of the last message. Each command corresponds to a single APDU, but might be implemented as two T=0 commands as described in the ISO 7816 standard. This same structure is repeated for each of the commands. The same structure is repeated for all commands, the items (3400, 3401, 3402, 3403, 3404) corresponding with (3410, 3411, 3412, 3413, 3414), (3420, 3421, 3422, 3423, 3424), (3430, 3431, 3432, 3433, 3434), (3500, 3501, 3502, 3503, 3504), (3510, 3511, 3512, 3513, 3514), (3520, 3521, 3522, 3523, 3524), (3530, 3531, 3532, 3533, 3534), (3600, 3601, 3602, 3603, 3604), (3610, 3611, 3612, 3613, 3614), (3620, 3621, 3622, 3623, 3624), (3630, 3631, 3632, 3633, 3634), (3700, 3701, 3702, 3703, 3704), (3710, 3711, 3712, 3713, 3714), (3720, 3721, 3722, 3723, 3724), (3730, 3731, 3732, 3733, 3734), (3800, 3801, 3802, 3803, 3804), (3810, 3811, 3812, 3813, 3814), (3820, 3821, 3822, 3823, 3824), (3830, 3831, 3832, 3833, 3834), and (3930, 3931, 3932, 3933, 3934) respectively. We will refer to any one of these commands by the number of their first step.

In the 'start session 1' command 3400 the terminal sends a bitmask which indicates which keys will be used in the session, and the terminal challenge. This corresponds to step 2501 in FIG. 25. The card sends the card challenge back, corresponding to step 2503. In the 'start session 2' command 3410 the terminal sends the card the proof that it knows the keys, corresponding to step 2505. The card responds with only a response code. In the 'get frame' command 3420 the terminal sends the tag field of the frame to be read to the card, and the card replies with the (encrypted) card data, plus an authentication (proof) of this data. In the 'put frame' command 3430 the terminal sends the tag, the access field value, the data and an authentication proof to the card. The card sends a response code. In the 'kill frame' command 3500 the terminal sends the tag of the frame to be removed, and an authentication proof to the card. The card responds with a response code. In the 'debit frame' command 3510 the terminal sends an identifier of the balance to be debited, and an amount to be debited. The card subtracts the given amount from the balance indicated and sends a response code. In the 'redebit frame' command 3520 the terminal sends an identifier of the balance to be redebited, the amount of the redebit, and the redebit key. The card replies with a response code. In the 'public debit' command 3530, the terminal sends the balance indicator, the amount of the payment, and the random challenge to the card. The card replies with a response code. In the 'commit' command 3600 the terminal sends the session proof to the card, the card replies with a response code. In the 'done' command 3610 no additional data is exchanged. In the 'get proof' command 3620 the terminal sends only the command header to the card. The card replies with the session proof, and optionally the public proof. In the 'select file' command 3630 the terminal sends an AID or RID to the card which replies with an FCI. In the 'manage application 1' command 3700, the terminal sends a 'init' code to the card which replies with a response code. In the 'manage application 2' command 3710 the terminal sends an 'exit' code to the card, which replies with a response code. In the 'get data' command 3720 the terminal sends a data object tag to the card, which replies with the data object. In the 'get file' command 3730 the terminal sends the file number and the record number to the card, which replies with the requested record. In the 'generate AC 1' command 3800 the terminal sends the requested AC type and the TDOL values to the card, which replies with an AC type, the AC and the ATC. In the 'generate AC 2' command 3810 the terminal sends the requested AC type and the card replies with the AC type, the AC and the ATC. In the 'external authenticate' command 3820 the terminal sends the authentication proof to the card, and the card replies with a response code. In the 'verify' command 3830 the terminal sends the CVM method and the CVM data to the card which replies with a response code. In the 'get last AC' command 3930 the terminal sends only the command code to the card, which replies with the AC type, the AC and the ATC.

CLEARING METHODS

Once the transaction between the card and the terminal has been completed, there can be a clearing process in which the information from different transactions are collected and combined. The example of clearing we will use to describe the processes is the clearing of financial payments. The card is used to perform payments to the terminal. One example of a clearing system is for the terminal to send all the transaction data regarding the payments to the acquirer/issuer which adds the amounts and credits the terminal's account with the total sum. The role of the acquirer 104 is to collect information from several terminals, and reimburse the terminals in 'real' money for the payments they received. As the issuer hands out the money and the acquirer receives it, there must be some kind of settlement between the issuer and the acquirer. Typically the issuer and acquirer will be parts of the same organization, or organizations that work closely together. We will describe several different clearing methods that can be used under different circumstances.

Full data.

One of the simplest clearing methods is for the terminal to retain all the relevant data from the payment transaction with the card. During clearing the terminal sends all data to the acquirer which verifies every transaction certificate and then credits terminal. This gives the acquirer access to all transaction details, at the cost of handling every transaction in full.

Truncating SAM.

The terminal can also be equipped with a secure application module (SAM). This is a tamper-resistant device made by the acquirer. The function of the SAM is to verify the transaction data and add the value of all the received payments. The transaction data is then discarded. This process is usually called truncation. During the clearing process, the SAM informs the acquirer of the total amount received, and cryptographically signs a message to this effect for the acquirer.

Truncating SAM with some individual payments.

The terminal is again equipped with a SAM. As in the truncating SAM option, the SAM verifies the transaction data and keeps the totals. However, not all transaction data is discarded, but some or all of the transaction data for some of the transactions is kept. During the clearing process this data is also sent to the acquirer. The selection process that chooses for which transactions transaction data is retained can be performed in various ways, by the terminal, by the SAM, or by a combination of the two.

Truncating SAM with skeleton transactions.

A SAM in the terminal is used to verify all transactions. For each transaction, only skeleton transaction information is retained by the terminal. This would typically include the amount, date, time, card identity (if available) etc. The skeleton data is sent to the acquirer during the clearing process. The SAM ensures that the skeleton data sent to the acquirer is correct (by signing it using a digital signature scheme), and might optionally keep totals of the transactions and transfer them separately to the acquirer.

Skeleton transaction with statistical checking.

In this solution the terminal retains all transaction data for all transactions. During the clearing process the terminal first sends skeleton information for every transaction. This would typically include the amount and some information which uniquely fixes the rest of the transaction data, such as a cryptographic hash on the rest of the transaction data. The acquirer then asks for the full transaction data for some of the transactions, which the terminal sends to the acquirer. The acquirer then verifies these transactions.

Binary hash tree with statistical checking.

This method is similar to the previous one in that the terminal retains all transaction data. Instead of sending skeleton information about all the transactions, the terminal now sends only a fixed amount of data to the acquirer after which the acquirer can choose a subset of the transactions to inspect for proper handling. The terminal builds a binary tree, where each node contains two values: the amount and the hash. There is one leaf for every transaction, which contains the amount of the transaction, and the hash of the transaction data. The amount at each non-leaf node is the sum of the amounts in the subnodes. The hash value at each non-leaf node is a cryptographic hash of all the data in the subnodes. The terminal sends the number of transactions (which also determines the structure of the tree), plus the amount and hash value of the root of the tree to the acquirer. The acquirer then selects a subset of the transactions, and sends the selection to the terminal. The terminal responds by sending the transaction data of the selected transactions, plus the amount and hash values at some of the nodes. The choice of which nodes to send depends on the selection by the acquirer. The nodes selected are those that are the root of a maximal subtree that does not contain a leaf of a selected transaction. In other words, those nodes whose hash does not depend on any selected transaction, but whose parent node does depend on a selected transaction. Given these values the acquirer can verify the selected transactions, and verify those parts of the binary tree that are on a path from the root to any one of the selected transactions.

In some of the clearing systems the issuer can keep track of all transactions that have occurred. Although cards are tamper-resistant they are not tamper-proof. One attack is to 'break' a card, extract all secret information from it and create many duplicate cards, this attack is also called cloning. If each transaction has a unique number which the cards use in sequence, then the issuer can detect the cloning as the cloned cards will either reuse old transaction numbers, or they will use the numbers out of order. As long as the transaction numbers are all sent to the issuer, this allows detection of this fraud. Once the fraud has been detected, the issuer can blacklist the cloned card.

If the card uses a general digital signature scheme, or a secret key based authentication system, it is easy to include a transaction counter in the data being authenticated. Most systems currently built and/or proposed actually have such transaction counters. The compact endorsement signatures disclosed above do not have an inherent numbering, but this can be added. The houses in a town have already a number, and are always used in the same order. The issuer can add a sequence number to each town it gives to the card, and include this sequence number in the town signature. (This way, the town signature is a signature on the sequence number and the town result value.)

The full data clearing system does not require a SAM but might lead to a large amount of data being transmitted from the terminal to the acquirer. This can be costly depending on the communication system used.

The SAM-based systems all need a SAM, which by itself can be an expensive piece of equipment. In an environment with multiple issuers, either all issuers have to trust the same SAM or each terminal needs a SAM for every issuer.

The last two clearing systems do not require a SAM, but let the terminal do most of the truncation. If a terminal tries to defraud the acquirer/issuer then the terminal will be caught with a certain probability by the statistical checking. Depending on the amount of checking and the selection methods used by the acquirer the expected amount of successful fraud by a terminal before being caught by the acquirer can be fixed. For example, but without limitation, if the terminal sends skeleton data for each transaction to the acquirer, the acquirer can use the following algorithm to select transactions for full review. If the amount of the transaction $100 or more then the transaction is selected. If the amount of the transaction x is less then $100, then the transaction is selected with probability X %. Thus, a transaction of $5 would be selected with a 5% probability. It is believed that using this selection method the acquirer is ensured that the expected amount of successful fraud by a terminal before being detected by the acquirer is $100.

As would be obvious to those of ordinary skill in the art, there are many essentially equivalent ways to realize the inventive concepts disclosed. The particular choices that have been made here are merely for clarity in exposition and are sometimes arbitrary. For instance, without attempting to be exhaustive, there are many one-time signature structures, compression structures, hierarchical structurings, possible parameter values, and so on.

It will also be obvious to those of ordinary skill in the art how parts of the inventive concepts and protocols herein disclosed can be used to advantage without necessitating the complete preferred embodiment. This may be more fully appreciated in light of some examples, where in some uses of the inventive concepts, multiple parties may be combined, simple authorizations instead of actual messages may be used, implementation may involve various hardware forms and memory types, and so forth.

Certain variations and substitutions may be apparent to those of ordinary skill in the art. For example: most practical self-authenticating digital signature techniques could be applied instead of the RSA systems used as an example; compression functions may take more than two inputs; hierarchies of compression functions may take any other treelike form; and register re-use patterns that more evenly distribute certain types of access may be preferred for certain technologies.

While these descriptions of the present invention have been given as examples, it will be appreciated by those of ordinary skill in the art that various modifications, alternate configurations and equivalents may be employed without departing from the spirit and scope of the present invention.

What is claimed is:

1. A method for conducting financial transactions using a card, a terminal, and an issuer substantially according to EMV specification, the method comprising:

generating variable transaction data;

constructing a message block having a value dependent on at least some of said variable transaction data;

generating, by the card, an authentication of the message block;

sending said authentication to the terminal; and verifying, by said terminal, the authentication.

2. The method of claim 1, wherein the message block includes a transaction certificate.

3. The method of claim 1, wherein said generating comprises using public key cryptography on the message block.

4. An apparatus for conducting financial transactions using a card, a terminal, and an issuer substantially according to EMV specification, the method comprising:

means for generating variable transaction data;

means for constructing a message block having a value dependent on at least some of said variable transaction data;

means for generating, by the card, an authentication of the message block;

means for sending said authentication to the terminal; and means for verifying, by said terminal, the authentication.

5. The method of claim 4, wherein the message block includes a transaction certificate.

6. The method of claim 5, wherein said means for generating comprises means for using public key cryptography on the message block.

7. A method for conducting financial transactions using a card, a terminal, and an issuer substantially according to EMV specification, the method comprising:

maintaining a balance value in the card for financial transaction applications;

changing the balance value by an amount of each transaction; and refusing to carry out an off-line transaction if the amount of the transaction exceeds the balance value.

8. The method of claim 7, said changing comprising the issuer using a script feature of the EMV to change the balance value maintained on the card.

9. The method of claim 7, further comprising:

the issuer storing information relating to the card and on-line transactions performed by the card;

the issuer detecting a failure to execute a first script, as issued by the issuer, during an on-line transaction;

creating a second script;

sending the second script to the terminal; and the terminal executing the second script with the card.

10. The method of claim 9, further comprising:

the issuer detecting, after a predetermined period of time, off-line transactions performed with said card but not presented to the issuer for clearing;

estimating a total amount of said off-line transactions; and adding substantially the total amount to the balance value using a script.

* * * * *

UNITED STATES PATENT AND TRADEMARK OFFICE
CERTIFICATE OF CORRECTION

PATENT NO.    : 6,434,238 B1
DATED         : August 13, 2002
INVENTOR(S)   : David Chaum et al.

It is certified that error appears in the above-identified patent and that said Letters Patent is hereby corrected as shown below:

Column 59,
Line 2, delete the word "method" and insert the word -- apparatus --.
Line 4, delete the word "method" and insert the word -- apparatus --.

Signed and Sealed this

Eighteenth Day of March, 2003

JAMES E. ROGAN
*Director of the United States Patent and Trademark Office*